United States Patent [19]
Emerson et al.

[11] Patent Number: 5,898,861
[45] Date of Patent: Apr. 27, 1999

[54] TRANSPARENT KEYBOARD HOT PLUG

[75] Inventors: Theodore F. Emerson; Jeoff M. Krontz; Dayang Dai, all of Houston, Tex.

[73] Assignee: Compaq Computer Corporation, Houston, Tex.

[21] Appl. No.: 08/733,521

[22] Filed: Oct. 18, 1996

[51] Int. Cl.[6] .................................................. G06F 3/00
[52] U.S. Cl. ..................... 395/500; 395/527; 395/651; 395/283
[58] Field of Search .................................... 395/500, 527, 395/651, 652, 283, 838, 839; 345/168

[56] References Cited

U.S. PATENT DOCUMENTS

| | | | |
|---|---|---|---|
| 4,710,869 | 12/1987 | Enokizono | 395/500 |
| 5,136,694 | 8/1992 | Belt et al. | 395/887 |
| 5,222,228 | 6/1993 | Asprey | 395/851 |
| 5,261,079 | 11/1993 | Celi, Jr. | 395/500 |
| 5,263,171 | 11/1993 | Asprey | 395/728 |
| 5,278,958 | 1/1994 | Dewa | 395/836 |
| 5,590,315 | 12/1996 | Hess et al. | 395/500 |

FOREIGN PATENT DOCUMENTS 4-235655  8/1992  Japan .

OTHER PUBLICATIONS

"Method of Reducing . . . Keyboard Simulation," IBM Tech Disclosure Bull. vol. 33, No. 2, Jul. 1992, pp. 184–185.

"Keyboard–Less Personal System," IBM Tech Disc Bull, vol. 31, No. 12, May 1989, pp. 221–222.

"Keyboard Simulator Circuit," IBM Tech Disc Bull, vol. 32, No. 5B, pp. 22–23, Oct. 1989.

"Auxiliary Device Connector for Notebook PC," IBM Tech Disc. Bull. vol. 36, No. 03, Mar. 1993, pp. 539–540.

Technical Reference Guide Company DeskPro 386125, Personal Computer, vol. II 1988.

*Primary Examiner*—Meng-Ai T. An
*Assistant Examiner*—John Follausbee
*Attorney, Agent, or Firm*—Akin, Gump, Strauss, Hauer & Feld, L.L.P.

[57] ABSTRACT

A computer system that provides for transparent plugging and unplugging of a keyboard independent of system operation. A virtual keyboard device communicates with the system keyboard controller when no keyboard is plugged. The virtual keyboard device provides appropriate responses to inquiries from the operating system during startup, allowing the system to boot without an actual keyboard being present. When a keyboard is plugged, its presence is detected and it is configured by a virtual keyboard controller. The newly configured keyboard is then coupled to the system keyboard controller. On unplug, the lack of a keyboard is detected by monitoring the power supply to the keyboard, whereupon the virtual keyboard is again coupled to the system keyboard controller.

37 Claims, 47 Drawing Sheets

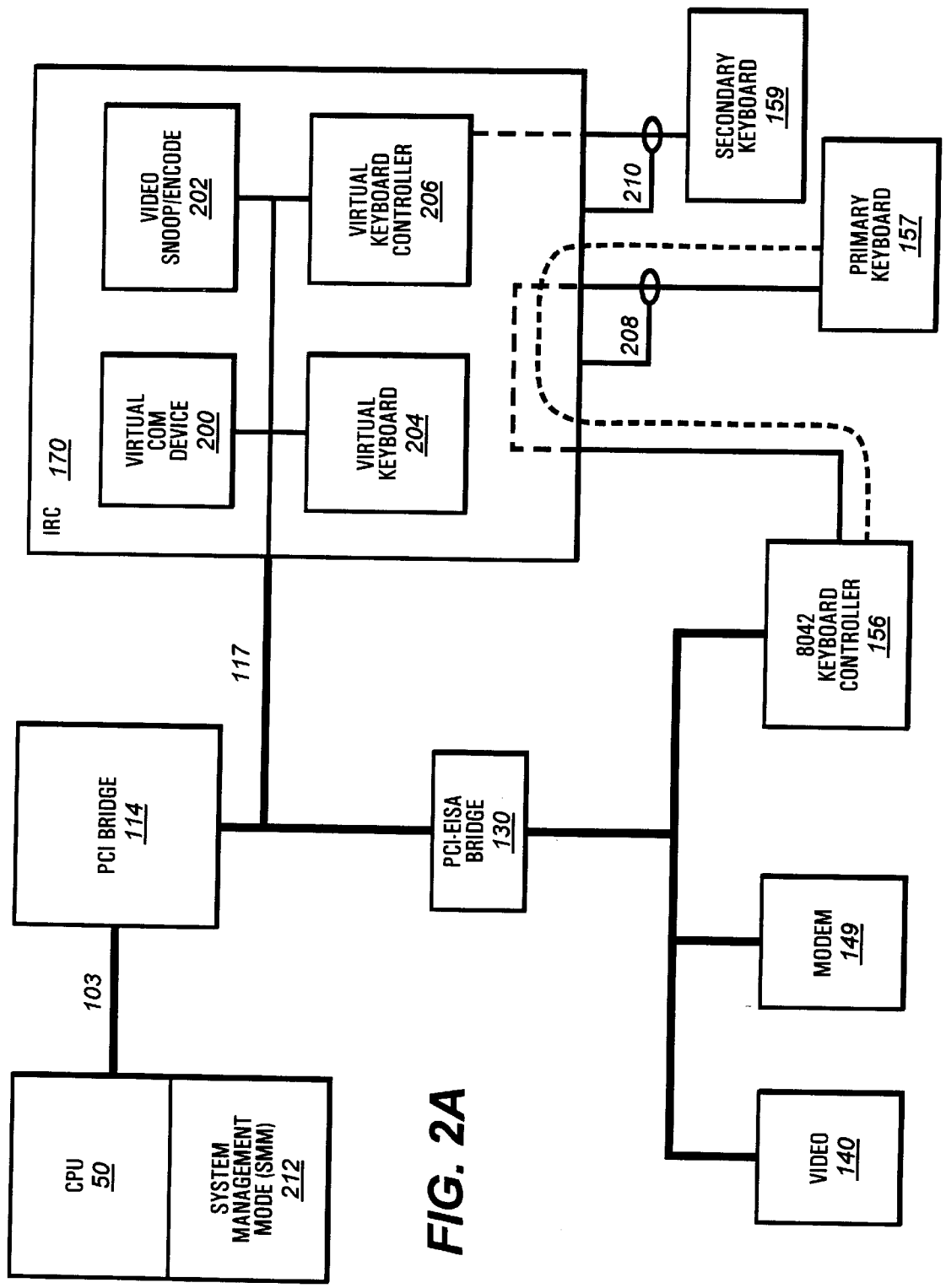

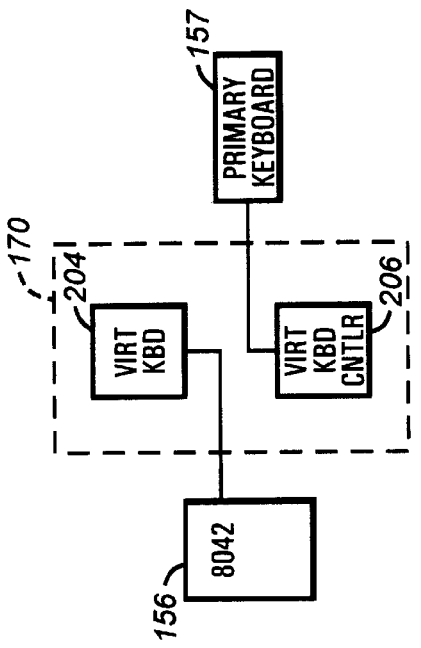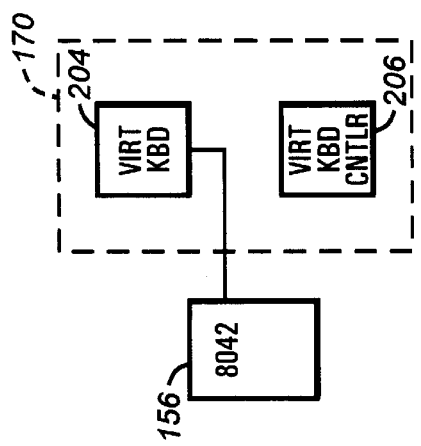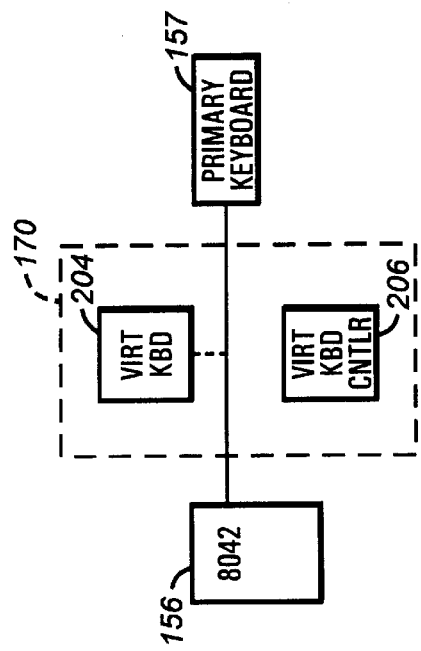

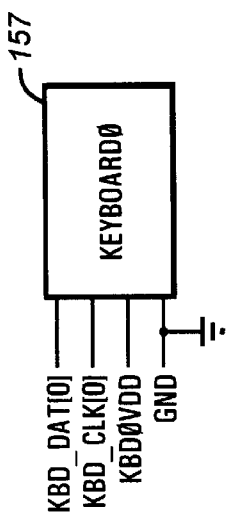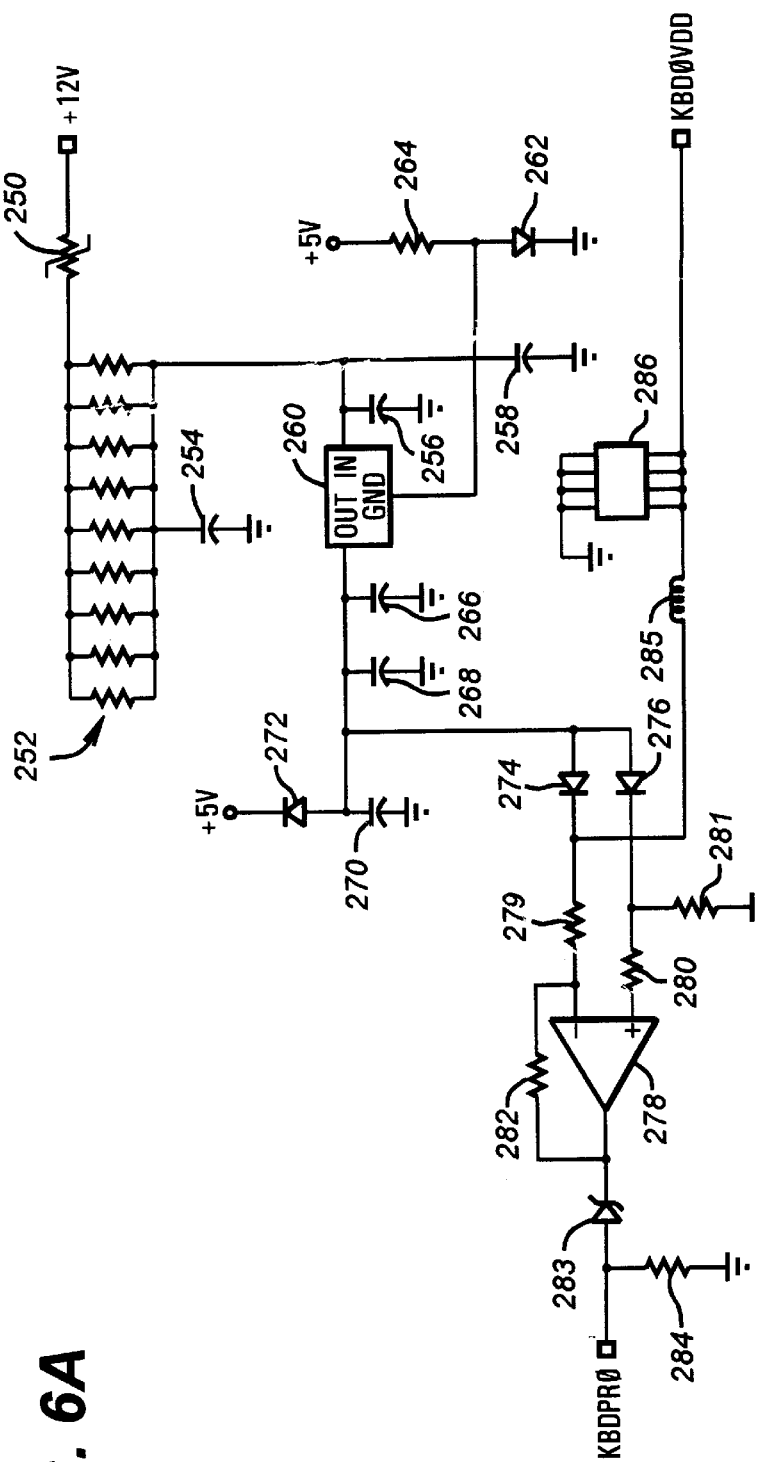
FIG. 6A
FIG. 6B

STATE IDLE
    NEXTSTATE KR_SRT_L   (!CLKIN • !DATAIN)
    NEXTSTATE KR_RTS1    (!TBF • CLKIN)

STATE KT_RTS1
    NEXTSTATE KT_RTS2   (t100)

STATE KT_RTS2
    NEXTSTATE KT_RTS3   (t15)

STATE KT_RTS3
    NEXTSTATE KT_RTS4   (CLKIN • t5)

STATE KT_RTS4
    NEXTSTATE KT_DAT_L   (!CLKIN • t5)

STATE KT_DAT_L
    NEXTSTATE KT_DAT_H   (CLKIN)

STATE KT_DAT_H
    NEXTSTATE KT_DAT_L   (!CLKIN • t5 • !CEQ7)
    NEXTSTATE KT_PAR_L   (!CLKIN • t5 • CEQ7)

STATE KT_PAR_L
    NEXTSTATE KT_PAR_H   (CLKIN)

STATE KT_PAR_H
    NEXTSTATE KT_STP_L   (!CLKIN • t5)

STATE KT_STP_L
    NEXTSTATE KT_STP_H   (CLKIN)

STATE KT_STP_H
    NEXTSTATE KT_LNC1   (!CLKIN • t5)

STATE KT_LNC1
    NEXTSTATE KT_LNC2   (!DATAIN)

STATE KT_LNC2
    NEXTSTATE KT_INH   (DATAIN)

FIG. 16A

STATE KT_INH
    NEXTSTATE REENABLE   (t100)

STATE KR_SRT_L
    NEXTSTATE KR_DAT_H   (CLKIN • t5)
    NEXTSTATE IDLE   (CLKIN • !t5)

STATE KR_DAT_L
    NEXTSTATE KR_DATA_H   (CLKIN)

STATE KR_DAT_H
    NEXTSTATE KR_DAT_L   (!CLKIN • t5 • !CEQ7)
    NEXTSTATE KR_PAR_L   (!CLKIN • t5 • CEQ7)

STATE KR_PAR_L
    NEXTSTATE KR_PAR_H   (CLKIN)

STATE KR_PAR_H
    NEXTSTATE KR_STP_L   (!CLKIN • t5)

STATE KR_STP_L
    NEXTSTATE KR_STP_H   (CLKIN)

STATE KR_STP_H
    NEXTSTATE KR_INH   (!CLKIN • t5)

STATE KR_INH
    NEXTSTATE KR_WAIT_RD   (t100)

STATE KR_WAIT_RD
    NEXTSTATE REENABLE   (!RBF • !TBF)
    NEXTSTATE KT_RTS1   (TBF)

STATE REENABLE
    NEXTSTATE IDLE   (CLKIN • t5)

FIG. 16B

RST_TIMER = IDLE +
KR_SRT_L • CLKIN • t5 +
KR_DAT_L + KR_PAR_L + KR_STP_L +
KR_INH • t100 +
KR_WAIT_RD +

KT_RTS1 • t100 +
KT_RTS2 • t15 +
KT_RTS3 • CLKIN • t5 +
KT_DAT_L + KT_PAR_L + KT_STP_L + KT_LNC2 +
KT_INH • t100

RST_GLOBAL = IDLE + KR_WAIT_RD

MUXPAR = KT_PAR_H + KT_PAR_L

COUNT = KT_DAT_H • !CLKIN • t5 +
KR_DAT_H • !CLKIN • t5

SHIFT = KT_DAT_H • !CEQ7 • !CLKIN • t5 +
KR_DAT_H • !CLKIN • t5

DATDRV = KT_DAT_H • KT_DAT_L +
KT_PAR_H + KT_PAR_L

DATAOUT = KT_RTS2 + KT_RTS3 + KT_RTS4

CLKOUT = KT_RTS1 + KT_RTS2 + KT_INH +
KR_INH + KR_WAIT_RD

SRLOAD = TBF • (IDLE + KR_WAIT_RD)

RST_BITCOUNT = IDLE + KR_WAIT_RD

TBF_CLR = KT_INH • t100 +
TRAN_WHILE_BUSY +
TRAN_TIMEOUT

*FIG. 17A*

```
RCV_TIMEOUT       <=
                        GLOBAL_MS_TIMEOUT •
                        (
                          KR_SRT_L +
                          KR_DAT_L + KR_DAT_H +
                          KR_PAR_L + KR_PAR_H +
                          KR_STP_L + KR_STP_H
                        )
                        + RCV_TIMEOUT • !KCSTAT_RD_STB

TRAN_WHILE_BUSY   <=
                        TBF •
                        (
                          KR_SRT_L +
                          KR_DAT_L + KR_DAT_H +
                          KR_PAR_L + KR_PAR_H +
                          KR_STP_L + KR_STP_H
                          KR_INH
                        )
                        + TRAN_WHILE_BUSY • !KCSTAT_RD_STB

TRAN_TIMEOUT      <=
                        GLOBAL_MS_TIMEOUT •
                        (
                          KT_RTS1 + KT_RTS2 +
                          KT_RTS3 + KT_RTS4 +
                          KT_DAT_L + KT_DAT_H +
                          KT_PAR_L + KT_PAR_H +
                          KT_STP_L + KT_STP_H +
                          KT_LNC1 + KT_LNC2
                        )
                        + TRAN_TIMEOUT • !KCSTAT_RD_STB

RBF               <=    KR_INH • t100 +
                        RBF • !(KCDAT_RD_STB + TBF)

TRANSMITCOMPLETE  <=
                        KT_INH • t100 +
                        TRANSMITCOMPLETE • !KCSTAT_RD_STB
```

FIG. 17B

```
STATE KBIDLE
    NEXTSTATE R_SRT_L   (!KBDATAIN • !KBCLKIN • MASTER +
        !KBDATAIN • !KBCLKIN • !MASTER • (R_SNOOP + T_SNOOP))
    NEXTSTATE T_SRT_H   (KBCLKIN • KBDATAIN • KBTBF • MASTER +
        KBCLKIN • !KBDATAIN • !MASTER • (R_SNOOP + T_SNOOP))
    NEXTSTATE INHIBIT   (KBDATAIN • !KBCLKIN • !MASTER • (R_SNOOP + T_SNOOP))
STATE INHIBIT
    NEXTSTATE KBIDLE    (KBCLKIN + !(R_SNOOP + T_SNOOP) + MASTER)
    NEXTSTATE R_SRT_L   (!KBCLKIN • !KBDATAIN • !MASTER • (R_SNOOP + T_SNOOP))
STATE R_SRT_L
    NEXTSTATE KBIDLE    (!KBCLKIN • KBDATAIN)
    NEXTSTATE R_DAT_H   (KBCLKIN)
STATE R_DAT_H
    NEXTSTATE R_DAT_L   (KBT50 • KBCLKIN • MASTER +
        KBT5 • !KBCLKIN • !MASTER)
    NEXTSTATE KBIDLE    (KBT5 • !KBCLKIN • MASTER)
STATE R_DAT_L
    NEXTSTATE R_DAT_H   (KBT50 • !KBCEQ7 • MASTER +
        KBCLKIN • !KBCEQ7 • !MASTER)
    NEXTSTATE R_PAR_H   (KBT50 • KBCEQ7 • MASTER +
        KBCLKIN • KBCEQ7 • !MASTER)
STATE R_PAR_H
    NEXTSTATE R_PAR_L   (KBT50 • MASTER +
        KBT5 • !KBCLKIN • !MASTER)
STATE R_PAR_L
    NEXTSTATE R_STP_H   (KBT50 • MASTER +
        KBCLKIN • !MASTER)
STATE R_STP_H
    NEXTSTATE R_STP_L   (KBT50 • MASTER +
        KBT5 • !KBCLKIN • !MASTER)
STATE R_STP_L
    NEXTSTATE R_LNC_H   (KBT50 • MASTER +
        KBCLKIN • !MASTER)
```

*FIG. 22A*

STATE R_LNC_H
    NEXTSTATE R_LNC_L   (KBT50 • MASTER +
        KBT5 • !KBCLKIN • !MASTER)

STATE R_LNC_L
    NEXTSTATE R_WAIT_H   (KBT50 • MASTER)
    NEXTSTATE R_WAIT_L   (KBCLKIN • !MASTER)

STATE R_WAIT_H
    NEXTSTATE R_WAIT_L   (KBCLKIN)

STATE R_WAIT_L
    NEXTSTATE KBIDLE   (KBT5 • !KBCLKIN • MASTER)
    NEXTSTATE INHIBIT   (KBT5 • !KBCLKIN • !MASTER)

STATE T_SRT_H
    NEXTSTATE T_SRT_L   (KBT50 • KBCLKIN • MASTER +
        KBT5 • !KBCLKIN • !MASTER)
    NEXTSTATE KBIDLE   (KBT5 • !KBCLKIN • MASTER +
        KBDATAIN • KBCLKIN • !MASTER)

STATE T_SRT_L
    NEXTSTATE T_DAT_H   (KBT50 • MASTER +
        KBCLKIN • !MASTER)

STATE T_DAT_H
    NEXTSTATE T_DAT_L   (KBT50 • KBCLKIN • MASTER +
        KBT5 • !KBCLKIN • !MASTER)
    NEXTSTATE KBIDLE   (KBT5 • !KBCLKIN • MASTER)

STATE T_DAT_L
    NEXTSTATE T_DAT_H   (KBT50 • !KBCEQ7 • MASTER +
        KBCLKIN • !KBCEQ8 • !MASTER)
    NEXTSTATE T_PAR_H   (KBT50 • KBCEQ7 • MASTER +
        KBCLKIN • KBCEQ8 • !MASTER)

STATE T_PAR_H
    NEXTSTATE T_PAR_L   (KBT50 • MASTER +
        KBT5 • !KBCLKIN • !MASTER)

*FIG. 22B*

STATE T_PAR_L
    NEXTSTATE T_STP_H   (KBT50 • MASTER +
        KBCLKIN • !MASTER)
STATE T_STP_H
    NEXTSTATE T_STP_L   (KBT50 • MASTER)
    NEXTSTATE INHIBIT   (KBT5 • !KBCLKIN • !MASTER)
STATE T_STP_L
    NEXTSTATE KBIDLE    (KBT50)

*FIG. 22C*

RSTKBT50 = KBIDLE + R_SRT_L • MASTER +
(
  R_SRT_L • KBCLKIN +
  R_DAT_L + R_PAR_L + R_STP_L + R_LNC_L +
  T_SRT_L + R_DAT_L + T_PAR_L + T_STP_L
) • !MASTER

RST_GLOBAL = KBIDLE + INHIBIT

KBSHIFT = MASTER • (T_DAT_L • !KBCEQ7 • KBT50
+ R_DAT_L • KBT50)
+ !MASTER • (T_DAT_H • !KBCLKIN • KBT5
+ R_DAT_L • KBCLKIN)

KBTBF_CLR = T_STP_L • KBT50 • MASTER +
KBTRAN_TIMEOUT +
KBTRAN_WHILE_BUSY

KBMUXPAR = (T_PAR_H + T_PAR_L) • MASTER

KBCOUNT = MASTER • (T_DAT_L • KBT50
+ R_DAT_L • KBT50
)
+ !MASTER • (T_DAT_H • !KBCLKIN • KBT5
+ R_DAT_L • KBCLKIN

KBDATDRV = (T_DAT_H + T_DAT_L + T_PAR_H + T_PAR_L) • MASTER

KBLOADBUF = MASTER • (
R_LNC_L • KBT50
)
+ !MASTER • ((R_LNC_L • KBCLKIN) • R_SNOOP
+ (T_STP_H • KBT5 • !KBCLKIN) • T_SNOOP
)

KBSRLOAD = KBCLKIN • KBDATAIN • KBTBF • KBIDLE

FIG. 23A

KBRCV_TIMEOUT <=
　　　　　　　GLOBAL_MS_TIMEOUT •
　　　　　　　(
　　　　　　　　R_SRT_L +
　　　　　　　　R_DAT_H + R_DAT_L +
　　　　　　　　R_PAR_H + R_PAR_L +
　　　　　　　　R_STP_H + R_STP_L + R_LNC_H + R_LNC_L +
　　　　　　　　R_WAIT_H + R_WAIT_L
　　　　　　　)
　　　　　　　+ KBRCV_TIMEOUT • !KSTAT_RD_STB

KBTRAN_WHILE_BUSY <=
　　　　　　　KBTBF •
　　　　　　　(
　　　　　　　　R_SRT_L +
　　　　　　　　R_DAT_H + R_DAT_L +
　　　　　　　　R_PAR_H + R_PAR_L +
　　　　　　　　R_STP_H + R_STP_L + R_LNC_H + R_LNC_L +
　　　　　　　　R_WAIT_H + R_WAIT_L
　　　　　　　)
　　　　　　　+ KBTRAN_WHILE_BUSY • !KSTAT_RD_STB

KBTRAN_TIMEOUT <=
　　　　　　　GLOBAL_MS_TIMEOUT •
　　　　　　　(
　　　　　　　　T_SRT_H + T_SRT_L +
　　　　　　　　T_DAT_H + T_DAT_L +
　　　　　　　　T_PAR_H + T_PAR_L +
　　　　　　　　T_STP_H + T_STP_L +
　　　　　　　)
　　　　　　　+ KBTRAN_TIMEOUT • !KSTAT_RD_STB

KBRBF <=     MASTER • (
　　　　　　　R_WAIT_L • KBT5 • !KBCLKIN
　　　　　　　)
　　　　　　　+ !MASTER • ((R_LNC_L • KBCLKIN) • R_SNOOP
　　　　　　　+ (T_STP_H • KBT5 • !KBCLKIN) • T_SNOOP
　　　　　　　)
　　　　　　　+ KBRBF • !KDAT_RD_STB

*FIG. 23B*

KBSNOOP_DIR =
  SNOOPED_8042TRAN <=
            (R_STP_H + R_STP_L) • !MASTER • R_SNOOP
            + SNOOPED_8042TRAN • !KDAT_RD_STB

KBDATAOUT <=    R_LNC_H • R_LNC_L • T_SRT_H • T_SRT_L

KBCLKOUT <=     INHIBIT • R_DAT_L • R_PAR_L • R_STP_L • R_LNC_L
                  • T_SRT_L • T_DAT_L • T_PAR_L • T_STP_L

KBTRANSMITCOMPLETE <=
            T_STP_L • KBT50 +
            KBTRANSMITCOMPLETE • !KSTAT_RD_STB

*FIG. 23C*

TRANSPARENT KEYBOARD HOT PLUG

BACKGROUND OF THE INVENTION

1. Field of the Invention

The invention is related to computer system serial devices, and more specifically to a system allowing a computer keyboard to be hot plugged and unplugged without system interruption.

2. Description of the Related Art

Personal computer systems have historically shared a number of common elements. These included a display, a storage device, and a keyboard. These provided for the viewing, storing, and entry of data. So common were these elements, including a keyboard, that the personal computer ultimately developed by International Business Machines initially incorporated a power-on test to determine whether a keyboard was present. If the keyboard was not present or it otherwise indicated a self-test failure, the IBM PC would halt its boot process. After all, one had to have a working keyboard to input data.

The IBM PC has become a model that the vast majority of present-day personal computers emulate in terms of software. There is a great deal of system software, as well as basic input/output software (BIOS), that is written for the IBM PC and compatible machines. Therefore, a basic goal of most computer makers is to be compatible with an IBM PC, not requiring any changes to that software in order to incorporate new features.

But further, the hardware configuration of the IBM PC has similarly been mimicked. For example, virtually every IBM PC AT class machine incorporates an Intel Corporation 8042 keyboard controller or its equivalents, such as the 8741 or 8742. Although these keyboard controllers may be implemented in a variety of forms, they respond and interact with the system software similarly. It is through this 8042 keyboard controller that the power-on software determines whether a keyboard is present. Typically, the power-on software sends scan codes to the keyboard through the 8042 keyboard controller, expecting an appropriate response from the keyboard. If that response is not reported by the 8042 keyboard controller, then the system halts in its booting process.

But with the proliferation of configurations of personal computers, as well as the increasing power of the processors that run them, PC's have evolved to where a keyboard is not necessarily always a desirable feature. One example would be a "notepad" computer; another example would be a system server mounted in a rack. For the notepad computer, one may desire a keyboard, but one may simply instead use the stylus. For a rack-mounted server, it may be desirable only to have a keyboard when necessary to do server-level configuration, and to otherwise operate without the keyboard.

Therefore, it is desirable to allow the booting of computer systems without a keyboard attached. It is also desirable, however, to allow the plugging and unplugging of a keyboard dynamically—that is, while the system is in operation. Therefore, a system which seamlessly allows booting without a keyboard and plugging and unplugging of one or more keyboards is desirable.

It is further desirable to allow multiple keyboards to be installed in a system. An example would be the rack-mounted server. It could have a keyboard attachment in back for a permanent keyboard. Alternatively, it could have a front keyboard attachment for a technician to plug and unplug a keyboard as needed. But the ability to use both of these attachments is desirable.

A number of keyboard hot-plug and unplug systems have been attempted, but typically have not been seamlessly integrated such that a system could boot without a keyboard, a keyboard could be plugged in, and then data could be immediately entered. Referring to commonly assigned co-pending U.S. application Ser. No. 08/359,014, entitled "Personal Computer with Keyboard and Auxiliary Device Emulation," a keyboard plug and unplug system is shown for a notepad computer, but the computer must be first placed in a special mode before a newly installed keyboard can be used. It would be greatly desirable to have true transparent plug and unplug capability, yet simultaneously allow the booting of a keyboardless system.

SUMMARY OF THE INVENTION

According to the invention, seamless hot plug and unplug capability of a keyboard is provided. Specifically, a standard 8042 compatible keyboard controller is coupled to a device that provides this hot plug capability. When the system is booted without an installed keyboard, a virtual keyboard is coupled to the 8042 keyboard controller. This virtual keyboard appropriately responds to commands sent from the 8042 keyboard controller to that virtual keyboard, thus making the system believe that a physical keyboard is attached.

This virtual keyboard maintains an internal state as set by the 8042 keyboard controller. For example, repeat rates and keyboard modes for standard keyboards can be set through commands sent by the 8042 keyboard controller. This tracking is used when a physical keyboard is actually installed in the system. The system detects the physical installation of a keyboard by monitoring the keyboard voltage line to determine when it begins drawing current. When this plug event happens, the keyboard is allowed to stabilize for a period of time, and then is coupled to a virtual keyboard controller. This virtual keyboard controller sends appropriate scan codes to the newly attached keyboard reflecting the state that the virtual keyboard has captured. Once the newly installed keyboard is configured, the 8042 keyboard controller is connected to the newly attached keyboard. Because the keyboard has been preinitialized to the virtual keyboard state, the transition from a virtual keyboard to a physical keyboard is transparent to the system.

When a keyboard is unplugged, this can cause problems because the data and clock lines may become indeterminate as the power and ground lines become clear of the plug. Therefore, according to the invention, the power line is monitored for when it drops to zero current. At this point, the physical 8042 keyboard controller is switched off of the physical keyboard very quickly, before the transistors within the physical keyboard power down, causing spurious characters. The 8042 keyboard controller is switched to the virtual keyboard at this point, which then takes the task of responding to scan codes from the 8042 keyboard controller. Thus, spurious characters do not occur when the keyboard is unplugged.

Further according to the invention, the actual device is implemented as an application specific integrated circuit that communicates with system management mode firmware. The interfaces for providing the virtual keyboard controller and virtual keyboard are found within the ASIC, but the logic for responding to and providing various scan codes is found within the system management mode software. The processor is periodically interrupted, forcing it into system management mode, where appropriate scan codes are sent through the virtual keyboard and the virtual keyboard controller to the 8042 keyboard controller and the physical keyboards, respectively. In this way, the application specific integrated circuit logic is simplified, with the scan code parsing logic being found in the system management mode firmware.

Further according to the invention, multiple keyboards can be hot plugged and unplugged.

BRIEF DESCRIPTION OF THE DRAWINGS

A better understanding of the present invention can be obtained when the following detailed description of the preferred embodiment is considered in conjunction with the following drawings, in which:

FIGS. 2A–D are block diagrams illustrating the flow path of the modem access remote console according to the disclosed embodiment;

FIGS. 4A–C are block diagrams illustrating the sequence of connection of the virtual keyboard to the 8042 keyboard controller and then the physical keyboard to the 8042 keyboard controller through the integrated remote console according to the disclosed embodiment;

FIGS. 6A and 6B are a block diagram and a schematic illustration of the keyboard presence detect circuitry according to the disclosed embodiment;

FIGS. 16A–B are the state equations for state transitions of the state diagram of FIG. 15;

FIGS. 17A–B are equations for signals provided based on the transitions of the state diagram of FIG. 15;

FIGS. 22A–C are the state equations for state transitions of the state diagram of FIG. 21;

FIGS. 23A–C are equations for signals provided based on the transitions of the state diagram of FIG. 21;

DETAILED DESCRIPTION OF THE PREFERRED EMBODIMENT

The following patents or patent applications are hereby incorporated by reference:

U.S. patent application Ser. No. 08/733,415, entitled "Modem Sharing," to Theodore F. Emerson and Jeoff M. Krontz, and commonly assigned to the assignee of the present patent now U.S. Pat No. 5,790,895; and U.S. patent application Ser. No. 08/733,254, entitled "Video Eavesdropping and Reverse Assembly to Transmit Video Action to a Remote Console," to Theodore F. Emerson and Peter J. Michaels, and Jeoff M. Krontz, and commonly assigned to the assignee of the present patent.

Figure 1:
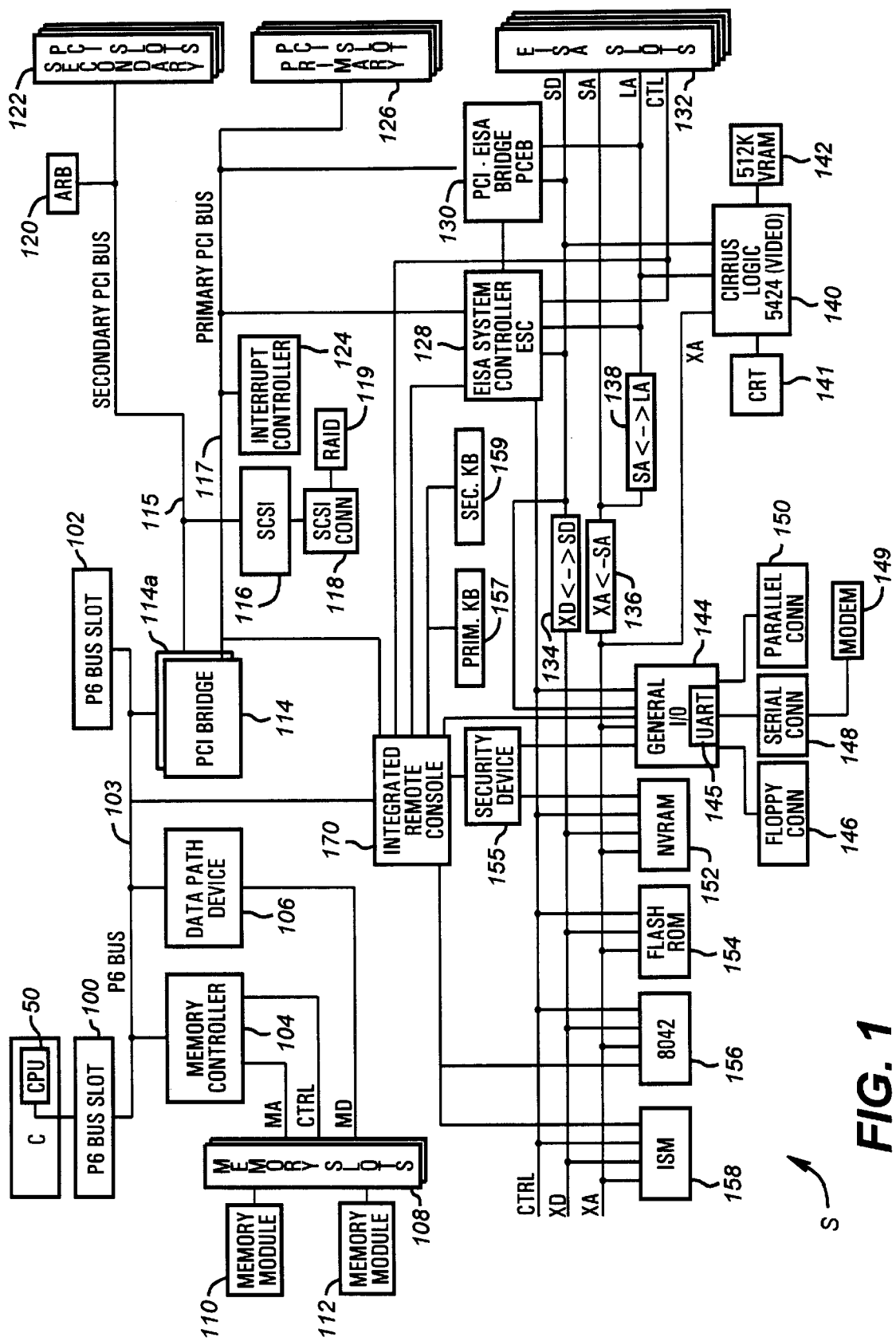
FIG. 1 is a block diagram of a computer system or server S in which the hot pluggable keyboard according to the disclosed embodiment would be implemented.

Turning to FIG. 1, a server computer system S is disclosed. To provide sufficient processing capability for today's demanding server applications, the server computer system S of FIG. 1 employs one or more processors, preferably the Pentium™ or the Pentium Pro™ processor 50 available from Intel Corporation located in Santa Clara, Calif. The Pentium Pro™ processor 50 resides on a processor card C which is plugged into one of the P6 slots 100–102. The P6 slots 100–102 are connected to a Pentium Pro™ host bus called the P6 bus 103. The P6 bus 103 is a high performance bus which preferably supports two processor cards C mounted on slots 100–102. Preferably, each processor card C supports two Pentium Pro™ processors. Thus, the preferred embodiment supports up to four processors.

In addition to the processors, the P6 bus 103 is connected to a memory controller 104 and a data path device 106, which collectively form a dynamic random access memory (DRAM control subsystem.

The memory controller 104 provides control and timing to the memory subsystem, while the data path device 106 interfaces the P6 host bus 103 to the memory array. The memory controller 104 and the data path 106 are capable of taking a memory request from the CPU 50, queuing it, and responding after the requested operation has completed. Additionally, the memory controller 104 provides memory error correction, vital in server applications, including the capability of single-bit error correction and multi-bit error detection on the fly. The memory controller 104 can support up to four gigabytes of page mode DRAM. Memory arrangements having non-interleaved, and x2 and x4 interleaving configurations are supported by the memory control sub-system.

A plurality of memory modules 110–112 are connected to memory slots 108 to provide up to four gigabytes of memory. During operation, the actual performance of the memory subsystem will depend in part on the mix of read and write operations and the memory access patterns for a given application. The memory controller 104 minimizes the impact of the idle cycles by allowing read operations to bypass the write operations and be completed first as long as the memory addresses for the read/write pair do not match.

In addition to a memory controller, the system S needs a robust input/output system. The input/output (I/O) subsystem designed for the system S scalable to meet the performance requirements for the four Pentium Pro™ processors. A Peripheral Component Interconnect (PCI) bus provides a combination of high performance and scalable I/O for the demanding environment faced in server applications. To provide PCI connections, one or more PCI bridges 114 and 114*a* are connected to the P6 bus 103. The peer-to-peer arrangement of the PCI bus eliminates levels of arbitration found in hierarchical arrangements, resulting in higher system performance.

As in the memory controller 104, the PCI bridge 114 supports a full 64-bit interface to the CPU bus, including support for all protocols as well as error correction. The PCI bridge 114 supports an 8-deep transaction in-order queue as well as separate 4-deep queues for both outbound (processor to PCI) and inbound (PCI to processor) transactions that are for the I/O bus agent. Also, like the memory controller 104, the PCI bridge 114 provides four 32-byte data buffers in both the inbound and outbound directions. The buffers decouple the host bus 103 from the PCI buses 115–117 and optimize performance by allowing the posting of data at full bus speeds in both directions. However, unlike the memory controller 104, the PCI bridge 114 supports up to two outstanding deferred-reply requests. This feature allows a bus transaction to be split and completed later, preventing the Pentium Pro™ P6 bus 103 from becoming blocked by long latency I/O operations. In this mode, the PCI bridge 114 would defer Pentium Pro™ memory reads, I/O reads, I/O writes, and interrupt acknowledge transactions. However, memory write transactions are not deferred since they are better optimized through posting.

Attached to the secondary PCI bus 115 is a Small Computer System Interface (SCSI) controller 116. The SCSI controller 116 provides the capability of handling simultaneous disk commands, which is necessary in a multithreaded, multi-tasking operating system. Attached to the SCSI controller 116 is one or more SCSI connectors 118, which drive a plurality of peripheral storage devices, such as disk drives adapted to support the host system's simultaneous issuance of multiple commands to one or more SCSI devices. The disk drives can be one or more high capacity disk drives or the disk drives can be a Redundant Array of Inexpensive Disks (RAID) data storage device 119. The ability to overlap commands and queue the commands to one or more data storage devices can significantly boost performance in multitasking environments such as Windows 95™ and NT™. Other peripheral storage devices could include, for example, CD-ROM drives or tape drives. In addition to the SCSI controller 116, a plurality of devices may be plugged into the secondary PCI bus 115 over a plurality of secondary PCI slots 122.

On the primary PCI bus 117, an interrupt controller 124 handles interrupt requests coming into the PCI bridge 114 for eventual transmission to one of the processors 50 in slots 100–102. The interrupt controller 124 routes interrupt requests from devices located on PCI buses 115–117 to the processors 50 on slots 100–102 during multiprocessor operation. Additionally, a number of PCI peripherals can be plugged into a plurality of primary PCI slots 126.

An EISA system controller (ESC) 128 and a PCI-EISA bridge (PCEB) 130 are also connected to the primary PCI bus 117. The ESC 128 and the PCEB 130 should be connected to the primary PCI bus 117 because the auxiliary bus controller 114*a* should request arbitration from the compatibility bus controller 114 on some operations. That added latency means that the auxiliary bus, or secondary PCI bus 115, cannot meet PCI version 2.1 latency specifications. For this reason, EISA and ISA bus bridges should be on the compatibility bus, or primary PCI bus 117.

The ESC 128 and the PCEB 130 work in tandem to provide an EISA I/O subsystem interface for the computer system S. The combination of the ESC 128 and the PCEB 130 provides an I/O subsystem capable of taking advantage of the power of the PCI bus architecture while maintaining access to a large base of EISA and ISA expansion cards, and corresponding software applications.

With the inclusion of the ESC 128 and the PCEB 130, the system S now contains three levels of buses structured in the following hierarchy: the P6 bus 103 as the execution bus; an expansion bus system having the primary and secondary PCI buses 115–117; and the EISA bus as a secondary I/O bus. This bus hierarchy allows concurrency for simultaneous operation on all three bus environments. Data buffering permits concurrency for operations that cross over into another bus environment. Further, the ESC 128 implements system functions such as timer/counter, DMA, interrupt controller, and EISA subsystem control functions such as EISA bus controller and EISA bus arbiter. The PCEB 130 provides the interface to the bridge between the PCI and EISA buses by translating bus protocols in both directions. It uses extensive buffering on both the PCI and EISA interfaces to allow concurrent bus operations.

The ESC 128 and the PCEB 130 are connected to a plurality of EISA slots 132. Additionally, the ESC 128 also generates chip selects for certain functions that typically reside on an X-bus. The ESC 128 generates chip select signals for an integrated system management unit (ISM) 158, an 8042 keyboard controller 156, a flash ROM 154, a non-volatile RAM 152, and a general purpose I/O device 144 that supports floppy drives over floppy connectors 146, serial ports, over serial connectors 148 and parallel ports over parallel connectors 150. The general I/O device 144 contains a universal asynchronous receiver-transmitter (UART) 145, which provides a communication port accessible via the one of the serial connectors 148.

Further, an industry standard modem 149, preferably a Hayes-compatible modem, is connected to the serial connectors 148. Alternatively, the modem 149 could be mounted on an expansion card plugged into one of the EISA slots 132 or further integrated into the system S. In either case, the modem transmits data to the communications (COM) port, or UART 145, which in turn converts the serial data into parallel data and passes the data over the EISA bus.

The EISA slots 132 have system data lines SD connected to the data bus XD of the X-bus via a buffer 134, which provides accesses to I/O devices as well as the system BIOS in the flash ROM 154. Further, the EISA slots 132 have system address lines SA connected to the address lines XA of the X bus via buffer 136. The EISA slots 132 have latched address lines LA connected to the system address lines via buffer 138. Finally, a video controller 140 is connected to the X bus address lines XA, the EISA system data lines SD, and the latched address lines LA. The video controller 140 is connected to a video RAM 142, which is preferably 512 kilobytes in size.

Also connected to the primary PCI bus 117 is an integrated remote console device (IRC) 170 of the present invention. The IRC 170 provides a system management interrupt to an SMI# input of the CPU50. The integrated remote console device 170 is further connected to the ESC device 128, the control portion of the EISA slots 132, the general I/O device 144, the 8042 keyboard controller 156, and the ISM device 158. The integrated remote console device 170 is additionally connectable to a primary keyboard 157 and a secondary keyboard 159 to receive keyboard inputs from the user. The primary keyboard 157 can be mounted on the rear of the system S enclosure while the secondary keyboard 157 can be mounted on the front of the system S enclosure, for example. The integrated remote console device 170 is also connected to a security device 155, which is in turn connected to the NVRAM 152 and the general I/O device 144, to protect the NVRAM 152 from unauthorized accesses.

It must be understood that while an exemplary computer system S has been shown in FIG. 1, the exact computer system used is not critical. A variety of other single processor or dual processor systems could be used, as well as a variety of configurations of PCI buses, EISA buses, ISA buses, or the like.

Overview of Keyboard Hot Plug, Hot Unplug, and Remote Console Operation

Figure 2B:
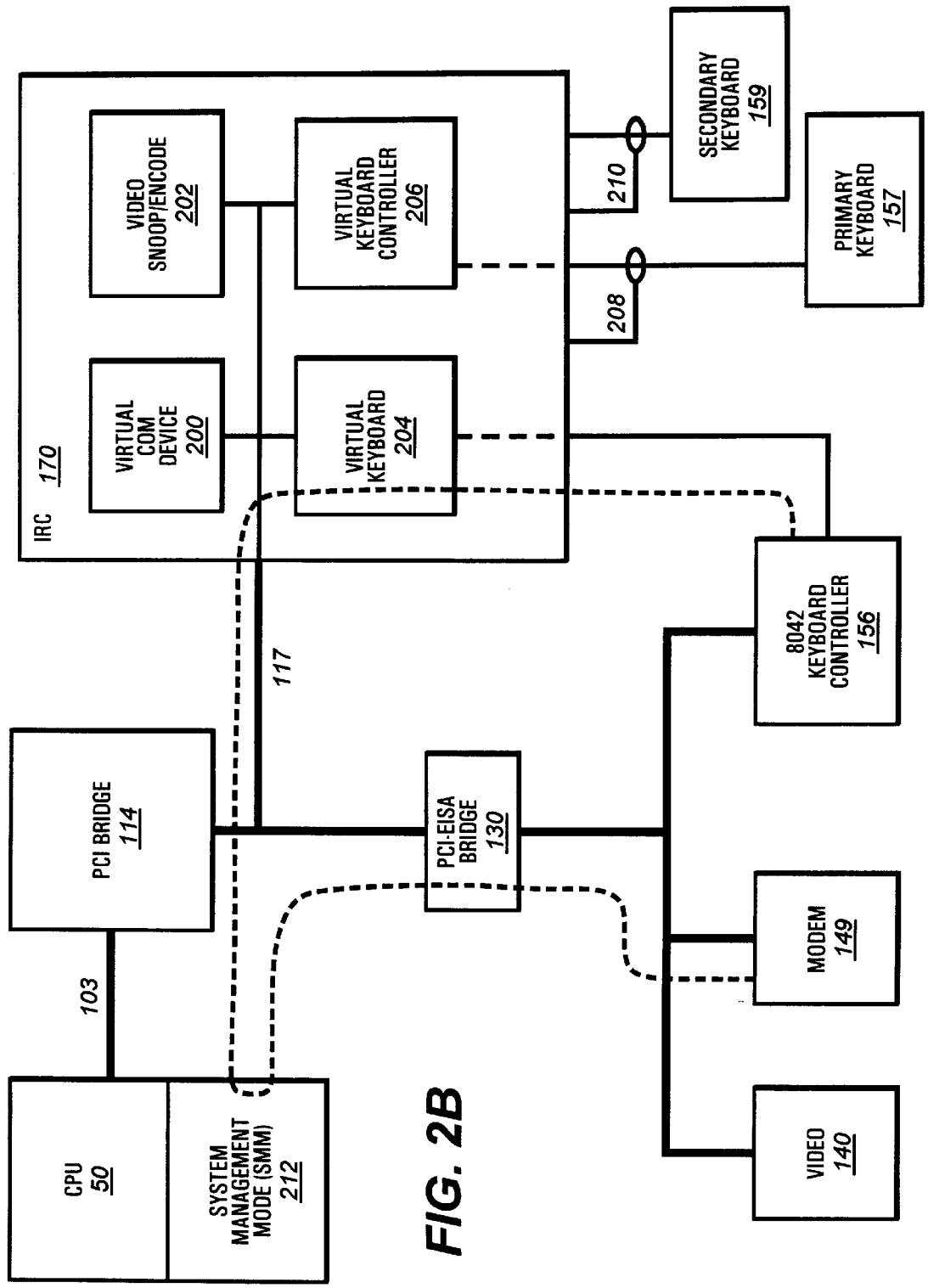
Figure 2C:
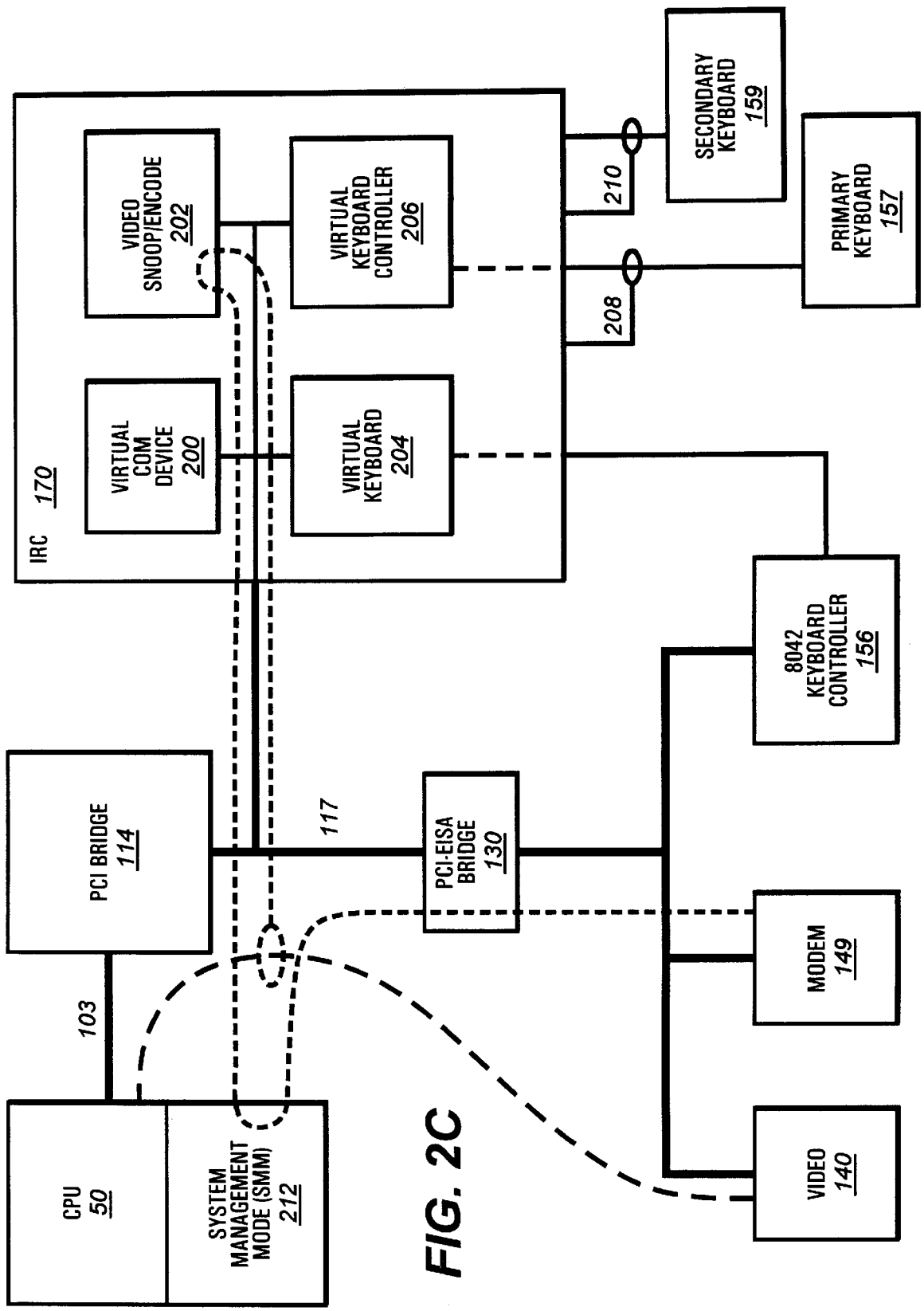

Turning to FIGS. 2A–2C, a series of block diagrams illustrates how a number of components operate to provide a transparent remote console in conjunction with seamless keyboard hot plugging and unplugging. By understanding the interactions of these components, one can understand how an integrated remote console is provided.

A standard IBM PC compatible keyboard controller, such as the 8042 keyboard controller 156, receives scan codes in a serialized form from a standard IBM PC compatible keyboard and converts those codes into a usable data format. Further, a keyboard controller can also transmit command codes to a keyboard, for example, to set the repeat rate, to set or reset the various light emitting diodes, and to reset the keyboard. These transmit and receive sequences are well known, and are communicated over two open collector bidirectional clock and data lines, which are pulled high by resistors when undriven.

In IBM compatible PCs, the keyboard controller is typically directly connected to an IBM compatible keyboard. On startup of a typical computer system, the power on self test (POST) code run by the system requires that a keyboard be present. It checks for this presence by transmitting commands through the keyboard controller to the keyboard, where those codes force the keyboard to send an expected response. If a keyboard is not present, the system aborts booting and a keyboard error is displayed on the screen. This is appropriate in standard personal computers, because one wants to enter data into a system through the keyboard.

But the computer system S is preferably a server. It is often the case that a server does not need a connected keyboard. For this reason, it is desirable to boot the system and otherwise operate the system while a keyboard is detached. At the same time, one prefers not to modify the POST code of the computer system S, the operating system (OS), or the keyboard ROM to allow this keyboardless booting.

Therefore, IRC 170 provides a virtual keyboard 204. Referring ahead to FIGS. 4A–C, it is seen that this virtual keyboard 204 is coupled to the 8042 keyboard controller 156 when no keyboard is present. This allows a standard boot without an attached keyboard 157 or 159. When the CPU executes its POST code, it inquires through the 8042 keyboard controller 156 whether a keyboard 157 or 159 is present. If not, as illustrated in FIGS. 2C and 4A, the virtual keyboard 204 responds to the 8042 keyboard controller 156, thus making the POST code believe a physical keyboard is present, allowing the system to boot. This virtual keyboard 204 is implemented much as would be the communications logic within a standard keyboard, using the same serial communication structure. The virtual keyboard 204 is further discussed in detail below in conjunction with FIGS. 21–26.

The IRC 170 also provides other functions for the system S. According to the invention, not only is an absent keyboard emulated, but also the keyboards 157 and 159 can be plugged and unplugged without affecting or interrupting system operation, and without causing spurious characters. To this end, external to the IRC 170 are two keyboard presence sensing circuits 208 and 210. These circuits, further described below in conjunction with FIGS. 6A–6B, sense the presence or absence of the primary keyboard 157, and the secondary keyboard 159. Based on the presence or absence of these keyboards 157 and 159, the IRC 170, in conjunction with system management mode (SMM) 212 firmware discussed below, detects, controls, and couples and uncouples these keyboards 157 and 159 from the system S.

Further providing this seamless plugging and unplugging is a virtual keyboard controller 206. This virtual keyboard controller 206, as discussed below, is used to first initialize any newly plugged-in keyboard 157 or 159 so that it can then be connected to the 8042 keyboard controller 156 in a predetermined state. That is, the virtual keyboard 204 and the SMM 212 software track the keyboard state as set by the 8042 keyboard controller 156, and then present a newly plugged keyboard to that state through the virtual keyboard controller 206.

The IRC 170 also includes a virtual COM device 200. To understand the purpose of the virtual COM device 200, an understanding of "remote console" operation is helpful. Computer servers increasingly demand a high degree of fault tolerance. Further, when a computer server fails, it is important to be able to detect the causes of those failures and restart the system. To this end, a number of systems have been developed for not only monitoring server operation but even remotely restarting the server when that server has failed. It is in this aspect that the IRC 170 according to the invention finds a special usefulness. In the system S, should the operating system, for example, fail, a remote console can "hot key" into a restart mode, specifically in conjunction with the system management mode 212 discussed below. Using this restart software in the SMM 212, the user can restart the system.

It is desirable to remotely provide this functionality. This is where the IRC 170 provides transparent utility. As discussed further below in conjunction with FIGS. 2A–D, the IRC 170 provides a remote access capability, allowing both remote access to running server software and to this restart mode. In effect, the IRC 170, in conjunction with system management mode (SMM) software, seizes control of the modem 149 and communications with the 8042 keyboard controller 156, and snoops data intended for the video 140. The IRC 170 and SMM software then route input from the modem 149 to the 8042 keyboard controller 156 as scan codes. The running software on these systems then responds as though the input came from a local keyboard. The IRC 170 also snoops data that is then sent to the video 140 through the system management mode 212, providing it in a compressed format over the modem 149. In this way, the IRC 170 provides a "remote console" used to access the system S.

Further, the SMM software monitors for "hot keys" from the remote console. If the system S fails, the user can hot key to the low level restart menu of the SMM software, bypassing the 8042 keyboard controller 156. In this low level SMM software mode, the user can then restart the system.

Because the modem 149 is generally accessed through a COM device, it will be appreciated that the virtual COM device 200 is used to "steal" access to the modem 149 from the standard operating system running on the CPU 50. The virtual COM device 132 acts to positively decode CPU 50 accesses to the COM port where the modem 149 appears. This prevents the computer system S from accessing the modem 149 when a remote console is being run through the modem 149. In such a case, the remote console should be communicating through the modem 149 to the low level SMM 212 software of the CPU 50. System management mode is a separate, highly protected state of operation of the CPU 50 that is effectively independent of the rest of the operating system of the system S. When properly implemented, the system management mode will continue to properly operate (and provide remote console functions) even after the worst of software failures. A further general overview of the input flow from the modem 149 to the SMM 212 software for remote console operation is discussed in conjunction with FIG. 2B.

The SMM 212 software of the CPU 50 contains code for communicating with the IRC 170. The CPU 50 sends and receives data control through PCI bus 117 accessible registerswithin the IRC 170. This allows the SMM 212 software to monitor data received by the virtual keyboard 204, and to provide data to the virtual keyboard 204, which it will in turn send to the 8042 keyboard controller 156 when no other keyboards 157 or 159 are connected. Further, the SMM 212 software communicates with the virtual keyboard controller 206, for providing data at a time when a keyboard is attached for reset and initialization.

The primary keyboard 157 and secondary keyboard 159 are provided as two separate keyboards for alternate access to the system S. This would be used, for example, in a server that not only had a keyboard connection in the rear for standard keyboard connection, but also a keyboard connection in front for "walk up" connection by a user. Using the switching circuitry of the IRC 170, the appropriate keyboards can be selected, and each can be hot plugged and unplugged.

The IRC 170 also includes video snoop/encoding circuitry 202. One part of remote console is the ability of the SMM 212 software to receive instructions from a remote terminal over the modem 149. Another part of remote console is providing video data to that external system. It is desirable that this data be provided quickly, and to this end, the video snoop/encoding circuitry 202 monitors the PCI bus 117 for transactions destined for the video controller 140. As long as the system S is in text mode, the snoop/encoding circuitry 202 then compresses those video commands and data directed to the video controller 140 and then sends them over the modem 149. This process is further outlined in general below in FIG. 2C, and is discussed in detail in the previously incorporated U.S. application entitled "Video Eavesdropping and Reverse Assembly to Transmit Video Action to a Remote Console."

Turning now specifically to FIG. 2A, the curved line between the 8042 keyboard controller 156 and the primary keyboard 157 illustrates the data flow when the primary keyboard 157 is plugged into the system S, and a user is not operating in a remote console mode through the modem 149. In FIG. 2A, serial data is simply passed directly between the primary keyboard 157 and the 8042 keyboard controller 156. It is, however, "snooped" by the virtual keyboard 204, so the state of the primary keyboard 157 is thus tracked by the SMM 212 software through system management interrupt from the IRC 170 to the CPU 50. Based on this tracked state, the virtual keyboard controller 206 can initialize a secondary keyboard 159 to the state of the primary keyboard 157 should the primary keyboard 157 be disconnected. The secondary keyboard 159 can then be directly connected to the 8042 keyboard controller 156, with all of the display lights, repeat rates, and other keyboard features initialized to the previous state of the primary keyboard 157.

Turning to FIG. 2B, the data flow during remote console mode is illustrated. Remote console mode should generally be robust enough to operate even if the system software, including operating system software, has completely failed. Therefore, it should bypass as much of the standard operating system software as possible. Attention is first directed to the virtual COM device 200. Assume, for example, that the operating system is running normally, and an application program desires to obtain control of the modem 149. In that case, the operating system, through a device driver, will attempt communication via I/O commands with the modem 149. Such an access, should the IRC 170 be absent or disabled, would result in a subtractive decode by the PCI-EISA bridge 130, and in turn a passing of the command, such as a read of the modem status register, to the modem 149.

Instead, assume the virtual COM device 200 comes into play. It monitors for any access by the CPU 50 to one of the COM ports that access the modem 149. On such an I/O access over the PCI bus 117, the virtual COM device 200 positively decodes that address, preventing the PCI-EISA bridge 130 from subtractively decoding that address. In a first case, assume the IRC 170 and the SMM 212 software have no reason to block the system's access to the modem 149. The virtual COM device 200 then resends the I/O access over the PCI bus 117 to the modem 149. Subsequent accesses to the modem 149 are subtractively decoded by the PCI-EISA bridge 130.

Assume, however, that the SMM 212 software has determined that the operating system should have no access to the modem 149. In that case, when the CPU 50 attempts to access a COM port for the modem 149, the virtual COM device 200 positively decodes that PCI bus 117 address, and then responds to the CPU 50 in a way so that the modem 149 appears absent. The CPU 50 and the operating system software it is running then assumes the modem 149 has been unplugged or is otherwise absent. While in this mode, the IRC 170 waits for a call from a remote console over the modem 149. When that call arrives, the IRC 170 monitors the interrupt request line corresponding to the modem 149, and when it is activated, forces an SMI to CPU 50. Then assume data is arriving from the modem 149, first assuming American National Standards Institute (ANSI) data. ANSI data is not an appropriate format for keyboard communications with the system S, because the 8042 keyboard controller 156 expects keyboard scan codes. Therefore, this ANSI data must be converted into keyboard scan codes. (Of note, a proprietary, non-ANSI scheme can instead be used, but this would require specialized dial-in software.) So, in FIG. 2B, the ANSI data from the modem 149 is provided over the PCI bus 117 ultimately to the SMM 212 software. Routines within the SMM 212 software then convert that ANSI data into appropriate keyboard scan code data. This scan code data is then written over the PCI bus 117 to the virtual keyboard 204 within the IRC 170. Of note, when remote console mode was entered, the primary keyboard 157 was automatically detached from the 8042 keyboard controller 156 by multiplexers within the IRC 170 and replaced by the virtual keyboard 204. Therefore, instead of the primary keyboard 157 providing the keyboard data, the keyboard data is provided through the keyboard scan codes from the SMM 212 software to the virtual keyboard 204. The 8042 keyboard controller 156 then receives these scan codes, and the data is again transmitted as system scan code data to the running system software. Note that this path provides a virtually decoupled path through which the modem ANSI data is converted to scan code data and provided through the 8042 keyboard controller 156, which is essentially an unchanged part of the system. Alternatively, a remote user can "hot key" to a low level mode within the SMM 212 software itself, such as when the system S has failed. In this mode, the user can remotely restart the system.

At this point, a distinction must be made between keyboard scan codes and system scan codes. In a standard IBM compatible PC, the communications between the keyboard and 8042 keyboard controller are in the form of keyboard scan codes. The 8042 keyboard controller then appropriately converts those keyboard scan codes into system scan codes, transmitting those system scan codes to the basic input/output system (BIOS), which converts those system scan codes to ASCII characters. In this discussion, the keyboard scan codes are of primary interest, because the communications that are discussed are between either a virtual or physical keyboard and a virtual or physical 8042 keyboard controller.

Turning to FIG. 2C, a corresponding data path is shown for the video data during remote console operation. Shown from the CPU 50 (dotted line) is a stream of PCI cycles destined for the video controller 140. The IRC 170, however, snoops this data, encodes it, and then compresses it in the video snoop/encode block. That encoded and compressed video data is then provided to the SMM 212 software. That data is then at appropriate intervals transmitted over the modem 149 to the remote console. In this way, compressed data is sent over modem 149 representing a full text screen.

Figure 2D:
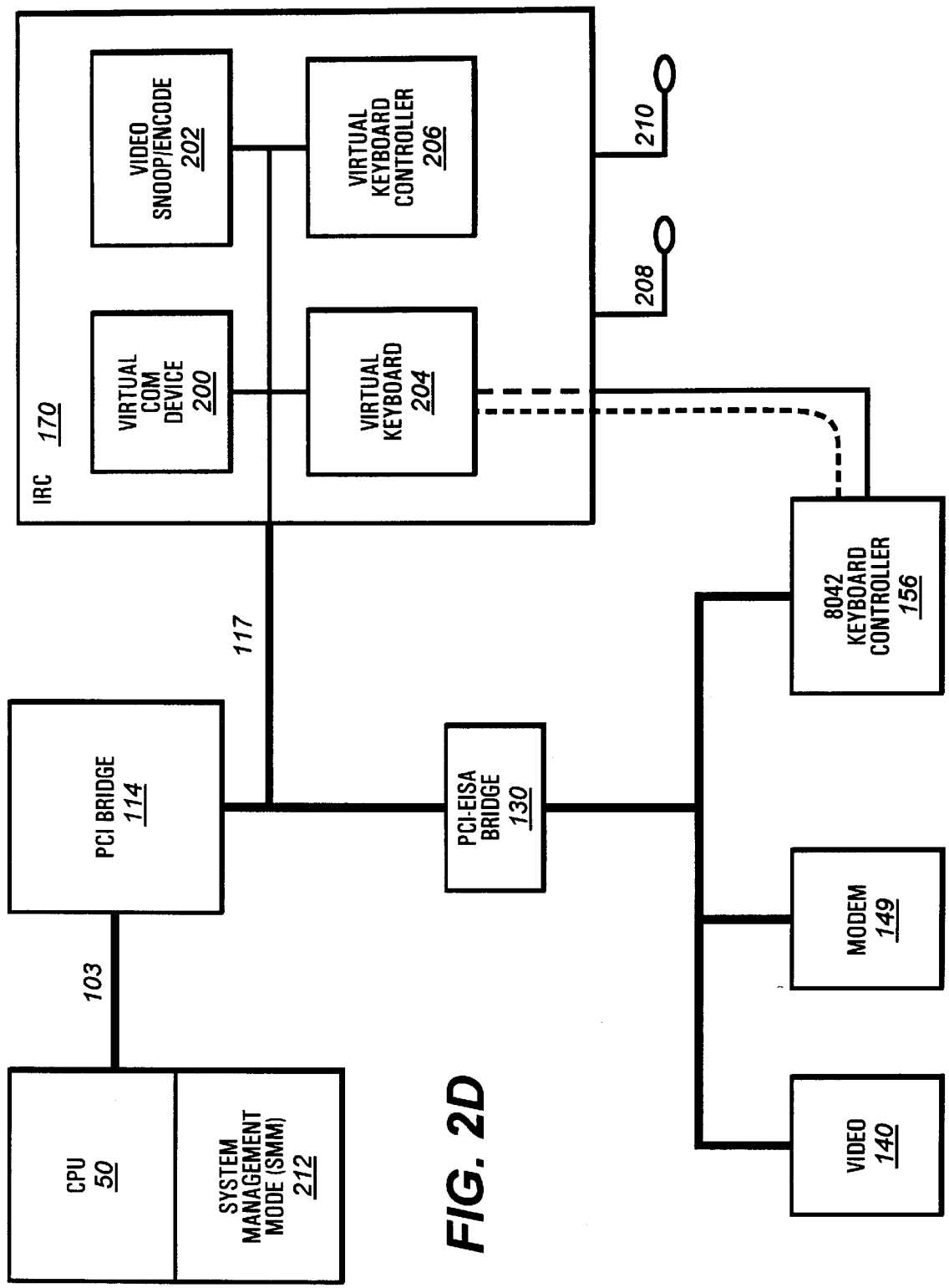

Finally, FIG. 2D illustrates the data flow when neither of the keyboards 157 or 159 are attached to the IRC 170, and the system S is not operating in remote console mode. In this case, all that is necessary is the virtual keyboard 204 to receive data from and provide appropriate responses to the 8042 keyboard controller 156. Through software control of the SMM 212, the virtual keyboard 204 provides appropriate responses when the CPU 50 executes its POST code. This allows the CPU 50 to boot, believing a physical keyboard is present, when that is not actually the case. The interface from the 8042 keyboard controller 156 to the CPU 50, however, requires no hardware modifications to present this virtual keyboard 204. Instead, the 8042 keyboard controller 156 simply needs to be wired to the IRC 170. This is preferably done during the design of the boards themselves, but could alternatively be done using a jumper.

In view of the above FIGS. 2A–2C, one will appreciate that the remote console system provides an inexpensive yet robust means for a dial-in terminal to access the system S in a secure mode over a shared modem 149 to monitor the status of the system S. Note that the modem 149 can be a standard modem, and can in fact be shared with other functions of the system S. Further, no separate microprocessor is needed, and instead the SMM 212 software provides the isolation necessary for server monitoring the system management mode functionality. Finally, seamless keyboard hot plugging and unplugging is supported, the virtual keyboard 204 used for keyboardless booting/operation also provides a remote console data stream from the modem 149 to the SMM 212 software to the virtual keyboard 204 and on to the 8042 keyboard controller 156. In this way, although a dial-in modem may use ANSI data streams, the system ultimately sees it simply as keyboard input into its 8042 keyboard controller 156. Therefore, standard SMM 212 software system monitoring software can be used for low level monitoring of the system S, as the modem 149 becomes transparent to that portion.

Implementation and Operation of the Hardware Portion

Figure 3:
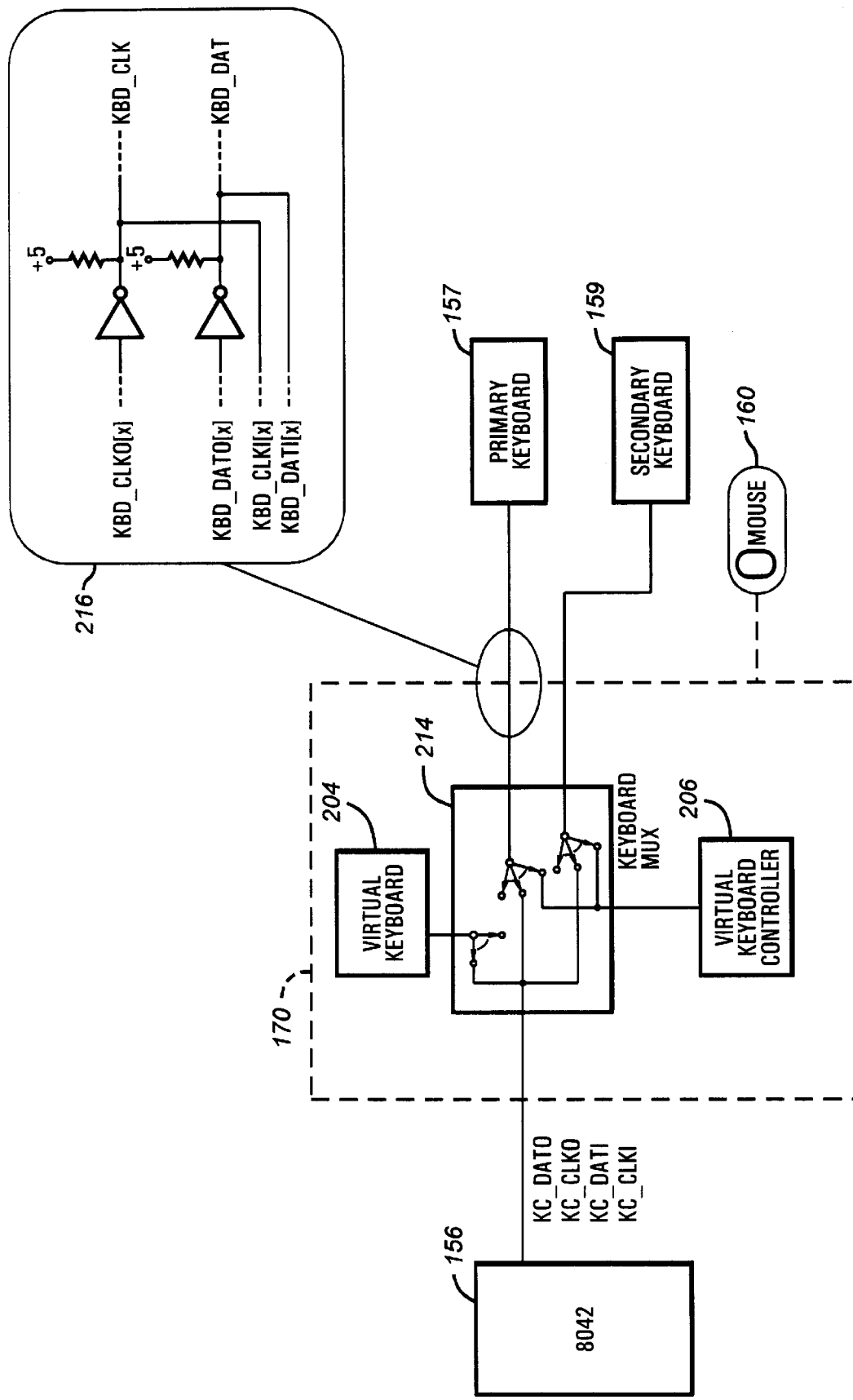
FIG. 3 is a block diagram illustrating the switching within the integrated remote console chip according to the disclosed embodiment.

Turning to FIG. 3, a simplified block diagram is shown illustrating the basic components of the IRC 170, the IRC 170 connections to the 8042 keyboard controller 156, and the IRC 170 connections to the primary and secondary keyboards 157 and 159.

Internal to the IRC 170 are the virtual keyboard 204, and the virtual keyboard controller 206, both previously discussed. These blocks are routed by a keyboard multiplexer block 214. As seen in the simplified diagram, the 8042 keyboard controller 156 can be alternately connected to the virtual keyboard 204, the primary keyboard 157 or the secondary keyboard 159. Two switches 205 and 207 are shown internal to the keyboard multiplexer block 214. The two switches 205 and 207 function together as a keyboard switch, switching the 8042 keyboard controller 156 from the virtual keyboard 204 to the primary keyboard 157. The switch 207 also functions as a virtual keyboard controller switch, switching the primary keyboard 157 from the 8042 keyboard controller 156 to the virtual keyboard controller 206. For later discussion, it is noted that internal to the IRC 170, keyboard control signals KC_DATO, KC_CLKO, KC_DATI, and KC_CLKI provide the connections to the 8042 keyboard controller 156. The first two of these signals are output by the 8042 keyboard controller 156, while the second two of these signals are input to the 8042 keyboard controller 156. As will be understood by one knowledgeable about keyboards and keyboard controllers, the first two of these signals are typically provided to open collector inverting buffers that in turn connect to the bidirectional keyboard clock and data lines. The latter two of these signals are directed connected to those keyboard clock and data lines. Further, these bidirectional lines are pulled up. So, the output signals are inverted before being provided to the keyboard bus, while the inputs are received uninverted. In this way, the bidirectional keyboard lines are divided into separate input and output lines.

This aspect is further reflected by the block 216 illustrating how the internal keyboard clock output and keyboard data output signals KBD_CLKO[x] and KB_DATO[x] are provided to open collector inverting outputs, whereas the keyboard clock input and keyboard data input signals KBD_CLKI[x] and KBD_DATI[x] are directly connected to the keyboard clock and data lines KBD_CLK and KBD_DAT. Circuitry internal to the IRC 170 is provided for both the primary keyboard 157 and the secondary keyboard 159. Thus, when a signal corresponding to the 8042 keyboard controller 156 clock and data output is provided as low, either by the 8042 keyboard controller 156 or internal to the IRC 170, the corresponding keyboard clock or data signal will be high unless pulled low by an external source. If such an output signal is provided high, however, the corresponding bidirectional signal will be driven low by the inverting output buffers. Thus, if any output signal coupled to a keyboard clock or data line is high, the corresponding clock or data line is forced low.

It will further be understood that the virtual keyboard controller 206 can be alternately connected to the primary keyboard 157 or the secondary keyboard 159.

Figure 8:
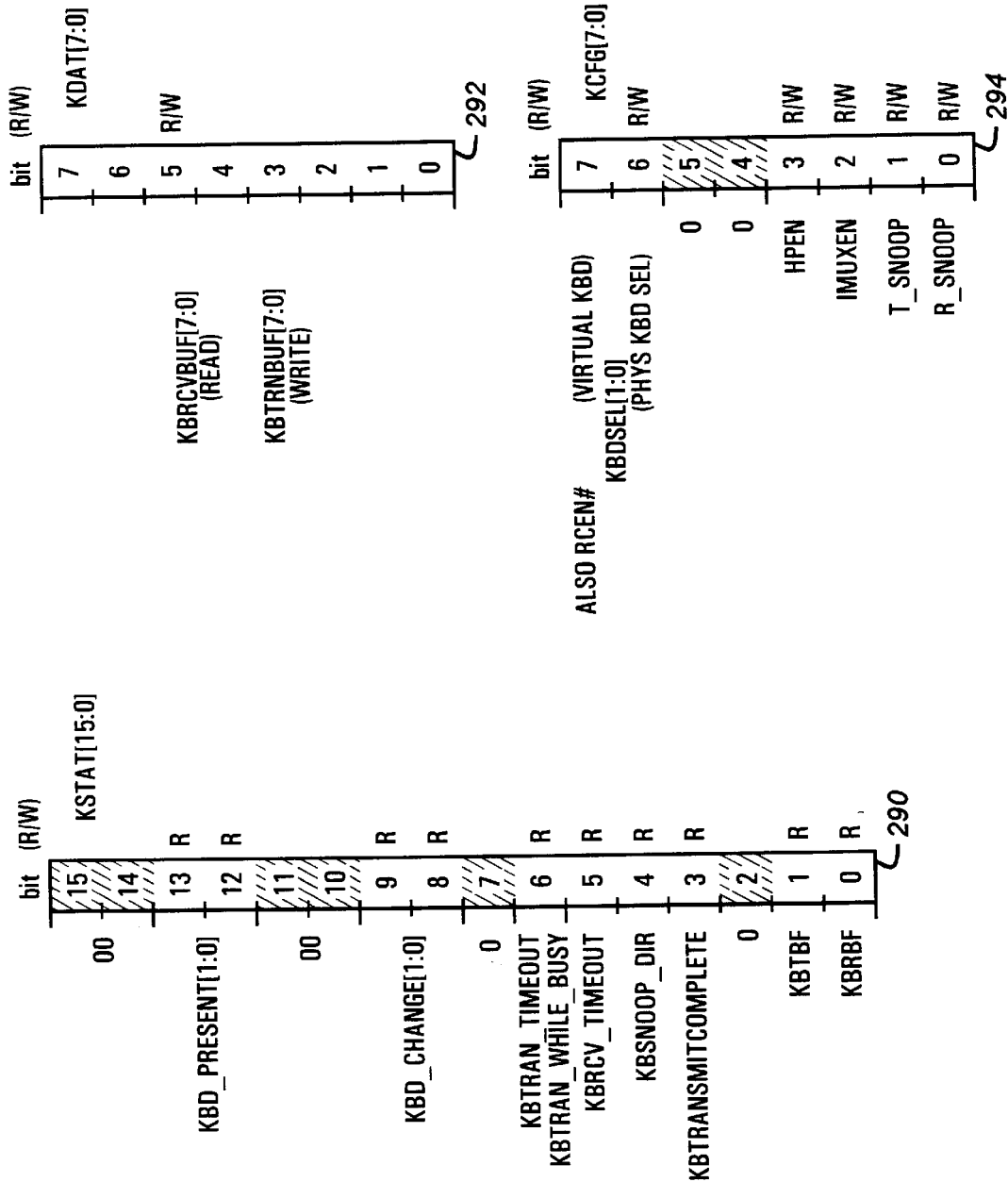
FIGS. 8 and 9 are block diagrams illustrating registers within the integrated remote console according to the disclosed embodiment accessible by the CPU over the PCI bus.
Figure 9:
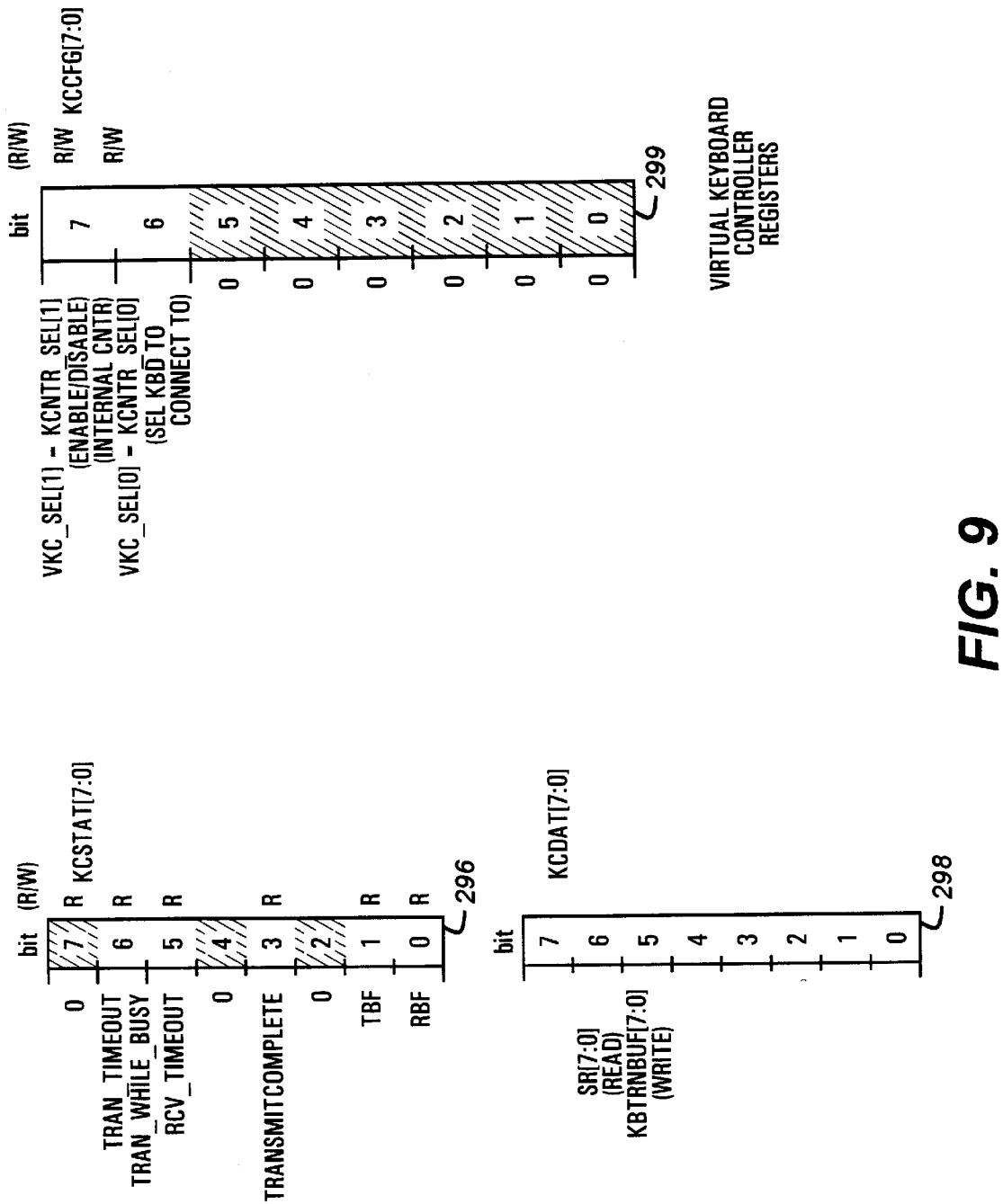

According to the invention, the IRC 170 includes a number of registers that can be written to or read from by the CPU 50. This is especially done in SMM 212 software. These registers, discussed below in further detail in conjunction with FIGS. 8 and 9, provide for control of the keyboard multiplexer 214, the virtual keyboard 204, and the virtual keyboard controller 206. For example, through appropriate reads and writes from SMM 212 software, data can be written to the virtual keyboard 204 forcing the virtual keyboard 204 to send scan codes to the 8042 keyboard controller 156. Similarly, if data is sent by the 8042 keyboard controller 156, that data can be read through the registers from the virtual keyboard 204. In this way, when the 8042 keyboard controller 156 inquires whether a physical keyboard is present, such as during POST, the SMM 212 software can read that data through the virtual keyboard 204 and write an appropriate response back to the 8042 keyboard controller 156 through the virtual keyboard 204.

Similarly, through appropriate reads and writes, the SMM 212 software can write data through the virtual keyboard controller 206 out to a newly connected keyboard 157 or 159. In this way, those keyboards can be preconfigured to the current state as monitored by the virtual keyboard 204 before that new keyboard is then connected to the 8042 keyboard controller 156.

Also shown in FIG. 3 is a mouse 160. Although the techniques disclosed below are described in reference to the primary keyboard 157 and secondary keyboard 159, it will be appreciated that the techniques have application towards other serial I/O devices, such as the mouse 160.

Standard Hot Plug Sequence

This sequence of events is further reflected in FIGS. 4A through 4C, simplified block diagrams illustrating a sequence of operations in which the primary keyboard 157 is connected. In FIG. 4A, no keyboard is connected. Assume that the computer system S has just been powered on. During the POST and OS load routines, standard computers check to ensure that a keyboard is actually connected by writing appropriate commands to the keyboard through the 8042 keyboard controller and examining the resulting signals returned by the keyboard. In this case, no keyboard is connected. Instead, the SMM 212 software has configured the IRC 170 to connect the virtual keyboard 204 to the 8042 keyboard controller 156. Therefore, when the POST or OS load I/O commands are written through the 8042 keyboard controller 156, they are trapped by the virtual keyboard 204. This in turn forces system management interrupt, or SMI, which causes the CPU 50 to enter SMM 212. As is further discussed below in the flowcharts of FIGS. 32A–D, these codes sent to the virtual keyboard 204 are then parsed by the firmware in SMM 212 software, and an appropriate response is sent to the virtual keyboard 204. The virtual keyboard 204 then sends the appropriate responsive scan codes to the 8042 keyboard controller 156, just as an actual keyboard would. The POST and OS load codes, satisfied that a keyboard is present, then continues normal operation.

Further, if the 8042 keyboard controller 156 under OS control attempts to alter the keyboard configuration through configuration commands, those codes are similarly trapped by the virtual keyboard 204 and passed to SMM 212 software. The firmware within the SMM 212 can track the current state of that non-existent keyboard.

Turning to FIG. 4B, assume that the user approaches the server and plugs in the primary keyboard 157. This plug-in sequence is detected by keyboard presence circuitry illustrated below in FIG. 6. When the keyboard's presence has stabilized, the IRC 170 not needed here forces an SMI, forcing the CPU 50 to enter SMM 212. The SMM 212 then commands the IRC 170 to connect the virtual keyboard controller 206 to the primary keyboard 157. The SMM 212 further writes a series of commands through the virtual keyboard controller 206 to the primary keyboard 157, configuring the primary keyboard 157 to match the state trapped by the virtual keyboard 204 as discussed in conjunction with FIG. 4A. Once the primary keyboard 157 is configured, turning to FIG. 4C, the SMM 212 then directs the IRC 170 to connect the primary keyboard 157 to the 8042 keyboard controller 156. Then, all communications are directed between the primary keyboard 157 and the 8042 keyboard controller 156.

In this configuration, however, the virtual keyboard 204 is placed into a "snoop" mode, where although it does not actively respond to communications between the 8042 keyboard controller 156 and the primary keyboard 157, it does track the data written to and read from the primary keyboard 157. Through SMI interrupts, the virtual keyboard 204 passes any such data to the SMM 212. This SMM 212 then tracks the state of the primary keyboard 157, so that when the primary keyboard 157 is disconnected, the state of the virtual keyboard 204, as reflected in the SMM 212, corresponds to that of the primary keyboard 157.

When the primary keyboard 157 is disconnected, the IRC 170 automatically disconnects the 8042 keyboard controller 156 from the primary keyboard 157, and then notifies the SMM 212 software. The 8042 keyboard controller 156 is then again connected to the virtual keyboard 204, as illustrated in FIG. 4A.

Thus, the system provides seamless "hot plug" capability. The virtual keyboard 204 appears to the standard system startup software without that software having to be modified. The startup software detects the presence of a keyboard, even though a physical keyboard is not present. Further, the virtual keyboard 204 tracks any configuration or state changes, such as numeric lock, or the caps lock indicator lights on a standard keyboard.

Then, when the primary keyboard 157 is plugged in, no spurious characters are transmitted to the 8042 keyboard controller 156, that newly installed keyboard is configured to match the present state, and is then seamlessly connected to the 8042 keyboard controller 156. Therefore, the hot plug ability of the keyboards is essentially transparent to the user and the system, requiring no modification of standard system code nor of the standard system hardware, down to the 8042 keyboard controller 156 level.

Alternative External Multiplexer Implementation

Figure 5:
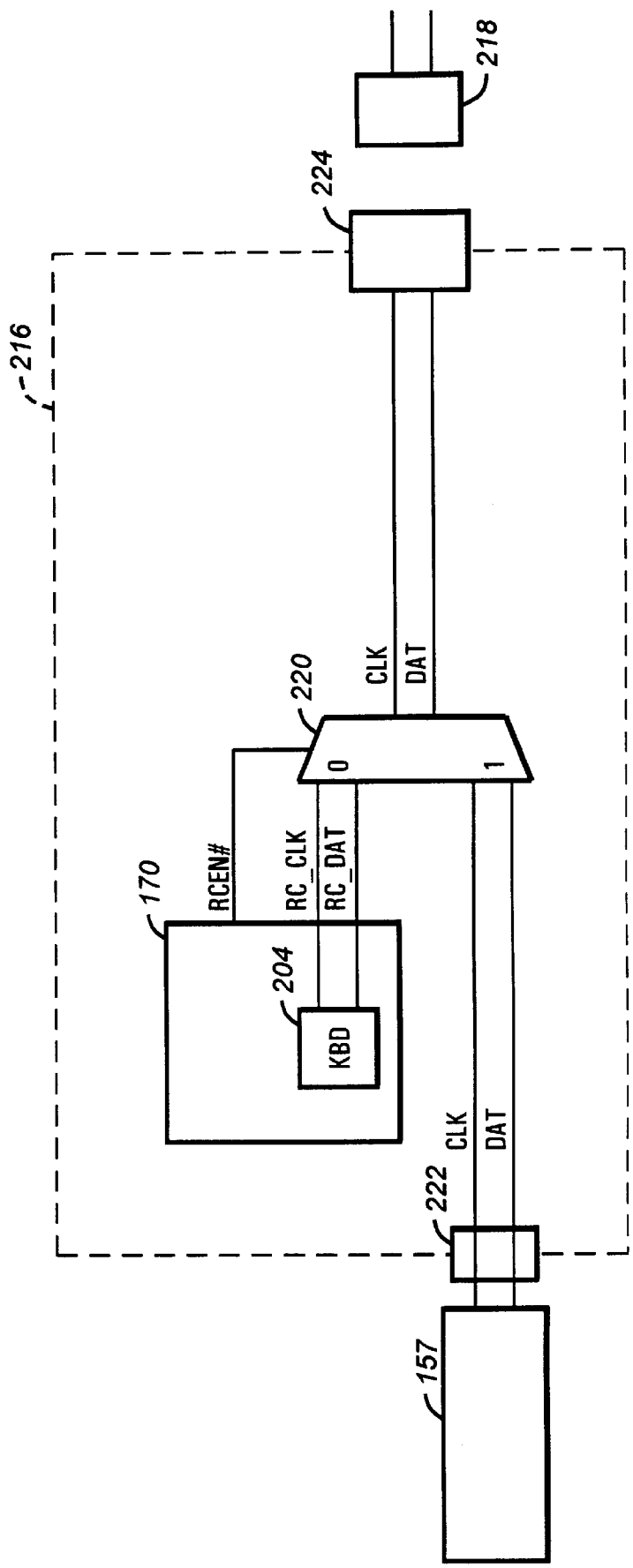
FIG. 5 is a block diagram illustrating an alternative embodiment providing hot plug and unplug capability through an external multiplexer according to the disclosed embodiment.

Turning to FIG. 5, an alternative to the previous hot-plug configuration of the IRC 170 is shown. This configuration is for a system in which the 8042 keyboard controller 156 has not been designed into the system in conjunction with the IRC 170, but the IRC 170 is instead added on, for example as a plug-in board. In this case, the 8042 keyboard controller 156 will be "hard wired" to a keyboard connector, here illustrated by block 218. In this implementation, an add-on card 216 contains the IRC 170 with its virtual keyboard 204, along with an analog multiplexer 220. Further, a bidirectional keyboard connector 222 receives the clock and data signals from the primary keyboard 157, and a bidirectional keyboard connector 224 connects to the system's bidirectional keyboard connector 218. In this implementation, the IRC 170 includes two bidirectional remote console clock and data lines RC_CLK and RC_DAT, and an analog multiplexer enable RCEN#. In this case, when RCEN# is zero, or active (signals with a # at the end are active low), the bidirectional RC_CLK and RC_DAT signals of the IRC 170 are connected to the keyboard clock and data lines of the system through the connectors 224 and 218. When RCEN# is unasserted, or 1, the primary keyboard 157 is instead directly connected to the system's keyboard input 218 by the multiplexer 220.

In this configuration, hot plug ability is not necessarily seamless, and may require slight modifications to this system's software, or the provision for spurious characters on plug and unplug. This configuration does, however, allow for booting without a keyboard. The IRC 170 asserts the RCEN# signal so that the IRC 170 provides appropriate responses through its virtual keyboard 204 on boot, forcing a keyboard to appear present and allowing boot to complete normally. Then, firmware can switch to the real keyboard.

The Presence Detect Logic

Turning to FIG. 6B, shown is a schematic illustration of circuitry used to detect the presence of a keyboard. This circuitry is preferably implemented external to the IRC 170. A principal concern for seamless hot-plug ability of keyboards is to prevent spurious characters from being generated during both the plugging and unplugging of a keyboard. Therefore, it is important that the circuitry for providing plug and unplug ability prevent such spurious characters and beeping during plug and unplug events. This circuitry also should require no modifications to the system keyboard controller, the keyboard itself, or the keyboard connector. Although hot-plug ability could be implemented by modification to these components, because they are such standard items, their modification is highly undesirable.

A "plug" event is generally controllable. Before a keyboard 157 or 159 is installed in the system, referring to previous FIGS. 3–5, it is seen that the 8042 keyboard controller 156 is coupled to the virtual keyboard controller 204 within the IRC 170. When the primary keyboard 157 is plugged-in, it is not immediately coupled to the 8042 keyboard controller 156. It is allowed to stabilize and then initialized by the virtual keyboard controller 200 before being connected to the 8042 keyboard controller 156.

An unplug event is a different matter. When the primary keyboard 157 is active, it is connected to the 8042 keyboard controller 156 as shown in FIG. 4C. If the primary keyboard 157 is unplugged without warning, spurious characters could be sent over the clock and data lines before the IRC 170 has an opportunity to decouple the 8042 keyboard controller 156 from the primary keyboard 157 itself.

To this end, the hot plug feature employs highly responsive keyboard presence logic, such as that illustrated in FIG. 6B. This circuitry, according to the invention, responds to very low currents on a keyboard voltage supply line KBD0VDD (for the primary keyboard 157) or KBD1VDD (for the secondary keyboard 159).

The data and clock interface between the 8042 keyboard controller 156 and primary keyboard 157 is a two-wire serial open collector interface. The clock and data lines are pulled up by resistors. When the primary keyboard 157 is unplugged, any one or a combination of these signals may glitch or make momentary contact until the keyboard is fully unplugged. If either the clock or data lines are pulled low during an unplug event, the 8042 keyboard controller 156 will see this as a start of transmission or reception event. Because this is a false event, the 8042 keyboard controller 156 will eventually forward an error condition of the system. This error usually manifests itself as spurious characters or a series of beeps.

But because the clock and data lines KBD_CLK[0] and KBD_DAT[0] are open collector, and only driven low during transmission and reception, a momentary contact will not cause those signals to go low. Further, a ground line GND is provided by the shield of the keyboard cable. Because of this, it is highly unlikely that the GND signal will be momentarily disconnected. Instead, the GND signal is generally the last signal so disconnected.

The supply voltage line KBD0VDD is thus the only signal likely to cause glitches on the clock and data lines. If the keyboard loses power, the clock and data signals KBD_CLK[0] and KBD_DAT[0] will become indeterminate and probably be forced to ground as their output transistors lose power. Assuming that the primary keyboard 157 is not in the middle of a transmission or reception at the time of an unplug event, it is therefore the state of the keyboard supply voltage KBD0VDD that is critical. If that voltage drops at the primary keyboard 157 before the clock and data lines disconnect, the keyboard interface signals could then be pulled low causing spurious characters or false starts. Therefore, the circuitry of FIG. 6B monitors the current flowing to the keyboard through the keyboard voltage supply. When this current drops to zero, that means that the keyboard voltage line KBD0VDD has been disconnected, and therefore the 8042 keyboard controller 156 should be immediately decoupled from the primary keyboard 157 itself.

Referring to FIG. 6A, the clock, data, ground, and supply voltage signals are illustrated as the KBD_DAT[0] signal, the KBD_CLK[0] signal, the KBD0VDD signal, and the GND signal. These correspond to the primary keyboard 157's data, clock, supply voltage, and ground lines.

Referring to the circuitry of FIG. 6B, a 5 volt supply is provided to the KBD0VDD line and the current on that line is monitored using what is effectively a differential amplifier. The secondary keyboard 159 has corresponding signals KBD_DAT[1], KBD_CLK[1], KBD1VDD, and GND.

A 12-volt supply voltage is provided through a thermistor 250, which provides over-current protection, and then through a series of current limiting resistors 252, which are coupled to ground through filtering capacitors 254, 256, and 258. The current limited voltage is then provided to the input IN of a voltage regulator 260, which is preferably the equivalent of a 7805 voltage regulator that provides a regulated 5 volts output from an output pin OUT. The ground of the voltage regulator 260 is connected to the anode of a diode 262, whose cathode is connected to ground. The anode of the diode 262 is also pulled up through a pull up resistor 264, which is in turn connected to a 5 volt source. This pull up resistor causes the anode to rise above ground by about 0.3 volts, so that the output voltage of the voltage regulator 260 is around 5.3 voltage. The significance of this becomes apparent below.

The output of the voltage regulator 260 is filtered to ground through capacitors 266, 268, and 270. The output is limited to around 5.3 volts by a diode 272, which is coupled to the 5-volt supply at its cathode.

The output voltage of the voltage regulator 260 is provided to the anodes of two diodes 274 and 276. The cathode of the diode 274 is coupled to the inverting input of an operational amplifier 278 after being passed through an input resistor 279 (preferably around 20K ohms). The cathode of the diode 276 is coupled to the non-inverting input of the op amp 278 through an input resistor 280 (again, preferably 20K ohms). The cathode of the diode 276 is also coupled to ground through a resistor 281 (preferable around 100K ohms). The output of the op amp 278 is coupled to its inverting input through a feedback resistor 282 (preferably around 2.2M ohms). That output is provided to the cathode of a Zener diode 283, which preferably has a Zener breakdown voltage of around 6.8 volts. When the op amp 278 provides a 12 volt output, the anode of the Zener diode 283 will thus be around 5 volts, providing the KBDPR0 signal at a logical true level of around 5 volts. The KBDPR0 signal is pulled low via a resistor 284 to ground.

The cathode of the diode 274 is also provided as a KBD0VDD signal through an inductor 285. Further, a diode pack 286 prevents an over voltage condition after unplugging. The significance of the diode 262 is now apparent. By forcing the voltage regulator 260 output voltage one diode drop above 5 volts, the voltage at the cathode of the diode 274 when a keyboard is attached is thus 5 volts.

In operation, the output of the voltage regulator 260 is provided to the inputs of the op amp 278 through the diodes 274 and 276, and the resistors 279 and 280. When there is no load on the KBD0VDD signal, such as when a keyboard is not attached, the non-inverting input of the op amp 278 is around 5 volts, and the inverting input of the op amp 278 is at 5 volts. Therefore, the output of the op amp 278 is stable at around 5 volts, and KBDPR0 is at a low voltage level, or false. When a keyboard is installed, current flows through the diode 274, causing an increased voltage drop. Therefore, the inverting input of the op amp 278 drops slightly relative to the non-inverting input. To compensate, the op amp 278 drives its output high (to a rail of 12 volts), given the high gain of the resistor combination 282 and 279. Thus, KBDPR0 goes to around 5 volts, or true, indicating keyboard presence.

In this way, the presence or absence of a keyboard is detected through minute changes in the current flowing through the primary keyboard 157 supply voltage KBD0VDD or the corresponding secondary keyboard 159 supply voltage KBD1VDD. This presence is indicated by the signals KBDPR0 and KBDPR1, active high signals which internal to the IRC 170 are mapped to two signals KBD_PRESEN_RAW[1:0], which are active high signals.

The Internal Blocks of the IRC 170

Figure 7:
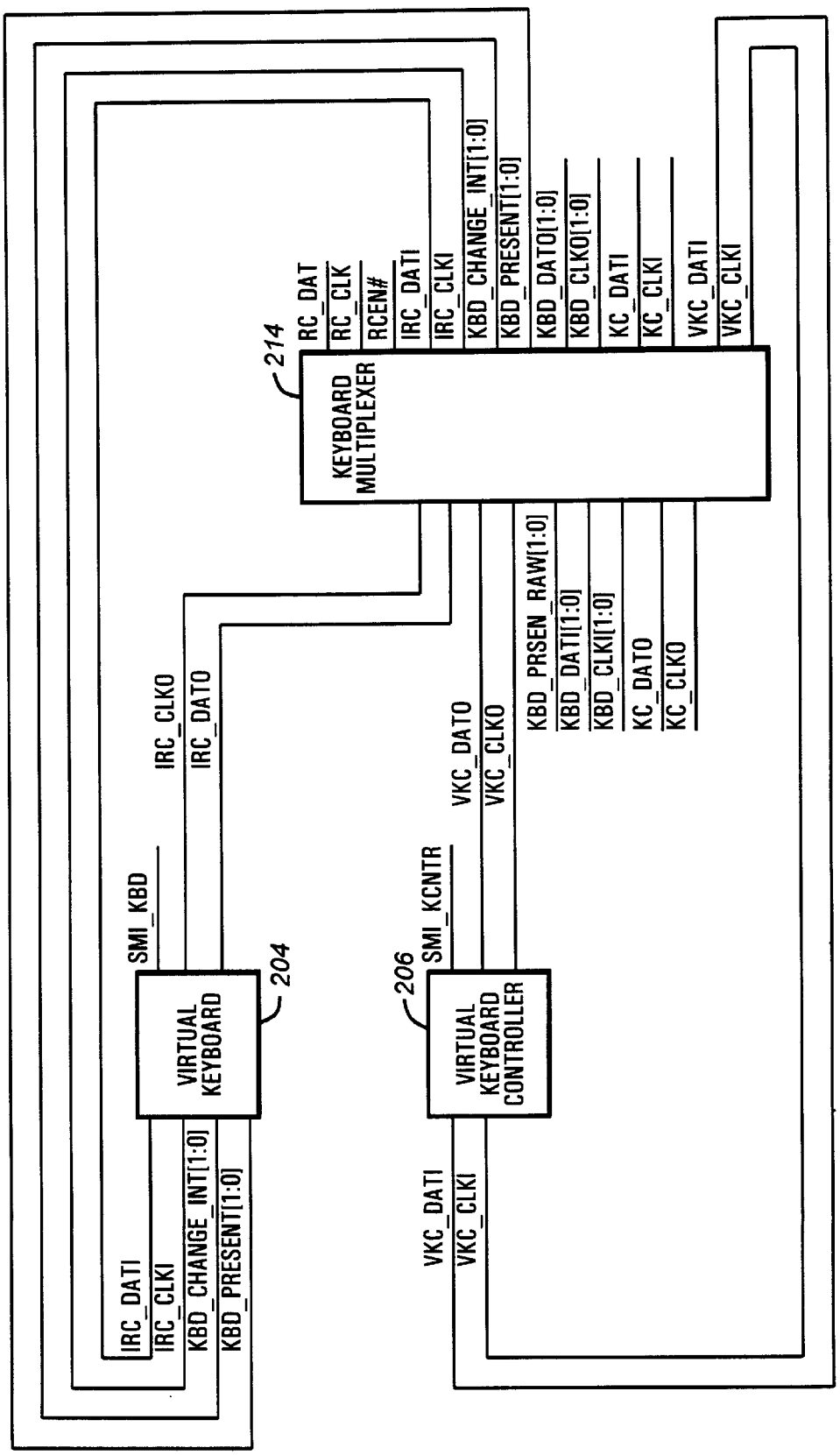
FIG. 7 is a block diagram illustrating signal interconnections of the virtual keyboard, virtual keyboard controller, and keyboard multiplexer in the integrated remote console according to the disclosed embodiment.

Turning to FIG. 7, pertinent internal logic blocks of the IRC 170 are shown. The IRC 170 is preferably implemented in the form of an application specific integrated circuit (ASIC), which includes additional functionality as discussed in conjunction with FIGS. 2A–2C. Of principal interest in the disclosed embodiment are the virtual keyboard 204, the virtual keyboard controller 206, and the keyboard multiplexer 214.

A number of signals and registers provided by the CPU 50 through reads and writes to I/O registers are not shown in FIG. 7. These are discussed below in conjunction with the specific blocks. Instead, principal signals interconnecting the blocks are illustrated. The virtual keyboard 204 receives integrated remote console data and clock input signals IRC_DATI and IRC_CLKI. These are provided by the keyboard multiplexer 214 and, when selected provide input signals from the 8042 keyboard controller 156. The virtual keyboard 204 provides similar keyboard output signals, integrated remote console output signals IRC_CLK[0] and IRC_DAT[0].

The virtual keyboard 204 also provides as an output a keyboard system management interrupt signal SMI_KBD. This signal is provided to system management interrupt generation logic which is not shown, but when true, forces a system management interrupt to the CPU 50, which then enters the SMM 212. Although further dependent on various mask registers, in standard operation the SMI_KBD signal causes such an interrupt.

The virtual keyboard 204 also receives from the keyboard multiplexer 214 keyboard change interrupt signals KBD_CHANGE INT[1:0] and keyboard presence signals KBD_PRESENT[1:0]. The two bits in each of these signals correspond to secondary keyboard 159 and primary keyboard 157, respectively. The KBD_CHANGE_INT signals cause an interrupt when true, indicating a plug or unplug status change for the corresponding keyboard. These signals are readable through I/O registers in the IRC 170, as discussed below in conjunction with FIG. 8.

The KBD_PRESENT signals similarly indicate whether the corresponding keyboard is connected to the IRC 170 and can also be read through an I/O port. These two sets of signals together are used to detect both a change in status, and what the resulting status is—i.e., a plug event or an unplug event.

Turning to the virtual keyboard controller 206, that block similarly receives as inputs virtual keyboard controller clock and data lines VKC_DATI and VKC_CLKI from the keyboard multiplexer 214. As with the virtual keyboard 204, the virtual keyboard controller 206 also provides corresponding outputs VKC_DATO and VKC_DATO to the keyboard multiplexer 214. The virtual keyboard controller 206 also provides a virtual keyboard controller SMI signal SMI_KCNTR, similar to the SMI_KBD signal.

Turning to the keyboard multiplexer 214, this block includes a number of inputs and outputs in addition to the previously discussed signals. The raw keyboard presence signals discussed in conjunction with FIG. 6B are provided as inputs to the keyboard multiplexer 214 as the signals KBD_PRSEN_RAW[1:0]. Further, the actual physical keyboards, primary keyboard 157 and secondary keyboard 159, provide their data and clock inputs as the signals KBD_DATI[1:0] and KBD_CLKI[1:0]. As outputs, the keyboard multiplexer 214 correspondingly provides signals for those keyboards KBD_DATO[1:0] and KBD_CLKO[1:0]. As discussed above, the physical lines of the primary keyboard 157 and secondary keyboard 159 are actually bidirectional, but internal to the IRC 170, these four clock and data inputs and outputs are combined as illustrated in block 216 of FIG. 3.

Further, the keyboard multiplexer 214 receives the 8042 keyboard controller 156 signals KC_DATO and KC_CLKO, which are inputs to the keyboard multiplexer 214 because they are output from the 8042 keyboard controller 156. The corresponding inputs to the 8042 keyboard controller 156 are provided as outputs by the keyboard multiplexer 214 as the signals KC_DATI and KC_CLKI. The standard 8042 keyboard controller 156 includes separate unidirectional input and output signals, so the block circuitry 216 is not applicable to the interface between the 8042 keyboard controller 156 and the signals in the keyboard multiplexer 214.

Finally, to effect the operation illustrated in FIG. 5, the keyboard multiplexer 214 provides RC_DAT, RC_CLK, and RCEN# signals, which are remote console bidirectional data, and clock lines, and an integrated remote console external multiplexer 220 enable line. These signals, when coupled to the other signals within the IRC 170, are provided through combinational circuitry as illustrated in block 216, so again, these signals are actually bidirectional.

At this point, the logic levels of the various input and output signals corresponding to bidirectional keyboard data lines should be discussed. Referring to the block 216, it is seen that of the unidirectional signals that correspond to bidirectional clock and data lines, the input at the same polarity as the actual bidirectional clock and data lines, while the outputs are at the inverse polarity. Therefore, in discussing the various signals being transmitted between the virtual keyboard 204, the virtual keyboard controller 206, the keyboard multiplexer 214, the external keyboards 157 and 159, and the 8042 keyboard controller 156, it is important to remember that in general, the output signals are provided such that when the output is high, the signal is driven low; but when the output is low, the signal should be floated. With this in mind, the negation of various signals as discussed in conjunction with the keyboard multiplexer 214 will be better understood.

As previously discussed, the KC_DATO, KC_CLKO, KC_DATI, and KC_CLKI signals from the 8042 keyboard controller 156 can be selectively coupled to either the IRC_DATI, IRC_CLKI, IRC_CLKO, and IRC_DATO signals for virtual keyboard 204 operation, or to the selected physical keyboard 157 or 159 through the KBD_DATI, KBD_CLKI, KBD_DATO, and KBD_CLKO signals. These latter keyboard signals can also be connected to the virtual keyboard controller 206 VKC_DATI, VKC_CLKI, VKC_DATO, and VKC_CLKO signals that correspond to the virtual keyboard controller 206. By appropriate selection of configuration bits, the secondary keyboard 159 can be coupled to the virtual keyboard controller 206 at the same time that the 8042 keyboard controller 156 is connected to the primary keyboard 157. (See the configuration of FIG. 2A.)

The details of buffering circuitry has been omitted for clarity with respect to external signals on the IRC 170, but all of these will be understood by those familiar with ASIC design. Further, in the discussion of the circuitry that follows, various test vectors as well as initial configuration vectors have been omitted for clarity. On reset signals will be set to appropriate states, but the circuitry for doing so is omitted, as it is unnecessary to the understanding of the invention. Its implementation will be readily understood by one of ordinary skill in the art in circuitry design.

IRC 170 Registers

Turning to FIGS. 8 and 9, shown are the register contents used for accessing various pertinent features within the IRC 170. These registers are accessed through input/output commands over the PCI bus 117. The circuitry for performing these register accesses is not shown, but is well known to one of ordinary skill in the art. These registers allow for reading from and writing to various features of the virtual keyboard controller 206 and the virtual keyboard 204. Further, these registers provide for the routing of signals within the keyboard multiplexer 214.

These registers are discussed before the internal circuitry of the IRC 170 because they provide a frame of reference for how the SMM 212 software perceives the functionality of the IRC 170. The IRC 170 communicates with the keyboards 157 and 159, the keyboard controller 156, and the SMM 212 software. The former two interfaces will be readily understood in the discussions of the virtual keyboard 204 and the virtual keyboard controller 206 (FIGS. 15–26); the remaining interface is with the SMM 212 software, and this interface is affected through the registers of FIGS. 8 and 9 appearing over the PCI bus 117.

Again, while the emulation of the virtual keyboard 204 and the virtual keyboard controller 206 is provided in the form of an interface found within the IRC 170, the actual logic of what scan code should be sent in response to a particular sequence of scan codes, and what the state of the virtual keyboard 204 is, is found within the SMM 212 software. Thus, according to the disclosed embodiment, the keyboard emulator and the keyboard controller emulator are split in functionality between the hardware of the IRC 170 and the software found in the SMM 212. Note, this split functionality could be altered without parting from the spirit of the invention. For example, more of the functionality could be implemented in the software, or instead, more of the functionality could be totally implemented in a more sophisticated application specific integrated circuit.

Keyboard Related Registers

Turning to FIG. 8, a keyboard status register KSTAT [15:0] 290 provides the status of both the presence and changed keyboard connection status of the primary keyboard 157 and the secondary keyboard 159 as well as various status concerning the virtual keyboard 204. Two keyboard presence signals KBD_PRESENT[1:0] provide the KSTAT[13:12] bits. These bits indicate whether the IRC 170 considers the secondary keyboard 159 and the primary keyboard 157 to be logically present, with one bit for each keyboard. Logical presence is different from physical presence, because when a keyboard is first plugged in, the IRC 170 gives it time to stabilize before it is deemed logically present. When one of these bits is set, that indicates the logical presence of the corresponding keyboard; when cleared, that indicates the logical absence of the corresponding keyboard.

Two keyboard status change signals KBD_CHANGE [1:0] (provided as the KSTAT[9:8] bits) indicate whether the IRC 170 has detected a plug or unplug event on the corresponding keyboard. These bits can be used in conjunction with the keyboard presence signals KBD_PRESENT [1:0] to determine when a keyboard has been plugged in or unplugged. Further, the assertion of the KBD_CHANGE [1:0] signals cause an SMI interrupt.

The remaining signals in the KSTAT register 290 relate to the operation of the virtual keyboard 204. A transmit operation failed bit (KSTAT[6]) indicates an error condition has occurred while trying to transmit a scan code from the virtual keyboard 204 to the 8042 keyboard controller 156. This condition is true on a transmit timeout, indicated by an internal IRC 170 signal KBTRAN_TIMEOUT, or when a transmit is attempted while the 8042 keyboard controller 156 is itself transmitting to the virtual keyboard 204, indicated by a KBTRAN_WHILE_BUSY signal. This bit is cleared and the KSTAT register 290 is read by the CPU 50. When the virtual keyboard 204 is in snoop mode, rather than active mode, thus tracking transactions between the 8042 keyboard controller 156 and one of the keyboards 157 or 159, this bit indicates that the state machine discussed below in conjunction with FIG. 21 has observed a transmit timeout occurring from the selected keyboard 157 or 159, to the 8042 keyboard controller 156. A receive timeout bit (KSTAT [5]) similarly indicates a timeout while the virtual keyboard 204 is waiting to receive a scan code from the 8042 keyboard controller 156. This is indicated by an internal IRC 170 signal KBRCV_TIMEOUT. When in snoop mode, this bit instead indicates the virtual keyboard 204 has observed, or "snooped," timeout from the 8042 keyboard controller 156 to the selected keyboard 157 or 159. This bit is also cleared by reading the KSTAT register 290. A snoop direction bit (KSTAT[4]), provided by a KBSNOOP_DIR signal, indicates whether a snooped transmission was from the selected keyboard 157 or 159 or from the 8042 keyboard controller 156. This bit, when high, indicates that data was sent by the selected keyboard 157 or 159 to the 8042 keyboard controller 156; when low, that indicates a snoop of a transaction in the other direction. A transmit complete bit (KSTAT[3]), corresponding to a KB TRANSMITCOMPLETE signal, indicates that a pending keyboard scan code has been successfully transmitted from the virtual keyboard block 204 to the 8042 keyboard controller 156. A transmit buffer full bit (KSTAT[1]) signal provided by a KBTBF, indicates that data is still in the virtual keyboard 204 transmit buffer ready to be transmitted to the 8042 keyboard controller 156. This data is initially written for transmission by a write to a keyboard data register KDAT[7:0] 292 discussed below. Similarly, a receive buffer full bit (KSTAT[0]) provided by a KBRBF signal, indicates that when true that the virtual keyboard 204 has detected a transmission of scan code data from the 8042 keyboard controller 156 to the virtual keyboard 204. Software in the SMM 212 must read this value and transmit an acknowledge scan code (0FAh) within 14 milliseconds of receiving the character. Bits in the KSTAT register 290, when they transition to true, typically initiate an SMI interrupt so that the system management mode firmware 134 can take appropriate actions.

The keyboard data register KDAT[7:0] 292 is written to transmit data from the virtual keyboard 204 to the 8042 keyboard controller 156, and is read from to receive data from the 8042 keyboard controller 156 to the virtual keyboard 204. A read from this register is typically used to detect command sequences sent to keyboards, such as for turning the LEDs on and off. A write to the register causes the virtual keyboard 204 to clock the contents of this register to the 8042 keyboard controller 156 at the next available opportunity. If data is being received from the 8042 keyboard controller 156 when data is written to the KDAT register 292, the reception from the 8042 keyboard controller 156 will continue and the transmission from the virtual keyboard 204 will be cancelled. Then, the transmit error bit KSTAT[6] is correspondingly set because the KBTRANSMIT_WHILE_BUSY signal will be true.

A keyboard configuration register KCFG[7:0] 294 is provided to select both the routing within the multiplexer 214 and to control other keyboard related aspects of the IRC 170. Two keyboard select signals KBD_SEL[1:0] select whether the virtual keyboard 204 or one of the physical keyboard connectors connecting to the keyboard 157 or 159 are to be coupled to the 8042 keyboard controller 156. The KBD SEL[1] signal, when true, enables the virtual keyboard 204, coupling that circuitry to the 8042 keyboard controller 156. The KBD_SEL[0] signal selects which of the two keyboard interfaces for the keyboards 157 or 159 is to be connected to the 8042 keyboard controller 156. If this bit is zero and the virtual keyboard signal KBD SEL[1] is zero, the primary keyboard 157 is selected. If this bit is one while the KBD_SEL[1] signal is zero, then the secondary keyboard 159 is selected.

A hot plug enable signal HPEN, when true, sets the IRC 170 to respond to plug and unplug events by generating an appropriate SMI interrupt. When this bit is cleared, the KBD_PRESENT signals in the KSTAT[13:12] bits are instead ignored.

An internal multiplexer enable signal IMUXEN (the KCFG[2] bit), when true, enables the internal multiplexing functions of the multiplexer 214. When this bit is false, the IRC 170 disables its internal multiplexer functions and is instead configured for use with the external multiplexer 220 of FIG. 5. In this configuration, the KBD_SEL[1] bit of the KCFG register 294 also controls the RCEN# signal of FIG. 5.

A transmit snoop signal T_SNOOP and a receive snoop signal R_SNOOP (the KCFG [1:0] bits) enable or disable transmit and receive snooping. When one of these bits is set, a corresponding transaction, when it occurs, will be "snooped." That is, the virtual keyboard 204 will not respond to the transaction but will instead snoop the transmitted data into the keyboard data register KDAT 292. The IRC 170 will generate an SMI interrupt placing the CPU 50 into system management mode 212, allowing it to monitor the keyboard traffic for various functions, such as to properly track the state of the keyboard LEDs, typomatic rate, etc., and also to monitor for hot keys that would place the system S into various operating modes.

Keyboard Controller Registers

Turning to FIG. 9, illustrated are registers within the IRC 170 relating to the virtual keyboard controller 206. A keyboard controller status register KCSTAT 296 includes bits that provide the status of the virtual keyboard controller 206. A transmit error bit (KCSTAT[6]) indicates an error occurred while trying to transmit to the selected keyboard 157 or 159. It becomes true upon a transmit timeout as indicated by a TRAN_TIMEOUT signal becoming true or when an attempt is made to transmit while data is being received from the selected keyboard 157 or 159, as indicated by a TRAN_WHILE_BUSY signal. A receive operation timeout error signal RCV_TIMEOUT (KCSTAT[5]) is true when a timeout occurs while trying to receive data from the selected keyboard 157 or 159. Both the bits KCSTAT[6:5] are cleared upon a CPU 50 read of the KCSTAT register 296.

A transmit complete signal TRANSMITCOMPLETE (KSTAT[3]) when true indicates that a scan code has been successfully transmitted from the virtual keyboard 206 to the selected keyboard 157 or 159. A transmit buffer full signal TBF (KCSTAT[1]) when true indicates that data remains to be transmitted by the virtual keyboard controller 206 to the selected keyboard 157 or 159, so additional scan codes should not yet be written to the virtual keyboard controller 206. A receive buffer full signal RBF (KCSTAT[0]) indicates that data has been fully received by the virtual keyboard controller block KCNTR 206 from the selected external keyboard 157 or 159, and is ready to be read through a KCDAT register 298.

That keyboard controller data register KCDAT[7:0] 298 returns the contents received from the selected external keyboard 157 or 159 by the virtual keyboard controller block KCNTR 206. This data is held in a shift register SR[7:0]. When the KCDAT register 298 is written to, the data is placed within a transmit buffer KTRNBUF[7:0] for transmission to the selected external keyboard 157 or 159.

As with the virtual keyboard 204, a change in the status of the bits in the KCSTAT register 296 causes an SMI interrupt, forcing the CPU 50 into the system management mode 212, so that appropriate action can be taken.

A keyboard controller configuration register KCCFG[7:0] 299 provides control of the inner connections between the virtual keyboard controller 206 and the external keyboard 157 or 159. Two select signals KCNTR_SEL[1:0] (as provided in KCCFG[7:6]) select whether the virtual keyboard controller block KCNTR 206 is enabled, and to which external keyboard 157 or 159 is connected. When the KCNTR_SEL[1] signal is zero, then the virtual keyboard controller 206 is disabled; otherwise, it is enabled. When the virtual keyboard controller 206 is enabled, the KCNTR_SEL[0] signal selects which keyboard is coupled to the virtual keyboard controller 206. A zero written to this bit selects the primary keyboard 157; and a one in this bit selects the secondary keyboard 159.

The Keyboard Multiplexer 214

Turning to FIGS. 10–14, illustrated is various circuitry implemented within the keyboard multiplexer 214. Beginning with FIG. 10, a schematic illustration is shown of various multiplexers and other circuitry used to generate KBD_CHANGE_INT[1:0] signals and KBD_PRESENT [1:0] signals of FIG. 7. Illustrated is the circuitry used to generate a KBD0_PRES signal, which corresponds to the KBD_PRESENT[0] signal, and a KBD0_CHANGE_INT signal, which corresponds to the KBD_CHANGE_INT[0] signal. Corresponding circuitry is used to generate the KBD_PRESENT[1] signal and the KBD_CHANGE_INT[1] signal. This circuitry is not shown, but will be readily understood by review of the circuitry of FIG. 10.

Figure 10:
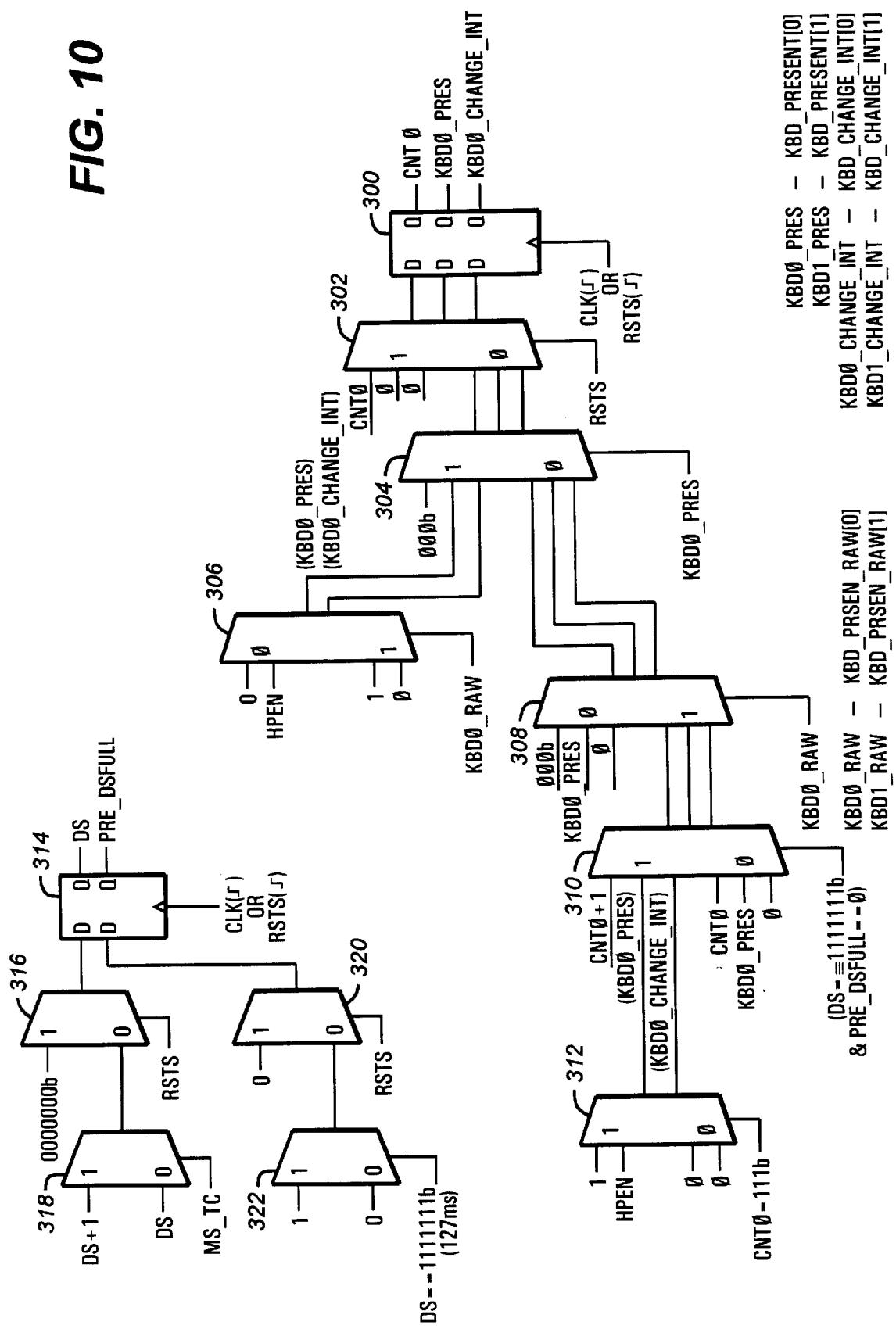
FIG. 10 is a schematic illustration of circuitry used to provide keyboard presence and keyboard presence change information in the integrated remote console according to the disclosed embodiment.

The circuitry shown in FIG. 10 also includes various reset logic for initial conditions. This reset logic is exemplary of the reset logic that is used in the remaining circuitry, but is not shown. It is shown here for an understanding of how such logic functions.

The CNT0 signals are actually three signals that form a counter. This signal is used to count a timeout of approximately one second from the time when a keyboard is plugged in as the keyboard 157 and until that keyboard is actually registered as being present. This allows voltages and signal levels to stabilize before that keyboard is indicated to the hardware and software as actually being connected.

The KBD0_PRES signal and the KBD0_CHANGE_INT signals are clocked out of a flip-flop 300, along with a count signal CNT0. These are clocked on the positive edges of the PCI bus clock CLK or on the positive edge of a reset signal RSTS. Working backwards from the flip-flop 300, the various signals provided by the various multiplexers of FIG. 8 are not separately identified, but are instead identified by their corresponding ultimate output for simplicity. A multiplexer 302 provides the CNT0 signal at its current value, and provides the KBD0_PRES signal and the KBD0_CHANGE_INT signal at zero when the system reset signal RSTS is true, and otherwise provides the output of a multiplexer 304 if the RSTS signal is false. Thus, the values of these signals are reset to certain values on a system reset as indicated by the RSTS signal.

When the KBD0_PRES signal is true, indicating that the primary keyboard 157 is logically present, the CNT0 signals are set to zero by the multiplexer 304, and the KDB0_PRES signal and the KDB0_CHANGE_INT signal are provided by the outputs of a multiplexer 306.

The multiplexer 306 is switched by the KBD0_RAW single when that signal is true, the KBD0_PRES signal is provided as true, and the KBD0_CHANGE_INT signal is provided as false. This is appropriate because when both the KBD0_RAW signal and the KBD0_PRES signal are true, this indicates that the KBD0_PRES signal is true in any case, and it also indicates that the state of the KBD0_RAW signal has not changed. If the KBD0_RAW signal is false, then the KBD0_PRES signal is set to false, and the KBD0_CHANGE_INT signal is set to the state of HPEN. This is appropriate because if the KBD0_RAW signal is false in the multiplexer 306, but the KBD0_PRES signal is true as selected in the multiplexer 304, this means that the keyboard was present, but has now been unplugged. Therefore, the state of the keyboard should now set to be not present (i.e., by setting the KBD0_PRES signal false), and an interrupt should be provided to the system management mode software 212, but only if hot plugging indications are enabled as indicated by the HPEN signal (which is set by a configuration register as discussed in FIG. 8).

Returning to the multiplexer 304, if the KBD0_PRES signal is false, then the multiplexer 304 instead provides as its outputs the output signals of a multiplexer 308. These signals are thus provided when the KBD0_PRES signal indicates a keyboard is not presently connected. If the KBD0_RAW signal is false, also indicating that the presence detection circuitry of FIGS. 6A and 6B has not detected a newly installed primary keyboard 157, then the CNT0 signals are set to zero, the KBD0_PRES signal is set to its current value (which must be zero), and the KBD0_CHANGE_INT signal is set to false. This is appropriate because if both the KBD0_PRES and KBD0_RAW signals are false in conjunction with multiplexers 304 and 308, this indicates the presence state of the primary keyboard 157 has not changed.

If the KBD0_RAW signal is instead true, this indicates that the primary keyboard 157 has been newly plugged in. In this case, the multiplexer 308 provides outputs that correspond to the outputs of a multiplexer 310.

When a keyboard is newly plugged in, the KBD0_PRES signal is initially false, but the KBD0_RAW signal becomes true, because the keyboard presence detect circuitry of FIGS. 6A and 6B has detected the keyboard. Instead of immediately indicating keyboard presence by setting the KBD0_PRES signal to true, however, it is preferable to provide a period of stabilization time for the KBD0_RAW signal to remain stable and for the keyboard signal levels to stabilize. To this end, when the KBD0_RAW signal becomes true, the KBD0_PRES signal is not set to true for approximately one second. This is accomplished through the multiplexer 310 and the circuitry that drives that multiplexer.

Turning to the multiplexer 310, the signals from this multiplexer become pertinent when the KBD0_RAW signal becomes true while the KBD0_PRES signal is false, this condition indicating a newly installed primary keyboard 157. The multiplexer 310 is switched by the states of the tenth-second counter DS becoming equal to 07fh at the same time that a strobe signal PRE_FULL is equal to zero. This state, set by circuitry discussed below, occurs approximately every 128 milliseconds. When this condition is zero, the CNT0 signals remain at their present value, the KBD0_PRES signal remains at its present value, and the KBD0_CHANGE_INT signal is zero, indicating that the primary keyboard 157 has not yet been formerly deemed plugged in. Every 128 milliseconds, the multiplexer 310 is switched to its true inputs, however, in which case the CNT0 signals are incremented by one, and the KBD0_PRES signal and the KBD0_CHANGE_INT signals are provided by the output of a multiplexer 312. This multiplexer 312 is switched true when the CNT0 signals equal 0111b, or 7. Before that occurs, the KBD0_PRES signal and the KBD0_CHANGE_INT signals are provided as false. Once CNT0 equals 0111b, however, it corresponds to 1.024 seconds after the primary keyboard 157 is initially plugged in, and the KBD0_PRES signal and the KBD0_CHANGE_INT signal are set to one and the value of the hot plug enable signal HPEN respectively. Thus, one second after the KBD0_RAW signal has become and remained true, the KBD0_PRES signal is set to true, indicating that the primary keyboard 157 is now present, and the KBD0_CHANGE_INT signal is set to the value of the HPEN signal, which if true will cause an interrupt to the system management mode software 212.

The DS and PRE_DSFULL signals are provided by the outputs of a flip-flop 314, which is clocked by the system clock CLK or by the system reset signal RSTS becoming true. The D input corresponding to the DS signal output of the flip-flop 314 is provided by the input of a multiplexer 316, which is switched by the RSTS signal. When true, the multiplexer 316 provides 0 as the value of the DS signals. When the RSTS signal is false, the multiplexer 316 instead provides the output of a multiplexer 318 as its output. The multiplexer 318 receives as its true input the DS signal incremented by one, and as its false input the DS signal. The multiplexer 318 is switched by a millisecond timer counter MS_TC, which toggles true once every millisecond.

Because the DS signal may remain at the value of 07fh, for a number of clock cycles, the PRE_DSFULL signal is used as a strobe such that both the DS signal is equal to 07fh and the PRE_DSFULL signal is false for a single system clock cycle. The PRE_DSFULL signal input of the flip-flop 314 is provided by the output of a multiplexer 320, which is switched by the RSTS signal. The true input of the multiplexer 320 is driven to zero, and the false input is provided by the output of a multiplexer 322, which is switched by the state of the DS signal equalling 07fh. When this condition is true, the true input of the multiplexer 322 is selected, providing the value of 1 as the PRE_DSFULL signal. When this condition is false, the value of zero is provided as the PRE_DSFULL signal.

In operation, for only a single clock cycle will the value of the DS signals be clocked out of the flip-flop 314 at a value of 07f at the same time that the PRE_DSFULL signal is false. After that, the PRE_DSFULL signal becomes true, which causes the switching equation of the multiplexer 310 to revert to its zero input value.

Figures 11, 12:
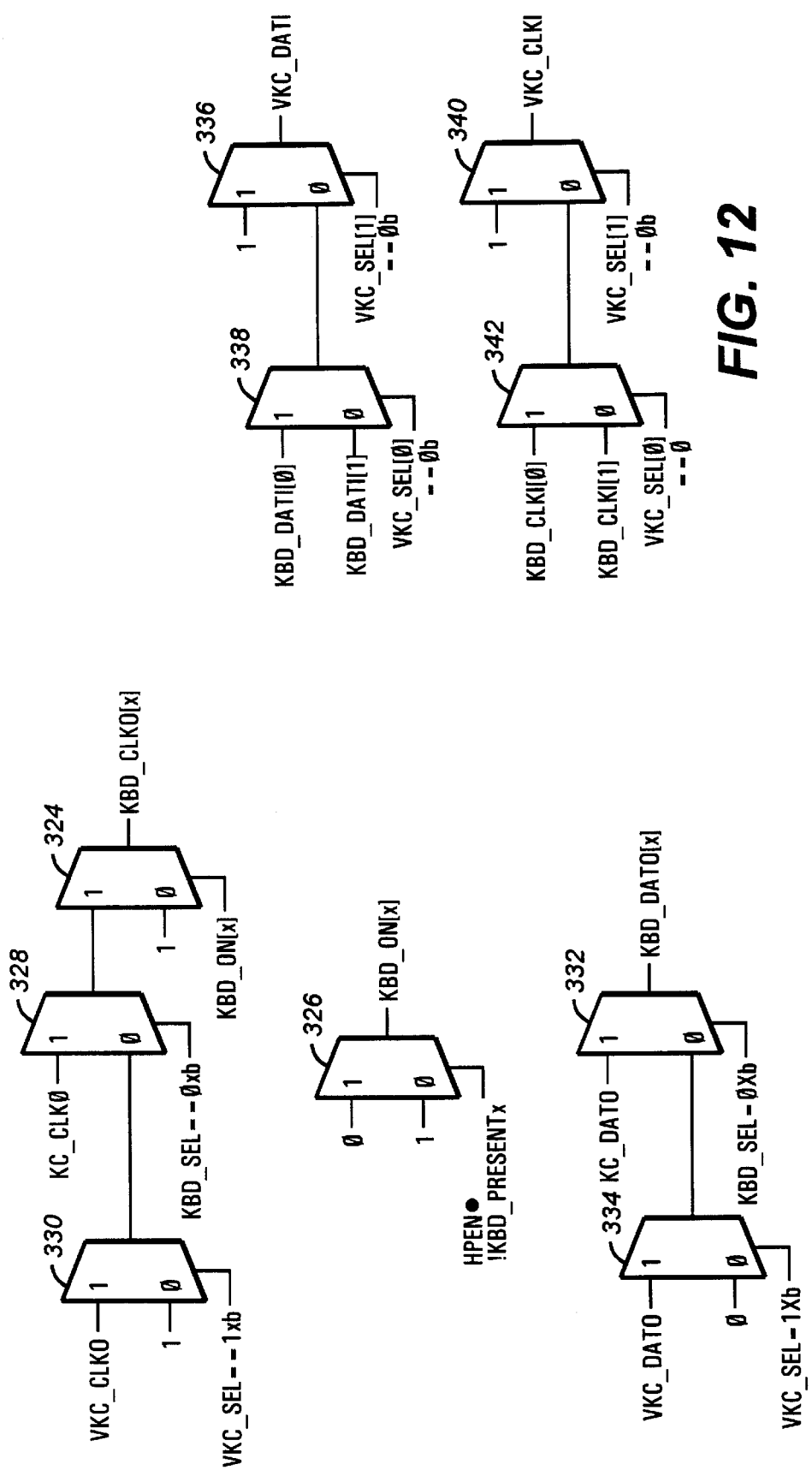
FIGS. 11–14 are schematic illustrations of circuitry within the keyboard multiplexer block of the integrated remote console according to the disclosed embodiment for providing various virtual and physical keyboard clock and data signals.

Turning to FIG. 11, circuitry is shown for generating the keyboard output signals KBD_CLKO[1:0] and KBD_DATO[1:0]. The circuitry is shown with an "x" for the corresponding one of the two sets of signals one or zero, and the circuitry is duplicated for each of those sets. In this discussion, "X" is assumed to be zero, corresponding to the primary keyboard 157. The KBD_CLKO[0] is provided by the output of a multiplexer 324. This multiplexer 324 is switched by a KBD_ON[0] signal, which is in turn provided by the output of a multiplexer 326. This signal only goes low when hot plug is enabled as indicated by the HPEN signal being true and the corresponding keyboard is not present as indicated by a KBD_PRESENTx signal being false. In that condition, the one input of the multiplexer 326 is selected, providing a zero signal as the KBD_ON[0] signal.

When KBD_ON[0] is false, or low, a one is provided through the multiplexer 324 as the KBD_CLKO[0] output. Because keyboard clock signals are provided through an open collector, when a high level is provided to the output inverters, the signal lines are driven low so when a selected keyboard is not present (i.e., KBD_ON[0] signal is false), the primary keyboard 157 clock line is driven low.

When the KBD_ON[0] signal is true, then the output of the multiplexer 324 is provided by the output of a multi-plexer 328. The multiplexer 328 is switched by the KBD_SEL[1:0] signals discussed above in conjunction with the KCFG register 294. When the high order of these bits is zero, indicating that a physical keyboard 157 or 159 is selected to be coupled to the 8042 keyboard controller 156, and the low order bit is zero, indicating that the primary keyboard 157 is selected, then the keyboard controller clock output signal KC_CLKO is provided through the multiplexer 328 and the multiplexer 324 as the KBD CLKO[0] signal. That is, the system keyboard controller clock signal is appropriately coupled to the clock output signal for the selected keyboard.

If, however, the KBD_SEL[1:0] signals have either not selected this keyboard or indicate that the virtual keyboard 204 is instead to be coupled to the 8042 keyboard controller 156, then the KBD_CLKO[0] signal is instead provided by the output of a multiplexer 330. The multiplexer 330 is switched by the virtual keyboard controller select signals VKC_SEL[1:0], discussed above in conjunction with KCCFG register 299. If the VKC_SEL[1] signal is true and the VKC_SEL[0] signal equals zero, corresponding to the primary keyboard 157, this indicates that the virtual keyboard controller 206 has been enabled and the primary keyboard 157 has been selected to be coupled to that block. Therefore, the VKC_CLKO signal, provided to the one input of the multiplexer 330, is then provided as the KBD_CLKO[0] output signal. Thus, the clock of the virtual keyboard controller 206 is then coupled to the selected keyboard 157 or 159. If this condition is not true in conjunction with the multiplexer 330, then a one is provided as the output of the multiplexer 330, forcing the corresponding keyboard clock line low.

A KBD_DATO[0] signal is provided by similar circuitry. A multiplexer 332 provides this signal. This multiplexer 332 is switched by the KBD_SEL[1:0] signals, selecting between the KC_DATO signal and the output of a multiplexer 334. The multiplexer 334 is switched from its zero input to its one input when the VKC_SEL[1] signal is true, choosing between the VKC_DATO signal and a zero value. The operation of the circuitry of the multiplexers 334 and 332 is similar to that of the multiplexers 330 and 328, and reference is made to the discussion of that circuitry for further details.

Turning to FIG. 12, circuitry is shown for providing the virtual keyboard controller clock and data input signals VKC_CLKI and VKC_DATI illustrated in FIG. 7. The VKC_DATI signal is provided by the output of a multiplexer 336, which is switched by the VKC_SEL[1] signal being equal to zero. When this signal is equal to zero, indicating that the virtual keyboard controller 206 is disabled, a logic one signal is provided as the output for the VKC_DATI signal, corresponding to the state of a pulled-up, undriven keyboard data line. Otherwise the VKC_DATI signal is provided through the zero input of the multiplexer 336, which is coupled to the output of a multiplexer 338. The multiplexer 338 is switched by VKC_SEL[0] signal, which, discussed above in conjunction with FIG. 9, selects the physical keyboard 157 or 159 to be connected to the virtual keyboard controller 206. If the VKC_SEL[0] signal is equal to zero, indicating the primary keyboard 157 is enabled, the one input of the multiplexer is selected providing the KBD_DATI[0] signal as the output of that multiplexer. This signal again corresponds to the data line of the primary keyboard 157. Otherwise, the zero input of the multiplexer 338 is provided as the output, providing the KBD_DATI[1] signal, corresponding to the secondary keyboard 159, as the output of the multiplexer 338. Thus, when the virtual keyboard controller 206 is enabled, the keyboard selected by the virtual keyboard select signal VKC_SEL[0] determines which of the keyboards 157 and 159 is coupled to the VKC_DATI signal.

The VKC_CLKI signal is provided by corresponding circuitry through a multiplexer 340 and 342, with the appropriate KBD_CLKI[0] or KBD_CLKI[1] signals being provided instead of the data signals.

Figure 13:
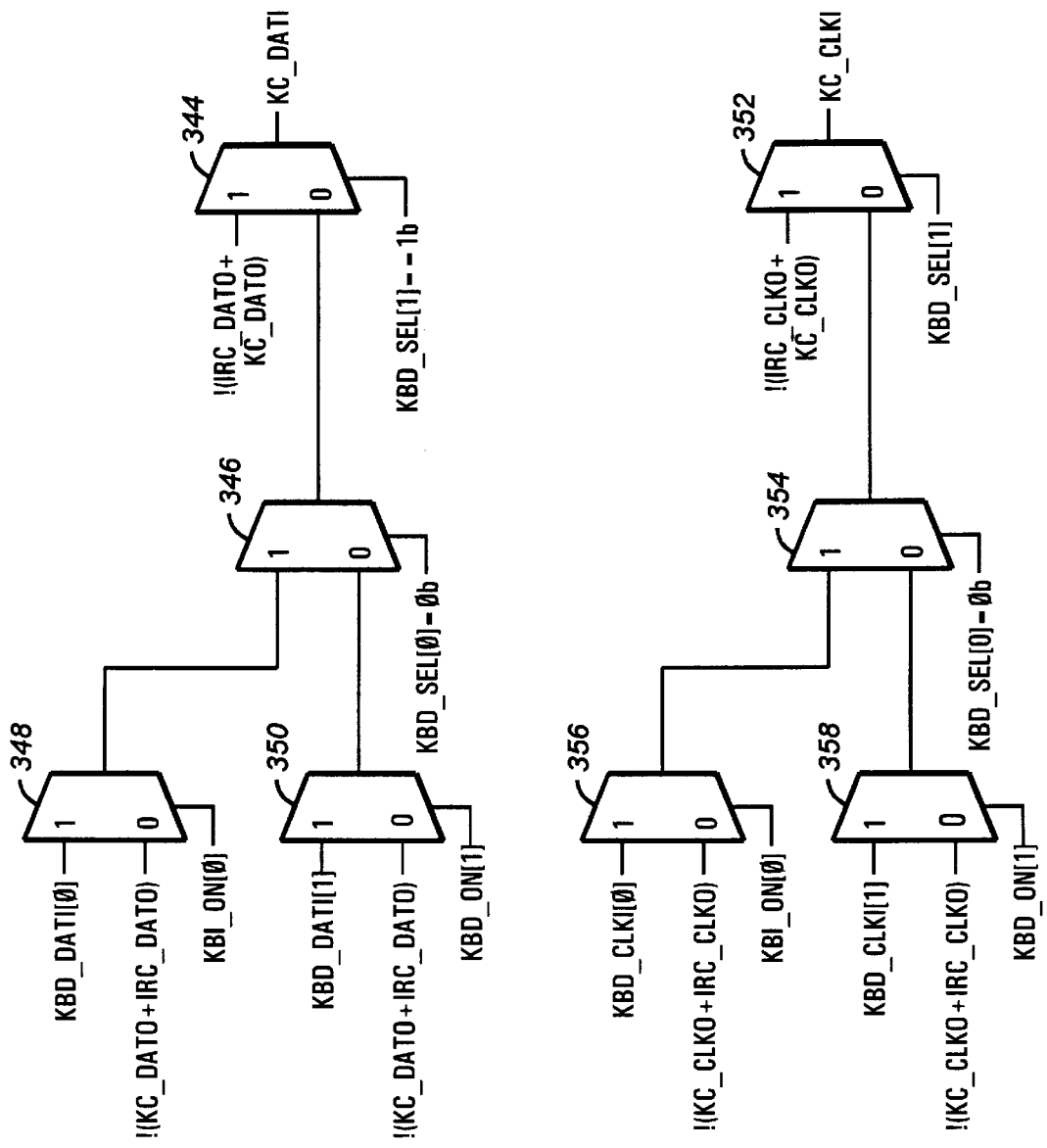

Turning to FIG. 13, shown is the circuitry for generating the keyboard controller data and clock input signals KC_DATI and KC_CLKI, which are provided by the IRC 170 to the 8042 keyboard controller 156. A multiplexer 344 provides the keyboard controller data input signal. This multiplexer 344 is switched to its one input when the KBD_SEL[1] signal equals one, indicating the virtual keyboard 204 has been coupled to the 8042 keyboard controller 156. When this is true, the KC_DATI signal is provided from the one input of multiplexer 344, which receives the IRC_DATO signal from the virtual keyboard 204 OR'd with the KC_DATO signal from the 8042 keyboard controller 156, and then the combination inverted. This mimics the operation of physical keyboard bidirectional data line, because the outputs of a keyboard controller are inverted before driving that data line. Further, if either the 8042 keyboard controller data output signal KC_DATO is true, or the virtual keyboard 204 data output signal IRC_DATO is true, then the actual keyboard data line is driven low, just as would a physical keyboard data line.

If the KBD_SEL[1] signal is low, indicating the selected physical keyboard 157 or 159, if present, is to be coupled to the 8042 keyboard controller 156, then the zero input of the multiplexer 344 is provided as the KC_DATI signal. This input is provided by the output of a multiplexer 346, which is switched to its one input when the KBD_SEL[0] signal equals zero, indicating the primary keyboard 157 is selected to be coupled to the 8042 keyboard controller 156. If this true, then the one input of the multiplexer 346 is selected, which receives as its input the output of a multiplexer 348. The multiplexer 348 is switched by the KBD_ON[0] signal. When this signal is false, that indicates that hot plugging is enabled but the primary keyboard 157 is not plugged in. In this case, the zero input of the multiplexer 348 is selected, providing the inverse of the IRC_DATO signal OR'd with the KC_DATO signal ultimately as the KC_DATI signal.

If the KBD_SEL[0] signal switching the multiplexer 346 instead indicates the secondary keyboard 159 is selected, the zero input of the multiplexer 346 is chosen, which is provided by the output of a multiplexer 350. The multiplexer 350 is similar to the multiplexer 348, but is instead switched by the KBD_ON[1] signal for the secondary keyboard 159, and provides from its one input the KBD_DATI[1] signal.

The circuitry for providing the KC_CLKI signal is identical to that for providing the KC_DATI signal, with the exception that the corresponding clock signals are used rather than data signals. Thus, multiplexers 352–358 correspond to the multiplexers 344–350, and their functionality need not be discussed further.

Figure 14:
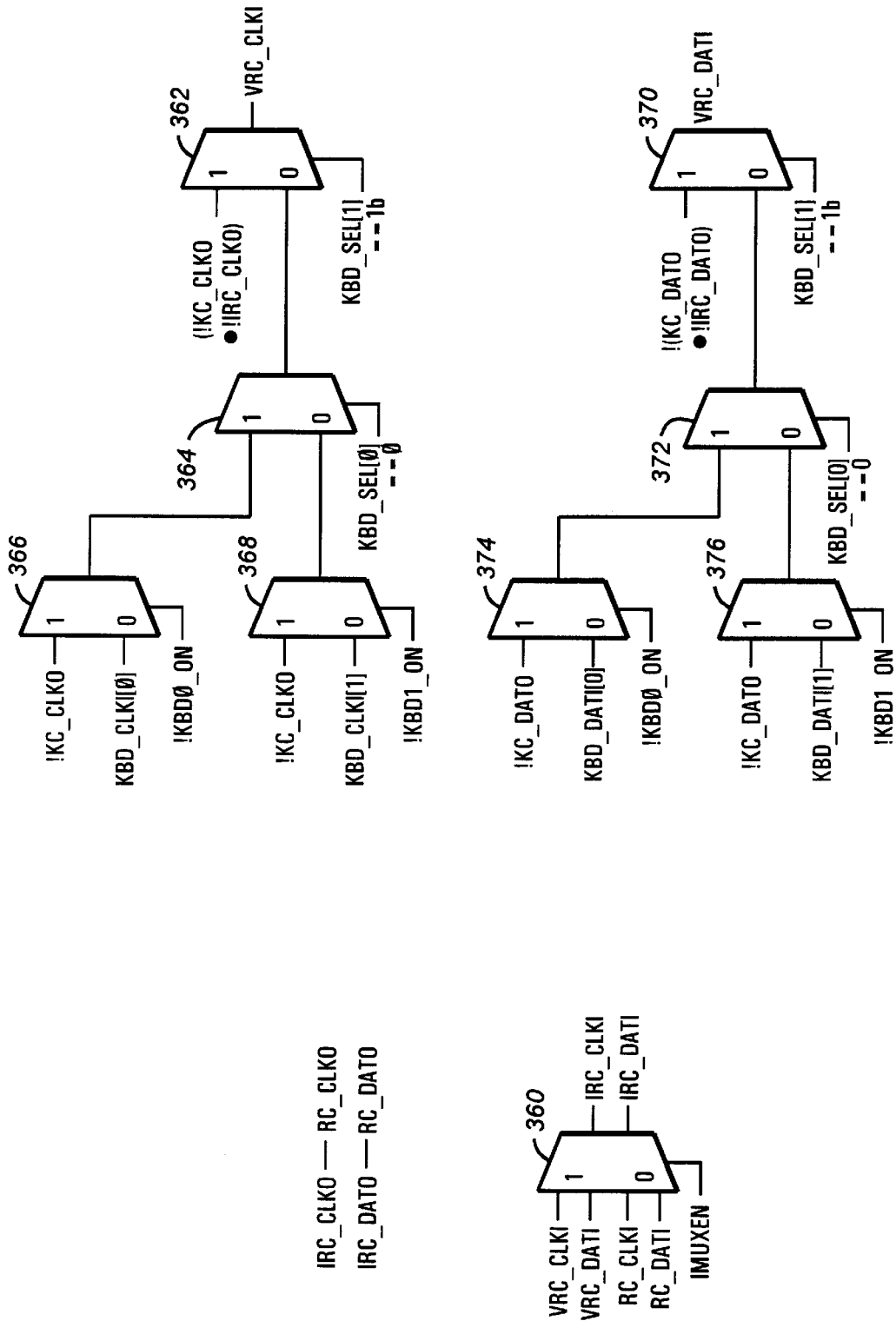

Turning to FIG. 14, shown is the circuitry for providing the clock and data input signals IRC_DATI and IRC_CLKI to the virtual keyboard 204. A multiplexer 360 is switched by a IMUXEN signal. When false, this signal indicates that the external multiplexer 220 is being used rather than the internal multiplexer circuitry, and thus virtual keyboard 204 should be coupled to the RC_CLKI and RC_DATI signals as illustrated in FIGS. 5 and 7. When the IMUXEN signal is false, the zero input of the multiplexer 360 is selected, and the RC_CLKI and RC_DATI signals are provided as the IRC_CLKI and IRC_DATI signals.

In all cases, the RC_CLKO and RC_DATO signals are provided by the IRC_CLKO or IRC_DATO signals, because even if the external multiplexer is not enabled, there is no harm to providing these output signals to the unconnected RC_CLK and RC_DAT signal lines.

If the IMUXEN signal is true, indicating that the internal multiplexer is in use, the IRC_CLKI and IRC_DATI signals are provided by a VRC_CLKI signal and a VRC_DATI signal. These signals are generated by circuitry similar to that used to generate the KC_DATI and KC_CLKI signals shown in FIG. 13. The VRC_CLKI signal is provided by a multiplexer 362, which is switched by the KBD_SEL[1] signal being equal to one. Again, when this signal is one, the virtual keyboard 204 is coupled to the 8042 keyboard controller 156. In that case, the VRC_CLKI signal is provided by the one input of the multiplexer 362, which is in turn provided by the inverse of the KC_CLKO signal AND'd with the inverse of the IRC_CLKO signal. With this logic, the input signal VRC_CLKI is driven low if either the KC_CLKO signal or the IRC_CLKO signal is true.

If the KBD_SEL[1] signal is instead low, indicating that the virtual keyboard 204 is not to be connected to the 8042 keyboard controller 156, the zero input of the multiplexer 362 is selected, which receives as its input the output of a multiplexer 364. The multiplexer 364 is switched to its one input by the KBD_SEL[0] signal being equal to one, indicating the primary keyboard 157 is the selected keyboard. If this is the case, the multiplexer 364 provides its one input as its output. The one input of the multiplexer 364 receives as its input the output of a multiplexer 366, which is switched by the inverse of the KBD0_ON signal. If the KBD0_ON signal is true, then the zero input to the multiplexer 366 is selected, providing as its output the primary keyboard 204 clock signal input KBD_CLKI[0] signal. Otherwise, the primary keyboard 157 is not connected, so the one input of the multiplexer 366 is selected, providing the inverse of the 8042 keyboard controller 156 clock output signal KC_CLKO as the output of the multiplexer 366.

Similarly, if the KBD_SEL[0] signal is not zero, indicating the secondary keyboard 159 is instead the selected keyboard, the zero input of the multiplexer 364 is enabled, which receives as its input the output of a multiplexer 368. The multiplexer 368 corresponds to the multiplexer 366, but is instead switched by the inverse of the KBD_1_ON signal and provides as its zero input the KBD_CLKI[1] signal.

Similar circuitry employing multiplexers 370–376 provides the VRC_DATI signal. This signal is identical except for using the corresponding data signals, rather than clock signals.

Referring as a group back to FIGS. 7–14, it will now be appreciated how the keyboard multiplexer 214 selectively connects various real and virtual keyboard and keyboard controller clock and data lines depending on the settings of the keyboard and keyboard controller configuration registers KCFG 294 and KCCFG 299. The virtual keyboard 204 can be connected to the external multiplexer remote console data and clock lines RC_DAT and RC_CLK, or to the physical 8042 keyboard controller 156. The virtual keyboard controller 206 can be selectively connected to either the primary keyboard 157 or the secondary keyboard 159. Finally, after the virtual keyboard 204 and virtual keyboard controller 206 have performed their keyboard and keyboard controller emulation functions, responding to the 8042 keyboard controller 156 and initializing a newly connected physical keyboard 157 or 159, the physical 8042 keyboard controller 156 can be connected to that newly plugged in physical keyboard 157 or 159.

The Virtual Keyboard and Virtual Keyboard Controller

Turning to FIGS. 15–26, state machines, signals, and circuitry for providing the virtual keyboard 204 and the virtual keyboard controller 206 are illustrated. In reviewing these two blocks, one will understand that they are very similar. This is so because the basic communication protocol between a keyboard and a keyboard controller is essentially the same in each direction, so state machines and circuitry provide signals to the bidirectional clock and data lines by a keyboard is essentially the same as the circuitry in state machines used by a keyboard controller to provide signals to those same lines. Again, the output signals of a keyboard or keyboard controller are provided through open collector inverters, so if either the keyboard or the keyboard controller provides an output signal true, the corresponding signal line is driven low. The input signals, however, are directly coupled to the bidirectional keyboard clock and data lines. Therefore, a keyboard or keyboard controller knows that if it provides an output signal true, its corresponding input signal will be low. If, however, a keyboard or keyboard controller provides an output signal at a low level, or false, its corresponding input signal may be either low or high, depending on how the corresponding connected device is driving its output signal.

With the understanding of the metric nature of the circuitry for a keyboard and a keyboard controller, the discussion below first turns to the virtual keyboard controller 206, and then describes the virtual keyboard 204, focusing on differences between the virtual keyboard 204 and the virtual keyboard controller 206 rather than simply rehashing the description of the similar portions.

The Virtual Keyboard Controller 206

FIGS. 15–20 are diagrams and schematics illustrating the structure and operation of the virtual keyboard controller 206. As previously described, the virtual 8042 keyboard controller 206 communicates with either the primary keyboard 157 or the secondary keyboard 159. Those skilled in the art will understand the communications protocol between a keyboard and an 8042 keyboard controller. The communication is over a clock line and a data line, those lines being pulled high through a passive resistor. The clock line is driven by the keyboard and the data line is driven either by the keyboard controller or by the keyboard, depending on which is transmitting data at any given time. In general, a keyboard controller or a keyboard asserts control of the lines by first pulling the data line low to request to send to the other device. The keyboard then raises the clock and the sending device then lowers the clock line. This indicates the beginning of a start bit, and the transmitting device then begins placing data on the line, responsive to the clock as it is asserted and deasserted by the keyboard. The keyboard then continues to cycle the clock signal while the appropriate device continues providing data on each falling clock edge. The transmitting device then waits for the next falling clock edge after the parity bit has been placed on the line to place the stop bit on the data line. The receiving device then clocks in the stop bit and acknowledges reception by pulling the data line low. The keyboard waits until the receiving device has released the data line (which floats high), and then pulls the clock line low. Some time later, the keyboard allows the clock line to float high to allow the other device to transmit a response.

Figure 15:
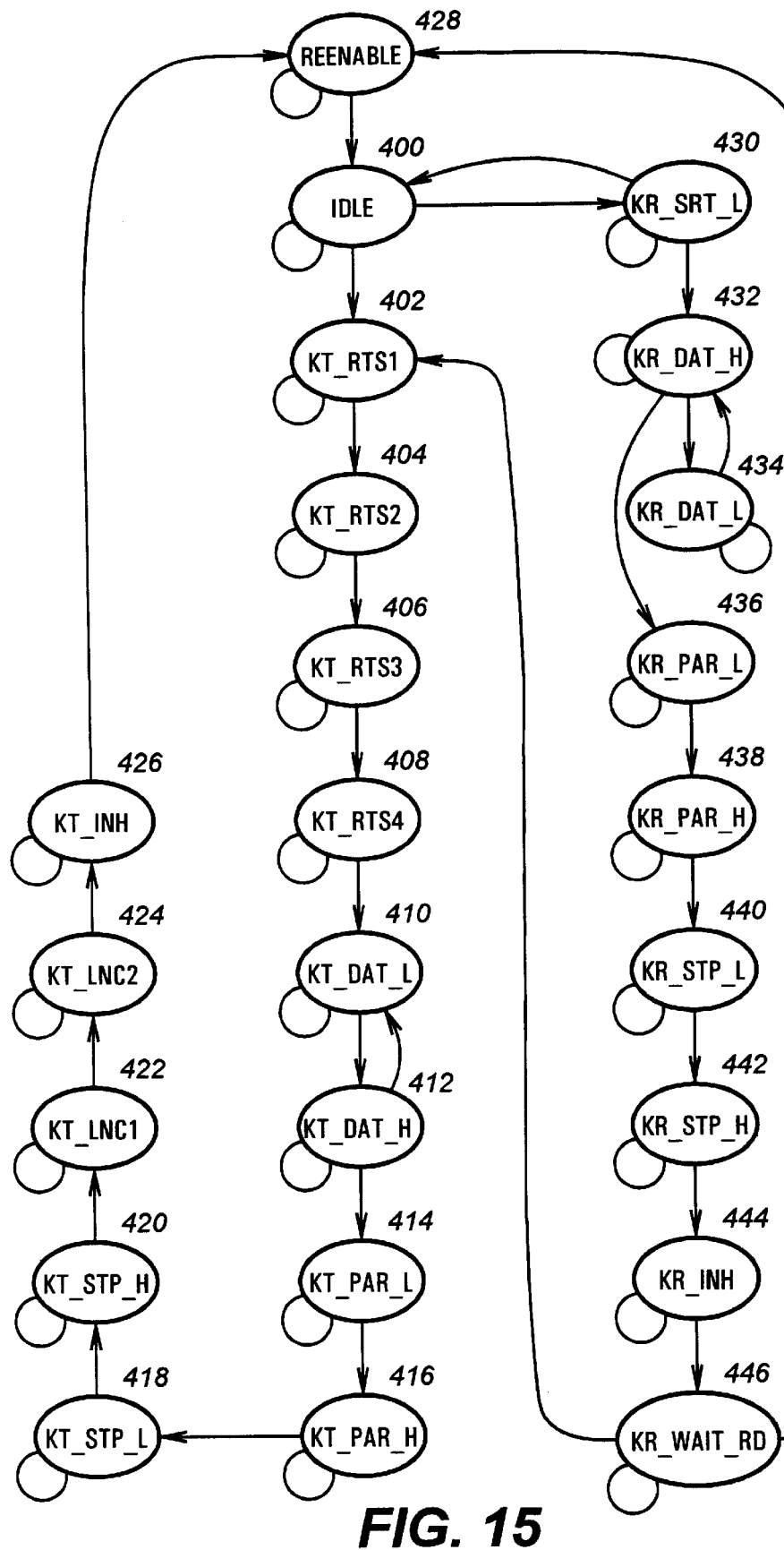
FIG. 15 is state diagram illustrating the state transitions of the virtual keyboard controller within the integrated remote console according to the disclosed embodiment.

With this general protocol in mind, the state diagram of FIG. 15 will be understood. FIGS. 16A and 16B include all of the state transition conditions for the virtual keyboard controller 206 state diagram of FIG. 15. Although these transitions are discussed below, in general they provide for appropriate transitions to transmit and receive data to and from the external keyboard 157 or 159.

The state diagram of FIG. 15 is preferably clocked by the PCI system clock. FIG. 15 is the state diagram illustrating the state transitions of the virtual 8042 keyboard controller 206, which provides for the sending and receiving of data to and from the external keyboard 157 or 159. Again, the state machine in essence replicates the behavior of the physical 8042 keyboard controller 156, conforming to the standard communications protocol for an IBM PC compatible keyboard.

Beginning in an IDLE state 400, the state machine either remains in that IDLE state on the next clock cycle, or transitions to a receive state path or a transmit state path. To transmit a character to the external keyboard 157 or 159, control proceeds to a keyboard controller transmit request to send state KT_RTS1. Control proceeds to this state, for example, when the virtual keyboard controller 206 transmit buffer is full and a CLKIN signal (FIG. 18, below) to the virtual keyboard controller board 156 is high, indicating the keyboard 157 or 159 has not disabled the virtual keyboard controller 156. This is reflected in the TBF bit of KCSTAT 296 (see FIG. 9).

In the KT_RTS1 state, the virtual keyboard controller 206 clock output VKC-CLKO is true, which will force the physical bidirectional keyboard clock line low, preventing the external keyboard 157 or 159 from beginning a transmission. This is appropriate because the virtual keyboard controller 206 will be transmitting.

Control proceeds to a second request to send state KT_RTS2 404, then to a third request to send state KT_RTS3 406, and to a fourth request to send state KT_RTS4 408. During these transitions, the virtual keyboard controller 206 output clock signal VKC__CLK0 is first high (driving the bidirectional clock line low), then its data output signal VKC__DAT0 is high (forcing the bidirectional data line low), then its clock output signal VKC__CLK0 goes low (bidirectional allowed to go high, depending on keyboard 157 or 159 output) and then the state machine waits for the physical clock line to rise and then be driven low by the external keyboard, thus beginning the clocking in of new data.

Then, from the KT_RTS4 state 408, the state machine transitions to a keyboard transmit data low state KT_DAT_L 410. The state machine then transitions to a keyboard transmit data high state KT_DAT_H 412, and the state machine transitions between these states 410 and 412 until all of the data bits are transmitted. The state machine then transitions to a parity low state KT_PAR_L 414 and then to a parity high state KT_PAR_H 416.

After the parity bit has been transmitted by the virtual keyboard controller 206 at states 414 and 416, the state machine transitions to stop bit low and high states KT_STP_L 418 and KT_STP_H 420, respectively. Then the state machine transitions to two line control states KT_LNC1 422 and KT_LNC2 424. These line control states allow the external keyboard 157 or keyboard 159 to turn control back to the virtual keyboard controller 206. The state machine then transitions to a keyboard controller inhibit state KT_INH 426, which drives the keyboard clock line low for a sufficient time to mimic an 8042 keyboard controller. The state machine then transitions to a reenable state REENABLE 428 and then back to the IDLE state 400.

For received data, the state machine is virtually identical, except the data is being received from one of the external keyboards 157 or 159. Control first proceeds to a serial receive low state KR_SRT_L 430 when both the virtual keyboard controller 206 VKC_CLKI and VKC_DATI signals are low, indicating the external keyboard 157 or 159 has driven both the clock and the data lines low, indicating that the keyboard 157 or 159 is beginning to transmit data. Control then proceeds to two data states KR_DAT_H 432 and KR_DAT_L 434. The state machine transitions between the data states 432 and 434 until all of the data bits have been transmitted from the keyboard 157 or 159 to the virtual keyboard controller 206. The state machine then proceeds to a pair of parity states KR_PAR_L 436 and KR_PAR_H 438. Once the parity bit has been transmitted from the external keyboard 157 or 159, the state machine proceeds to a pair of stop bit states KR_STP_L 440 and KR_STP_H 442. Once the stop bit has been transmitted from the external keyboard 157 or 159, the external keyboard 157 or 159 is then briefly disabled in an inhibit state KR_IN_H 444. The state machine then proceeds to a wait state KR_WAIT_RD 446, where the external keyboard is inhibited from further reception until the receive buffer has been emptied. Control then proceeds either to the reenable state 428, or the request to send state KT_RTS1 402, should there be data in the virtual keyboard controller 206 transmit buffer.

Turning to FIGS. 16A and 16B, the state transitions for the various states in FIG. 15 are shown. For each state, the state machine transitions to the indicated next state on the corresponding PCI clock cycle should the conditions for transitioning to the next state be true. Otherwise, the state machine will remain in its present state. For clarity, the state transitions to the same state are not shown, as they are simply all conditions not satisfied by a transition to another state.

The various signals recited in FIGS. 16A and 16B are further described below in conjunction with FIGS. 17A and 17B. Three signals are not shown in conjunction with those figures. These are T5, T15, and T100 signals. These signals are delays of 10, 15, and 127 microseconds, which are provided for timing and test purposes. They are generated every 10, 15, and 127 microseconds by a timer from the start of the state that uses them. For example, referring to the KT_RTS2 state, it will transition to the KT_RTS3 state 15 microseconds after entering the KT_RTS2 state. These timers will be readily understood and are omitted for clarity.

Turning to FIGS. 17A and 17B, shown are equations that generate various signals used by the state machine of FIGS. 16A and 16B and used by circuitry further illustrated below in conjunction with FIGS. 18–20. In the equations of FIGS. 17A and 17B, certain state variables from FIG. 16 are used as part of the equations. These variables in the equations of FIGS. 17A and 17B are true when the state machine of FIG. 15 is in the corresponding state.

Further, in the disclosed embodiment, the state transitions of FIGS. 16A and 16B, as well as the state variables used in FIGS. 17A and 17B, are not actually physically encoded into the IRC 170. Instead, these state transitions are first processed through a precompiler that provides state transition tables using a reduced number of variables. Therefore, the state transitions of FIGS. 16A and 16B are the logical states implemented in the IRC 170. These are shown because they more directly reflect the logical operation of the underlying circuitry. Certain of the variables used in the equations of FIGS. 17A and 17B are generated as signals illustrated in FIGS. 18–20, discussed below. Rather than address the actual creation of the signals, which is apparent, the meaning of the signals of FIGS. 17A and 17B is discussed.

FIG. 17A shows equations of certain signals that are not clocked. A RST_TIMER signal is used to reset certain of the timers used to create delays from the start of particular states. These are principally the T5, T15, and T100 timers discussed above. When the RST_TIMER signal is true, the corresponding individual microsecond timers are reset to zero. A MUX_PAR signal is used to switch between driving the next data bit and the parity bit onto the output. This signal is used by circuitry illustrated in FIG. 18. A COUNT signal is used to increment the count of data bits output or input by the state machine of FIG. 15, and is used by circuitry illustrated in FIG. 20. A SHIFT signal indicates that a shift register SR[7:0] should be shifted right by one bit in preparation for the next data bit being output or input. (See FIG. 19, below.)

A DATDRV signal is true when either a data or parity bit should be provided onto the data output signal VKC_DAT0.

A DATAOUT signal, when true, forces the equivalent of an 8042 signal high, which will force the keyboard bidirectional data line low. Thus, the DATDRV signal, when true, causes the appropriate data or parity bit to be driven onto the data line, while when the DATAOUT signal is true, that forces the data line low. This is appropriate because at the beginning of a transmission cycle, the data line must be forced arbitrarily low.

A CLKOUT signal, when true, forces the output signal VKC_CLK high. This corresponds to the bidirectional keyboard clock line being driven low. This is done at the beginning of a request to send, when the external keyboard 157 or 159 should be inhibited or after a transmission or reception to provide an arbitrary delay reflecting the operation of a standard 8042 keyboard controller.

An SRLOAD signal, when true, loads the shift register SR[7:0]. This is performed during the IDLE state 400 or KR_WAIT_RD state 446 if the transmit buffer is full as indicated by a TBF signal.

Thus, the contents of the transmit buffer are loaded into the shift register SR[7:0] so that the data bits can be shifted out serially for transmission. RST_BITCOUNT signal, when true, forces a reset of the bit counter used to count the number of data bits transmitted or received. This is done during the IDLE or KR_WAIT_RD states, to reset for the next transmission or reception.

A clear transmit buffer full signal TBF_CLR forces the transmit buffer full signal to be cleared. This is done 127 microseconds after the KT_INH state 426 is entered or as the state machine transitions into REENABLE or if there is a transmission while busy or transmission timeout error.

Turning to FIG. 17B, shown are equations for various clocked signals. These are preferably clocked by the PCI bus clock. Most of these signals are provided to the KCSTAT register 296 of FIG. 9. A RCV_TIMEOUT signal is true whenever the virtual keyboard controller 206 has a receive timeout error, discussed above in conjunction with the KCSTAT register 296. Of note, the RCV_TIMEOUT signal remains true if it was previously true and a KCSTAT register read strobe signal KCSTAT_RD_STB is false. The KCSTAT_RD_STB single is true on a read of the KCSTAT register 296 over the PCI bus 117. When this single is true, this indicates the KCSTAT register 296 has been read. The various strobing of the signals on the PCI bus, as well as the reads and writes of the various registers, is not shown for clarity, and is well known to those in the art of bus design. In this case, it is appropriate that the RCV_TIMEOUT signal remain true, if it is true, until the KCSTAT register 296 has been read, as that is the CPU 50 action necessary to clear the RCV_TIMEOUT signal. Further, a GLOBAL_MS_TIMEOUT signal is used by the logic, and that signal is generated 3 ms after a reception or transmission has begun. If it is active while present in any of the states listed in the timeout equation, this means that something has gone wrong and a timeout occurred. The TRAN_WHILE_BUSY, TRAN_TIMEOUT, RBF, and TRANSMIT_COMPLETE signals are similarly generated using various signals and read strobes and provided to the CPU 50 through the KCSTAT register 296.

Figure 18:
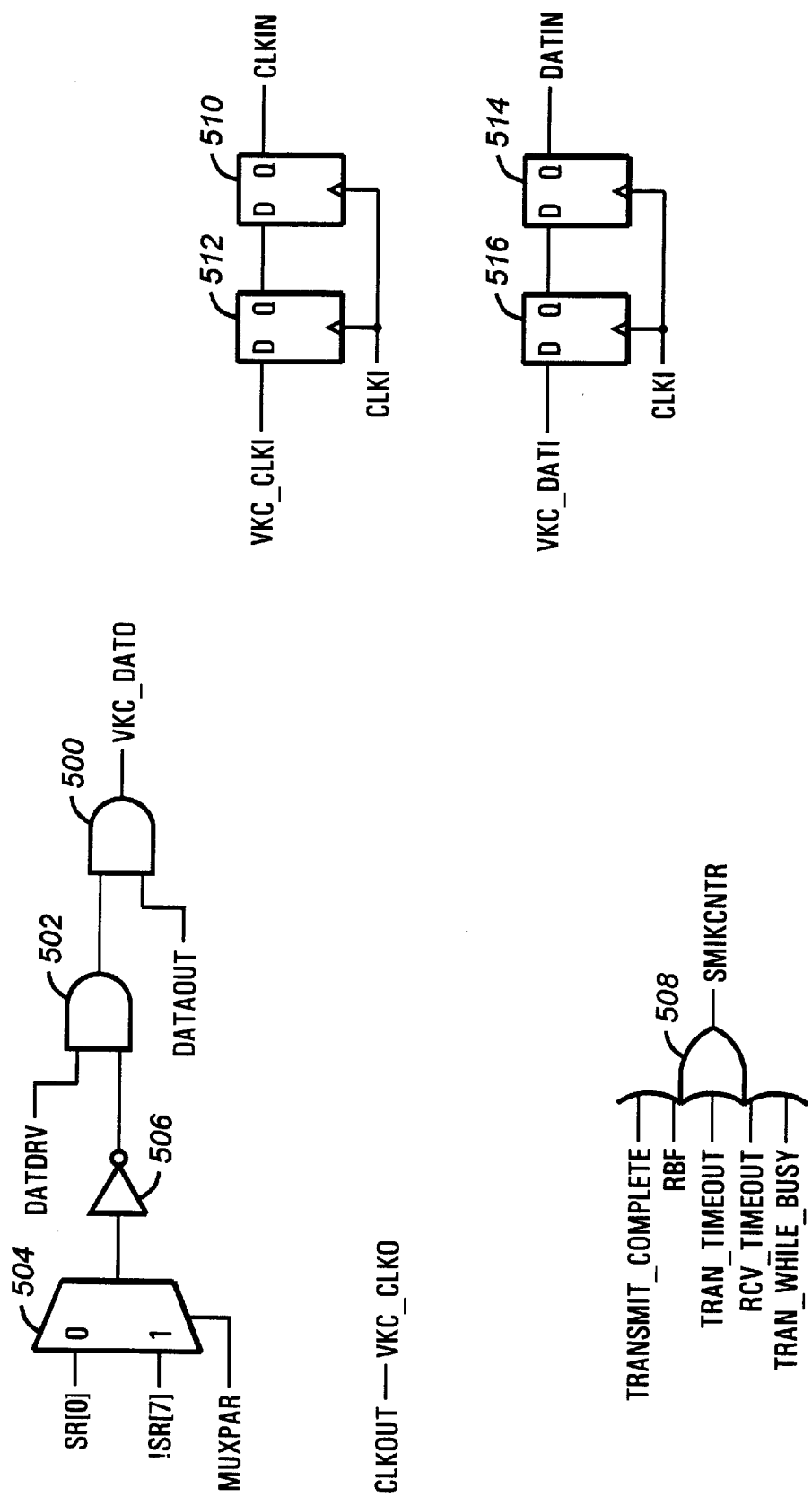
FIGS. 18–20 are schematic illustrations of various circuitry within the virtual keyboard controller implemented in the remote console according to the disclosed embodiment.
Figure 19:
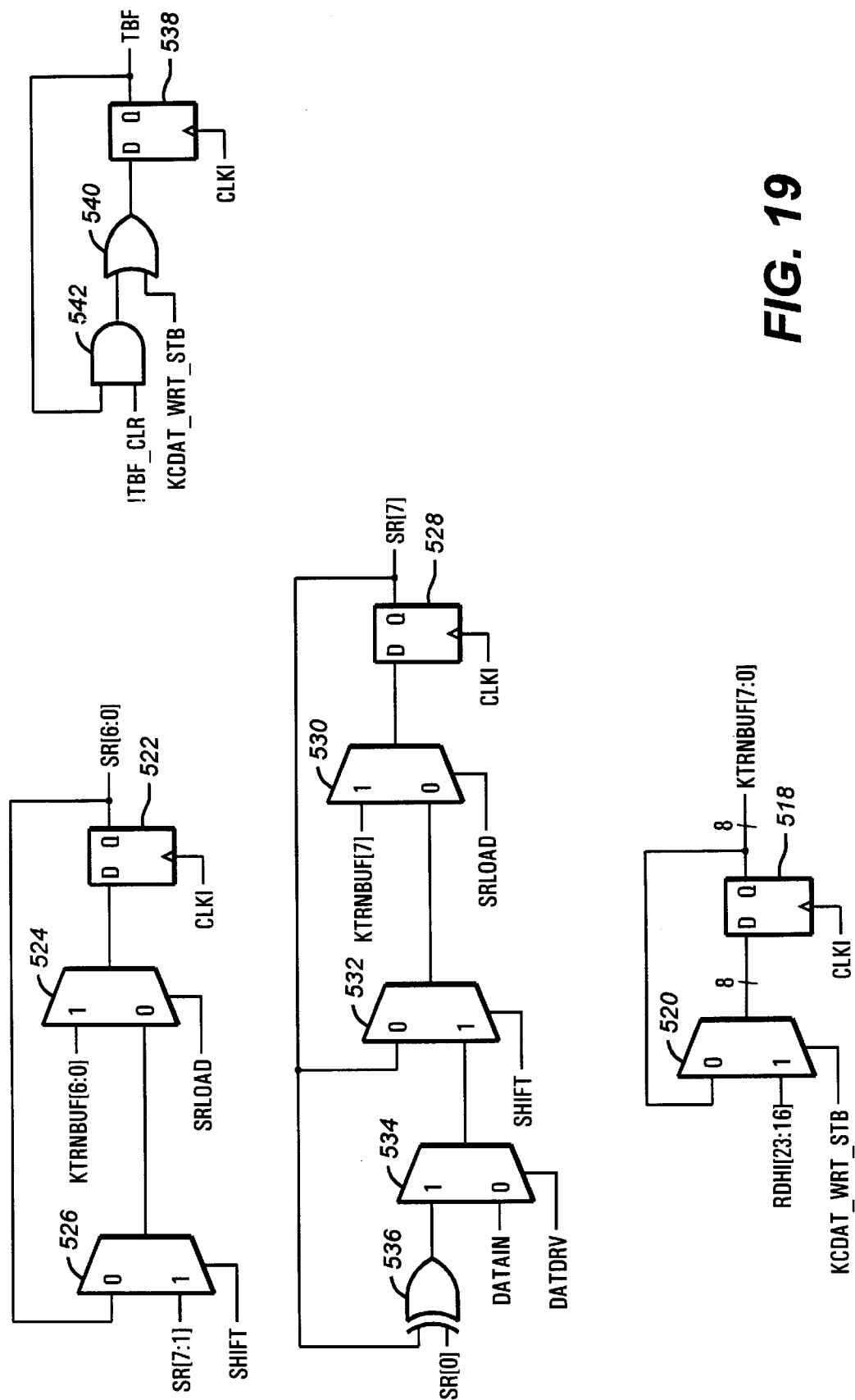
Figure 20:
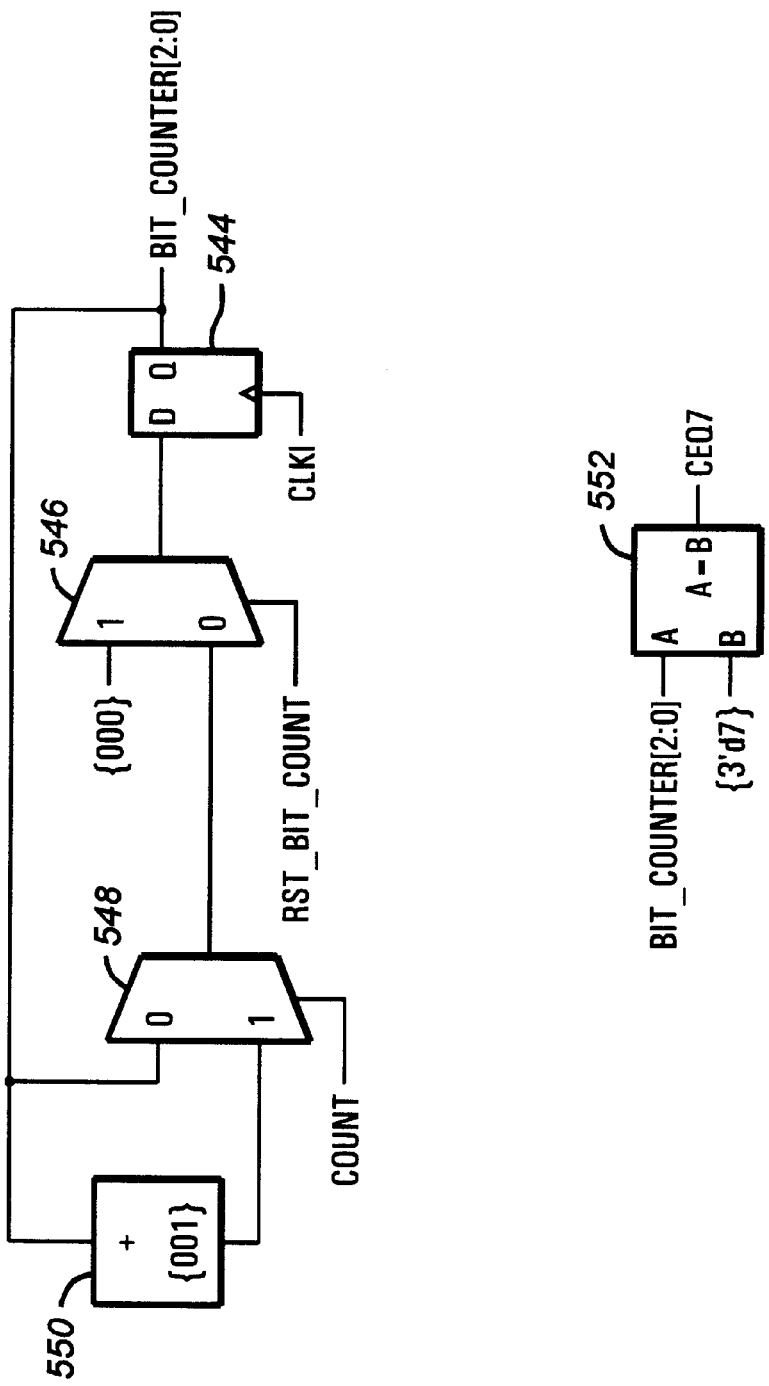

Turning to FIGS. 18–20, other circuitry is illustrated that provides other signals used by blocks within the IRC 170 or provided to the CPU 50 via the PCI bus 117 through the registers illustrated in FIG. 9. The VKC_DATO signal is provided by the output of an OR gate 500, which receives as inputs the DATAOUT signal and the output of an AND gate 502. The AND gate 502 receives as inputs the DATDRV signal, and the output of a multiplexer 504, inverted by an inverter 506. The multiplexer 504 is switched by the MUX_PAR signal, and as its zero input receives the SR[0] signal, which provides the next data bit to be output. As its one input receives, the multiplexer 504 provides inverse of the SR[7] signal, which would be the parity bit.

The VKC_DATO signal is therefore driven true (corresponding to the keyboard data line being driven low) when the DATAOUT signal is true (corresponding to the beginning of a data transmission). The VKC_DATO signal is also driven to the value of the next data bit, inverted when the DATDRV signal is true. When the MUXPAR signal is true, indicating a parity bit transmission, the parity bit SR[7] (ultimately non-inverted) is instead provided as the VKC_DATO signal. The VKC_CLK0 signal is simply provided through a wire connection to the CLKOUT signal.

A SMIKCNTR signal used to force the generation of an SMI on transitions of various of the status and control bits of FIG. 9 is shown on FIG. 18. The SMIKCNTR signal is provided by the output of an OR gate 508, which receives as inputs the TRANSMIT_COMPLETE signal, the RBF signal, the TRAN_TIMEOUT signal, the RCV_TIMEOUT signal, and the TRAN_WHILE_BUSY signal. It will be understood that the SMIKCNTR signal becomes true when any of these signals becomes true. This is appropriate because when these signals become true, the system management mode 212 firmware should take an appropriate action, such as reading the receive buffer of the virtual keyboard controller 206.

While the VKC_DATO and VKC_CLKO signals are inverted before being provided to the keyboard clock and data lines, the same is not true of the signals input to the virtual keyboard controller 206. That is, the VKC_CLKI and VKC_DATI signals reflect the actual values of those lines. Therefore, the CLKIN signal is provided, delayed by two PCI clock cycles as indicated by a CLKI signal, through two flip-flops 510 and 512, where the D input to the flip-flop 512 is provided by the VKC_CLKI signal. The DATAIN signal is similarly provided by two flip-flops 514 and 516, which are clocked by the PCI clock CLKI. The D input of the flip-flop 516 is driven by the VKC_DATI signal, done to allow sampling of these slow asynchronous signals to prevent metastability.

Turning to FIG. 19, shown is circuitry for providing the register signals SR[7:0], the transmit buffer full signal TBF, and the keyboard controller transmit buffer signals KTRNBUF[7:0]. The keyboard controller transmit buffer signals KTRNBUF[7:0] are provided by the outputs of a flip-flop 518 (clocked by the CLKI signal). Eight actual inputs and outputs are provided by the flip-flop 518, but these are shown as a single input and output for clarity. The D inputs to the flip-flop 518 are provided by the output of a multiplexer 520 which as its zero input receives the keyboard controller transmit buffer signals KTRBUF[7:0]. The one input of the multiplexer 520 is provided by a series of signals RDHI[23:16], which are coupled to the PCI bus. The multiplexer 520 is switched by the KCDAT_WRT_STB, which is true on a write to the KCDAT register 298 of FIG. 9. Thus, when the write strobe is true, the data on the PCI bus is clocked into the keyboard controller transmit buffer KTRNBUF.

The contents of the keyboard controller transmit buffer KTRNBUF are clocked into the register SR[7:0] for transmission over the VKC_DATA0 signal. The SR_[6:0] signals are provided by the outputs of a flip-flop 522, clocked by CLKI, which as its input receives the outputs of a multiplexer 524. As its one input, the multiplexer 524 receives the KTRNBUF[6:0] signals, which are provided as outputs when the shift register load signal SRLOAD is true. Thus, when the SRLOAD signal is true, the contents of the KTRNBFR are clocked into the SR[6:0] register.

When the SRLOAD signal is false, the multiplexer 524 instead provides as its outputs the outputs of a multiplexer 526. When the SHIFT signal, used to switch the multiplexer 526, is false, the contents of the shift register SR[6:0] are provided as the outputs of the multiplexer 526, and therefore when the SHIFT signal is false and the SRLOAD signal is false, the contents of the SR[6:0] signals remain the same.

When the SHIFT signal is true, this signifies that the shift register SR[6:0] should be shifted, and therefore, the outputs of the multiplexer 526 are provided by its one input, which are provided as the SR[7: 1] signals. This causes a shift of the shift register SR.

The SR[7] signal is used to generate the parity of the transmitted data. It is provided by the output of a flip-flop 528, again clocked by the CLKI signal. As its D input, the flip-flop 528 receives the output of a multiplexer 530, which is switched by the SRLOAD signal. When the SRLOAD signal is true, the output of the multiplexer 530 is provided as the KTRNBUF[7] signal, thus loading the SR[7] signal with the value written to the KCDAT register 298 by the CPU 50. When the SRLOAD signal is false, however, the multiplexer 530 outputs the signal provided on its zero input, which is in turn provided by a multiplexer 532. The zero input for the multiplexer 532 is provided as its output when the shift signal is false maintaining the SR[7] signal in its present state. Otherwise, the multiplexer 532 provides as its output the signal provided on its one input, received from the output of a multiplexer 534. The multiplexer 534 is switched by the DATDRV signal, which when true indicates a data bit is being driven onto the CKC_DATO signal. If this is not true, then data is being received rather than transmitted, so the output of the multiplexer 534 is provided by its zero input, which is the DATAIN signal. This allows the received data to be shifted in. If the DATDRV signal is true, then the output of the multiplexer 534 is provided as its one input, which is in turn provided by an exclusive OR gate 536. As its input, the exclusive OR gate 536 receives the SR[7] signal and the SR[0] signal. The output of the exclusive OR gate 536 thus generates parity, each of the bits together as they are transmitted out, so that the SR[7] bit appropriately reflects the parity of the transmitted data once all of the bits have been sent.

The transmit buffer full signal TBF is provided by the output of a flip-flop 538, which receives as its input the output of an OR gate 540. As its inputs, the OR gate 540 receives a KCDAT_WRT_STB signal, which when true indicates that the CPU 50 has written to the KCDAT Register 298. When that signal goes true, the TBF signal should become true because data is available for transmission.

The other input of the OR gate 540 is provided by the output of an AND gate 542, whose inputs are provided by the inverse of the transmit buffer full clear signal TBF_CLR as well as the transmit buffer full signal TBF. Thus, when the TBF_CLR signal becomes true, the TBF signal is cleared.

Turning to FIG. 20, shown is the circuitry for providing BIT_COUNTER[2:0] signals which count the data bits that are transmitted by the virtual keyboard controller 206 to the keyboard 157 or 159. The BIT_COUNTER[2:0] signals are provided by the output of a flip-flop 544, clocked by the PCI clock CLKI, whose D inputs are provided by the outputs of a multiplexer 546. The multiplexer 546 is switched by the RST_BIT_COUNT signal, discussed in conjunction with FIG. 17A. When this signal is true, the multiplexer 546 provides zeros as its output from its one input, clearing the BIT_COUNTER register. When the RST_BIT_COUNT signal is false, the multiplexer 546 provides as its outputs the output of a multiplexer 548, which is switched by the COUNT signal. When the COUNT signal is zero, indicating the BIT_COUNTER register should not be incremented, the output of the multiplexer 548 is provided from its zero inputs, which are in turn provided by the BIT_COUNTER[2:0] signals themselves. When the COUNT signal is true, however, this indicates the BIT_COUNTER register should be incremented, so the multiplexer 548 provides as its outputs the signals received on its one inputs, which are in turn provided by an adder 550 that adds one to the value of the BIT_COUNTER[2:0] signals. Therefore, the BIT_COUNTER[2:0] register is reset when the RST_BIT_COUNT signal becomes true, and is incremented when the COUNT signal becomes true.

It is noted in FIG. 16A, the KT_DAT_H state 412 transitions to the KT_DAT_L state 410 as long as a CEQ7 signal is false. When the CEQ7 signal becomes true, eight data bits have been processed, so the KT_DAT_H state 412 then transitions to the KT_PAR_L state 410. Therefore, when seven bits have been output, the state machine of FIG. 15 thus transitions to output the parity bit. (This is true also for tracking the received data.) Therefore, the CEQ7 signal, or the count equal seven signal, is provided by a comparator 552, which includes three A inputs and three B inputs. The three A inputs are provided as the BIT_COUNTER[2:0] signals, and the three B inputs are hardwired to decimal 7. Therefore, when the BIT_COUNTER[2:0] signals equal 7, the CEQ7 signal becomes true, causing the state machine of FIG. 15 to transition to a parity receive or parity transmit state.

As described in FIGS. 15–20, and referring to the signal diagrams of FIG. 7, it is understood that the virtual keyboard controller 206 in effect acts as an 8042 keyboard controller. Using the state machine of FIG. 15, it receives the VKC_DATI and VKC_CLKI signals and provides the VKC_DATO and VKC_CLKO signals.

The Virtual Keyboard 204

The virtual keyboard 204 is very similar in implementation to the virtual keyboard controller 206. It receives the IRC_DATI and IRC_CLKI signals as inputs, and provides the IRC_CLKO and IRC_DATO signals as outputs. Again, the latter two signals are provided at reverse logic values than the former, while the former reflect what is present on the logical keyboard controller data and clock lines. The virtual keyboard 204 provides and uses the signals of the virtual keyboard registers of FIG. 8, and the virtual keyboard 204 provides an SMI signal SMIKBD. Additionally, however, the virtual keyboard 204 also receives as inputs the KBD_CHANGE_INT signals and the KBD_PRESENT signals.

One difference between the virtual keyboard 204 and the virtual keyboard controller 206 is that the virtual keyboard 204 can operate in either a master or a snoop mode. When in master mode, the virtual keyboard 204 actively responds to scan codes sent by the 8042 keyboard controller 156. For example, when the 8042 keyboard controller 156 sends a keyboard status command, the virtual keyboard 204, under SMM control, returns the appropriate scan codes representing that status.

When in snoop mode, set by the T_SNOOP and R_SNOOP bits in the KCFG register 294, the virtual keyboard 204 instead passively monitors transactions between the 8042 keyboard controller 156 and whichever of the external keyboards 157 or 159 is connected through the keyboard multiplexer 214. In this mode, the virtual keyboard 204 provides SMI interrupts to the system management mode 212 firmware when characters are transmitted between the physical 8042 keyboard controller 156 and connected keyboard 157 or 159, but does not actually drive the clock and data lines IRC_CLKO and IRC_DATO.

Because of the similarity between the state machines and the circuitry of the virtual keyboard 204 and the virtual keyboard controller 206, the differences are highlighted, and reference is made to the description of the virtual keyboard controller 206 in FIG. 15–20 for the parts that are essentially unchanged.

Figure 21:
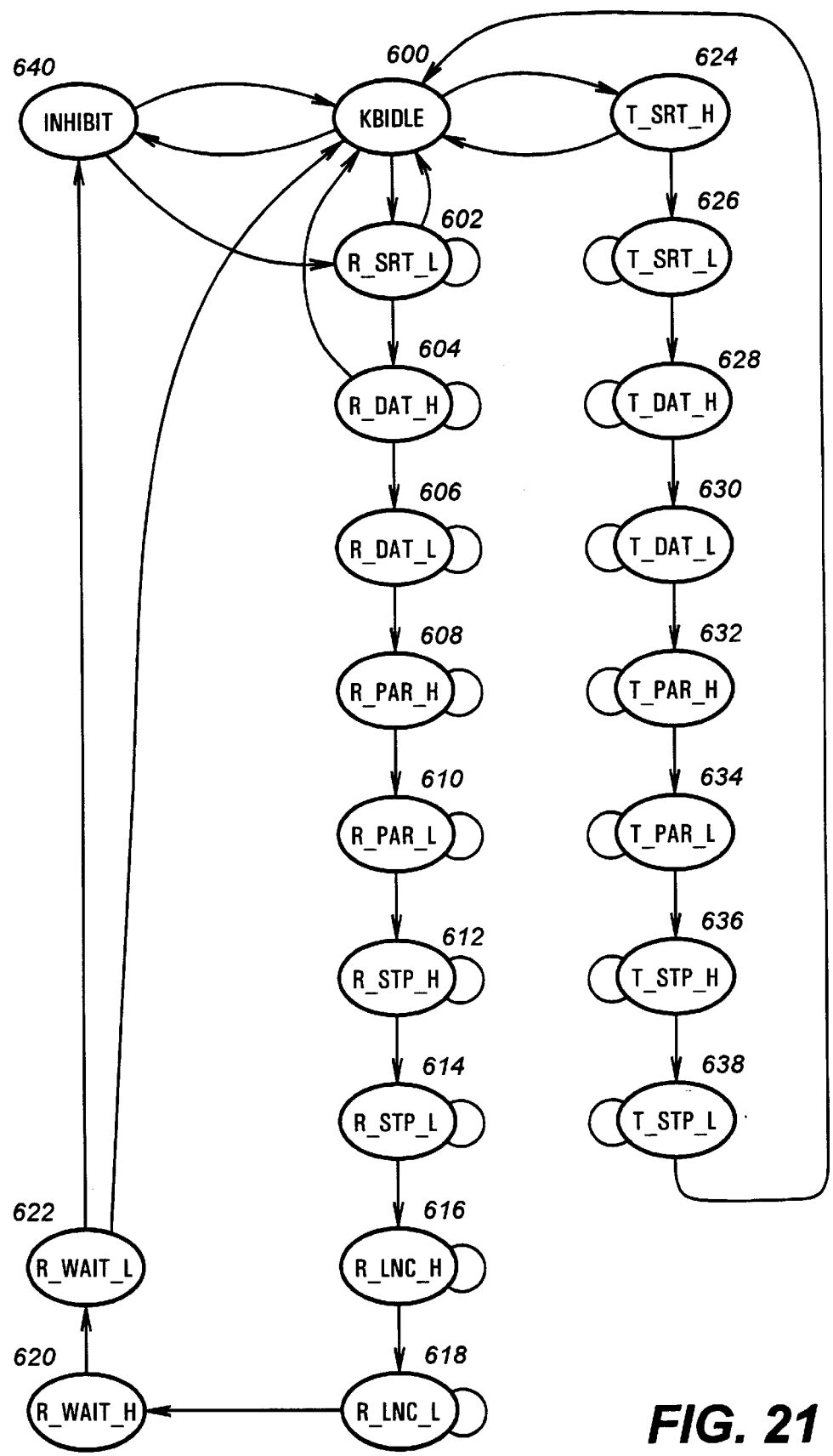
FIG. 21 is a state diagram illustrating the state transitions of the virtual keyboard within the integrated remote console according to the disclosed embodiment.

Turning to FIG. 21, shown is the state diagram for the virtual keyboard 204. As with the state machine of FIG. 15, the state machine of FIG. 21 includes a keyboard IDLE state KBIDLE 600, a sequence of receive states 602–622, which essentially correspond to the states 430–446 of FIG. 15, and a sequence of transmit states 624–638, that essentially correspond to the states 402–424 of FIG. 15. Further, an inhibit state 640 is included, but is used for the snoop mode.

Turning to FIGS. 22A–22C, the state transitions for the various states of FIG. 21 are shown. Again these, in large part, correspond to the state transitions of FIGS. 16A and 16B. An additional MASTER signal is used, and is true when hot plugging is enabled as indicated by the HPEN signal but the selected physical keyboard 157 or 159 is not plugged in, or is true if the KBD_SEL[1] signal is set in the KCFG register 294 of FIG. 8, indicating that the virtual keyboard 204 should be enabled regardless of what keyboards are connected. In any of these states, the virtual keyboard 204 should not merely snoop, but should actively drive the lines at appropriate times as would a real keyboard.

Turning to FIGS. 23A–23C, FIG. 23A illustrates various non-clocked signals used by the state machine of FIG. 21 and state transition logic of FIGS. 22A–22C, as well as by the virtual keyboard 204 circuitry illustrated in FIGS. 24–26, discussed below. Similarly, FIGS. 23B and 23C illustrate clocked signals used by the state machine of FIG. 21 and the logic of FIGS. 22A–22C, as well as the logic of FIGS. 24–26. Further, the signals generated in FIGS. 23A–23C are also used by the PCI bus 117 input/output logic used to provide and receive data and control signals for the virtual keyboard registers of FIG. 8.

Figure 24:
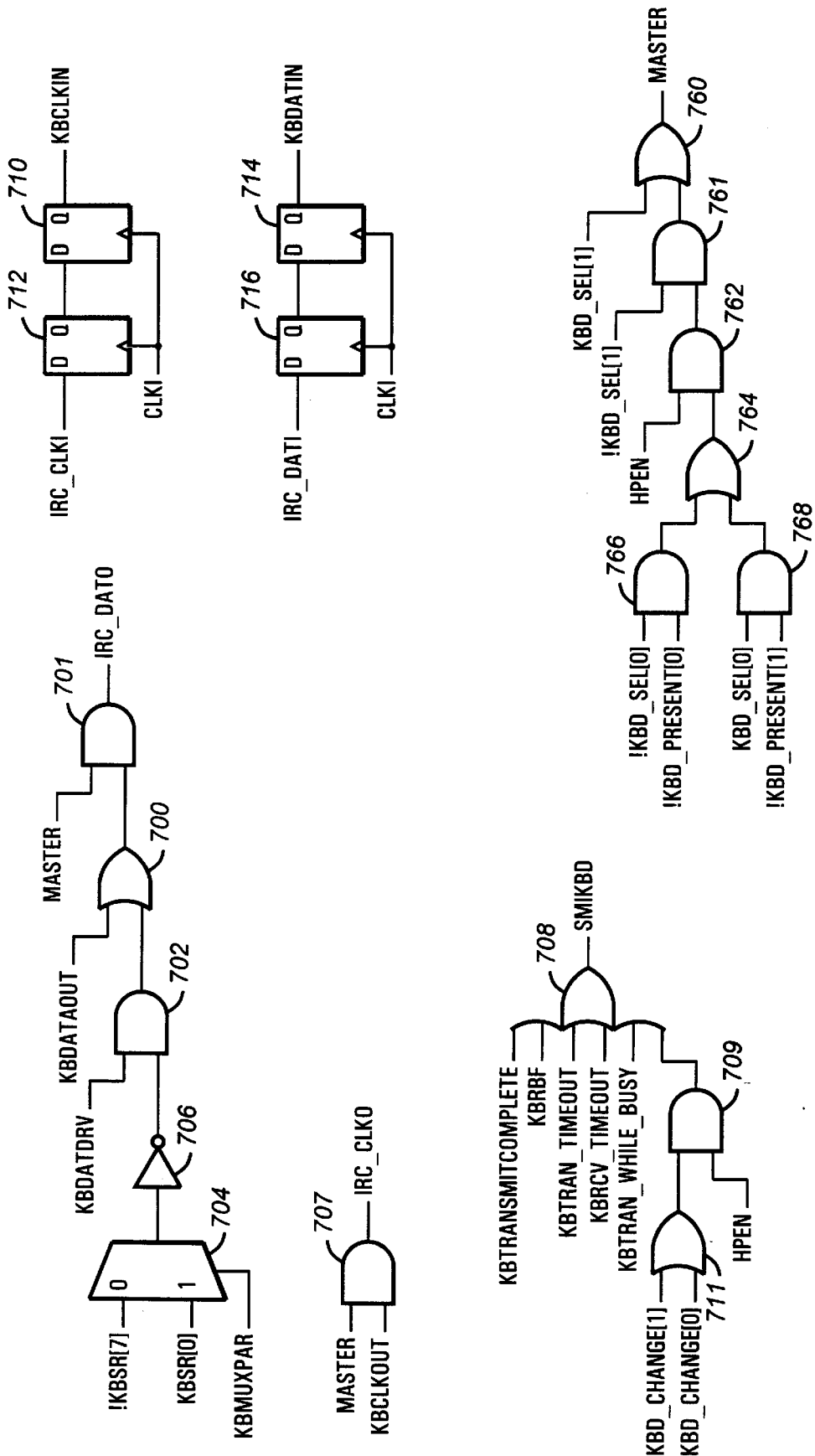
FIGS. 24–26 are schematic illustrations of various circuitry within the virtual keyboard implemented in the remote console according to the disclosed embodiment.

Turning to FIG. 24, shown is circuitry used to generate various of the signals corresponding to those generated in the virtual keyboard controller 206 in FIG. 18. The IRC__DATO signal is generated with circuitry similar to that used to generate the VKC_DATO signal, with the circuitry 700–706 corresponding to the circuitry 500 and 502–506 of FIG. 18. Unlike the VKC_DATO signal, however, the IRC_DATO signal is further generated when the signal output from the OR gate 700 is provided to an AND gate 701, which also receives as an input the MASTER signal. This additional signal prevents the IRC_DATO signal from being high, or active, when the MASTER signal is not true. Thus, when the virtual keyboard 204 is in snoop mode, the IRC_DATO signal is always low, when it is in master mode, allowing active control of the bidirectional clock and data lines, the IRC_DATO signal is generated by circuitry corresponding to that of FIG. 18.

The IRC_CLKO signal is provided by the KBCLKOUT signal (see FIG. 18 and the VKC_CLKO and CLKOUT signals), but an AND gate 707 is provided, receiving the KBCLKOUT signal and the MASTER signal, allowing the MASTER signal to mask the IRC_CLKO signal when the MASTER signal is false.

An SMIKBD signal, which corresponds to the SMIKCNTR signal of FIG. 18, is similarly provided by an OR gate 708, corresponding to the OR gate 508 of FIG. 18. In this case, the virtual keyboard signals corresponding to the keyboard controller signals of FIG. 18 are provided as inputs to the OR gate 708, specifically the KBTRANSMIT_COMPLETE signal, the KBRBF signal, the KBTRAN_TIMEOUT signal, the KBRCV_TIMEOUT signal, and the KBTRAN_WHILE_BUSY signal. Further, however, the output of an AND gate 709 is provided as an input to the OR gate 708. The AND gate 709 receives as inputs the hot plug enable HPEN signal and the output of an OR gate 711. The OR gate 711 receives the KBD_CHANGE[1] and KBD_CHANGE[0] signals. When either of these two signals is true, that indicates that the plugged or unplugged status of those keyboards has changed. (See FIG. 10.) If that is true and hot plugging is enabled as indicated by the HPEN signal, then the SMIKBD signal should force an SMI interrupt to the system management mode 212 firmware to process the newly plugged or unplugged keyboard 157 or 159.

The KBCLKIN and KBDATAIN signals are provided by flip-flops 710–716, clocked by the CLKI signal and receiving as inputs the IRC_CLKI and IRC_DATI signals. The circuitry operates as does the corresponding circuitry 510–516 illustrated in FIG. 18.

To provide for the snoop mode versus the active, master mode, the MASTER signal is provided by the output of an OR gate 760, which receives as one input the KBD_SEL[1] signal. When this signal is true, that indicates the virtual keyboard 204 is arbitrarily enabled as indicated by the KCFG register 294. Therefore, the MASTER signal should be true, forcing the virtual keyboard 204 to actively driving the data and clock lines to the 8042 keyboard controller 156.

The other input to the OR gate 760 is the output of an AND gate 761, which includes as inputs the !KBD_SEL[1] signal and the output of an AND gate 762. The AND gate 762 includes as inputs the HPEN signal and the output of an OR gate 764. If the HPEN signal is false, this indicates hot plugging is not enabled, and the virtual keyboard 204 should never be enabled unless it is specifically selected through the KBD_SEL[1] signal of the KCFG register 294. If hot plugging is enabled, however, the MASTER signal should also be enabled when the selected keyboard 157 or 159 is not present and connected. This is determined by the inputs to the OR gate 764, which are provided by AND gates 766 and 768. The AND gate 766 includes as inputs the inverse of the KBD_SEL[0] signal and the inverse of the KBD_PRESENT[0] signal. These inputs are true if the primary keyboard 157 is selected but not present. Similarly, the inputs to the AND gate 768 are the non-inverted KBD_SEL[O] signal and the inverse of the KBD_PRESENT[1] signal. Both of these inputs will be true when the secondary keyboard 159 is selected but not present. If either of these conditions is true, the MASTER signal should be true if hot plug is enabled, because the virtual keyboard 204 should take the place of the selected but absent keyboard 157 or 159.

Figure 25:
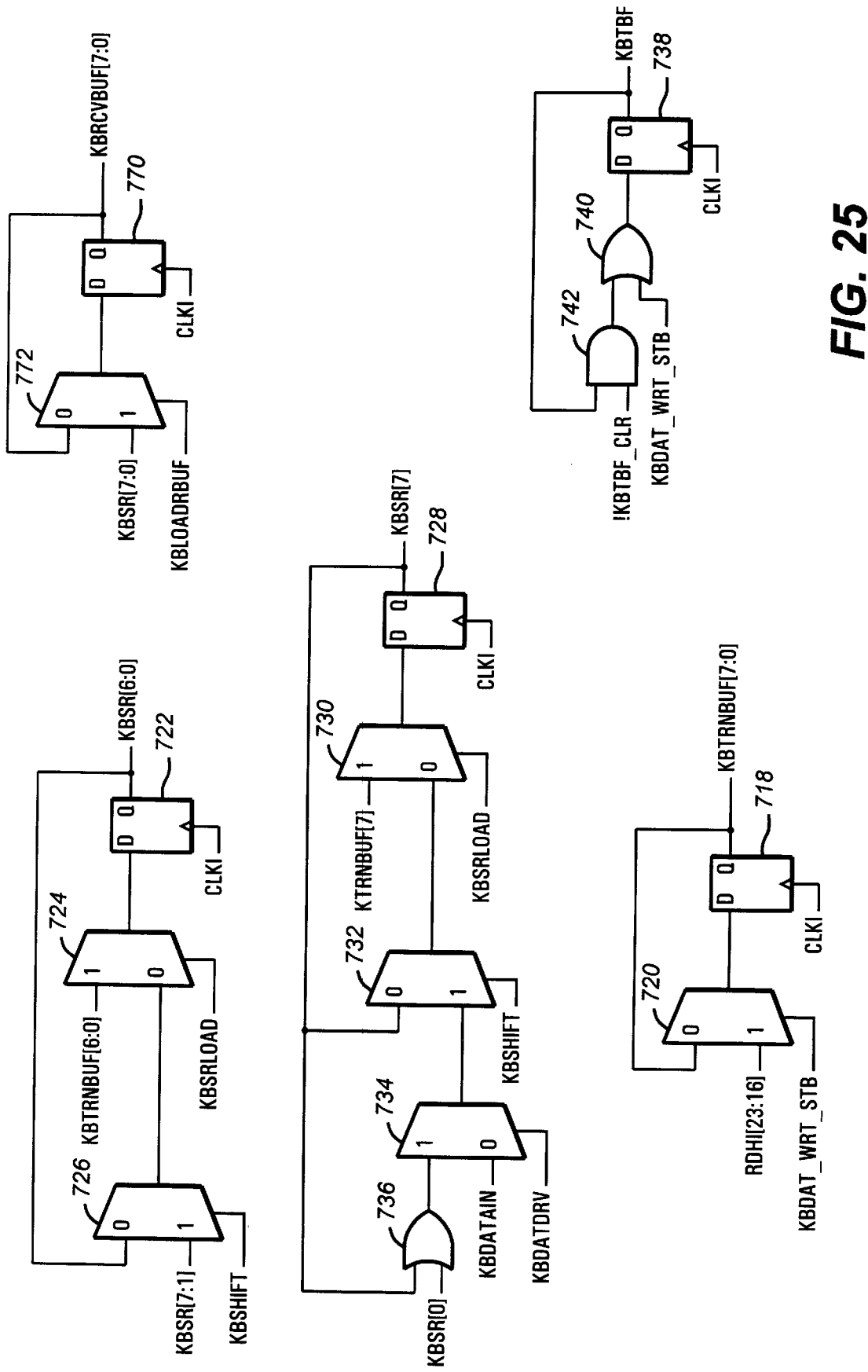

Turning to FIG. 25, the circuitry for generating the KBDTRNBUF[7:0] signals, the KBSR[7:0] signals, and the KBTBF signal are all shown, illustrated by the circuitry 718–742. This circuitry is identical to the circuitry of FIG. 19, except that the virtual keyboard 204 signals are used instead of the virtual keyboard controller 206 signals. Refer to FIG. 19 for a discussion of the generation and operation of those various signals.

A keyboard receive buffer KBRCVBUF[7:0] is provided by the outputs of a flip-flop 770, clocked by PCI clock signal CLKI and receiving as its inputs the output of a multiplexer 772. The multiplexer 772 is switched by the KBLOADRBUF signal. When KBLOADRBUF is false, the KBRCVBUF signals are circular in routed from the zero input to the output of the multiplexer 772, thus providing the KBRCVBUF[7:0] signals in the same state. Otherwise, the one inputs to the multiplexer 772 are routed to the input of the flip-flop 770, so that the KBSR[7:0] signals are routed into the receive buffer KBRCVBUF. Therefore, when the KBLOADRBUF signal becomes true, the keyboard shift register KBSR signals are clocked into the keyboard receive buffer KBRCVBUF, so that they can subsequently be read by the CPU 50 through a PCI bus 117 I/O read from the KDAT register 292.

Figure 26:
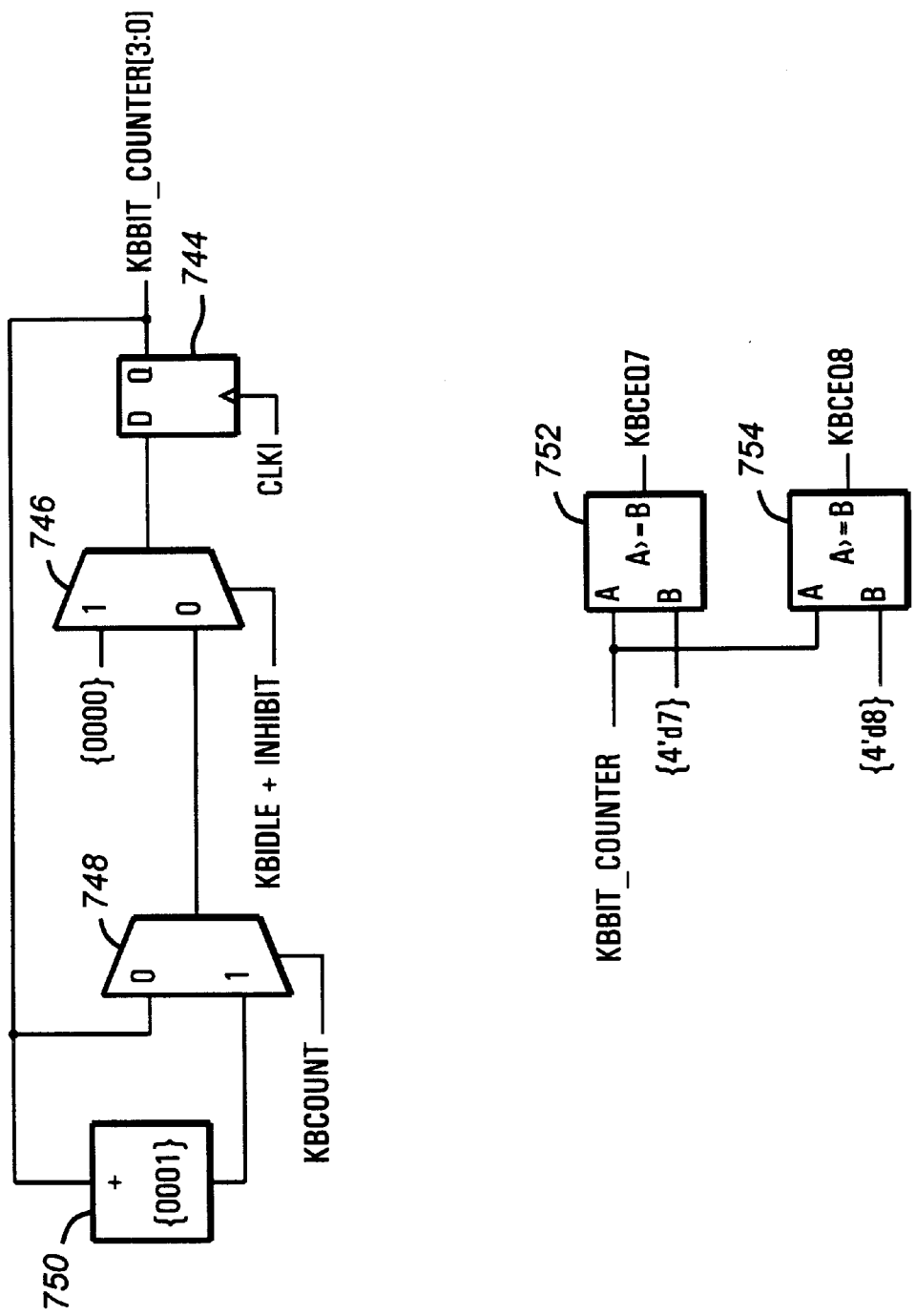

Turning to FIG. 26, shown is the circuitry for generating the keyboard bit counter KBBIT_COUNTER[3:0]. This circuitry is similar to the circuitry of FIG. 20 with the logic 744–750 corresponding to the logic elements 544–550 of FIG. 20, except that four bits are provided rather than three, and that the multiplexer 746 is switched by the KBDIDLE state or the INHIBIT state being true. Reference to the discussion of FIG. 20 shows that this is essentially the same state as the RST_BIT_COUNT signal becoming true.

The equivalent of the CEQ7 signal of FIG. 20 is provided by a comparator 752, corresponding to the comparator 552. Thus the KBCEQ7 signal becomes true when the KBBIT_COUNTER reaches 7. In addition, however, a comparator 754 provides a KBCEQ8 signal as true whenever the KBBIT_COUNTER (the A input) becomes equal to or greater than the B input. This signal is in turn used by the state machines of FIG. 21.

The System Software of the System Management Mode

Main IRC Related Interrupt Handler

Figure 27:
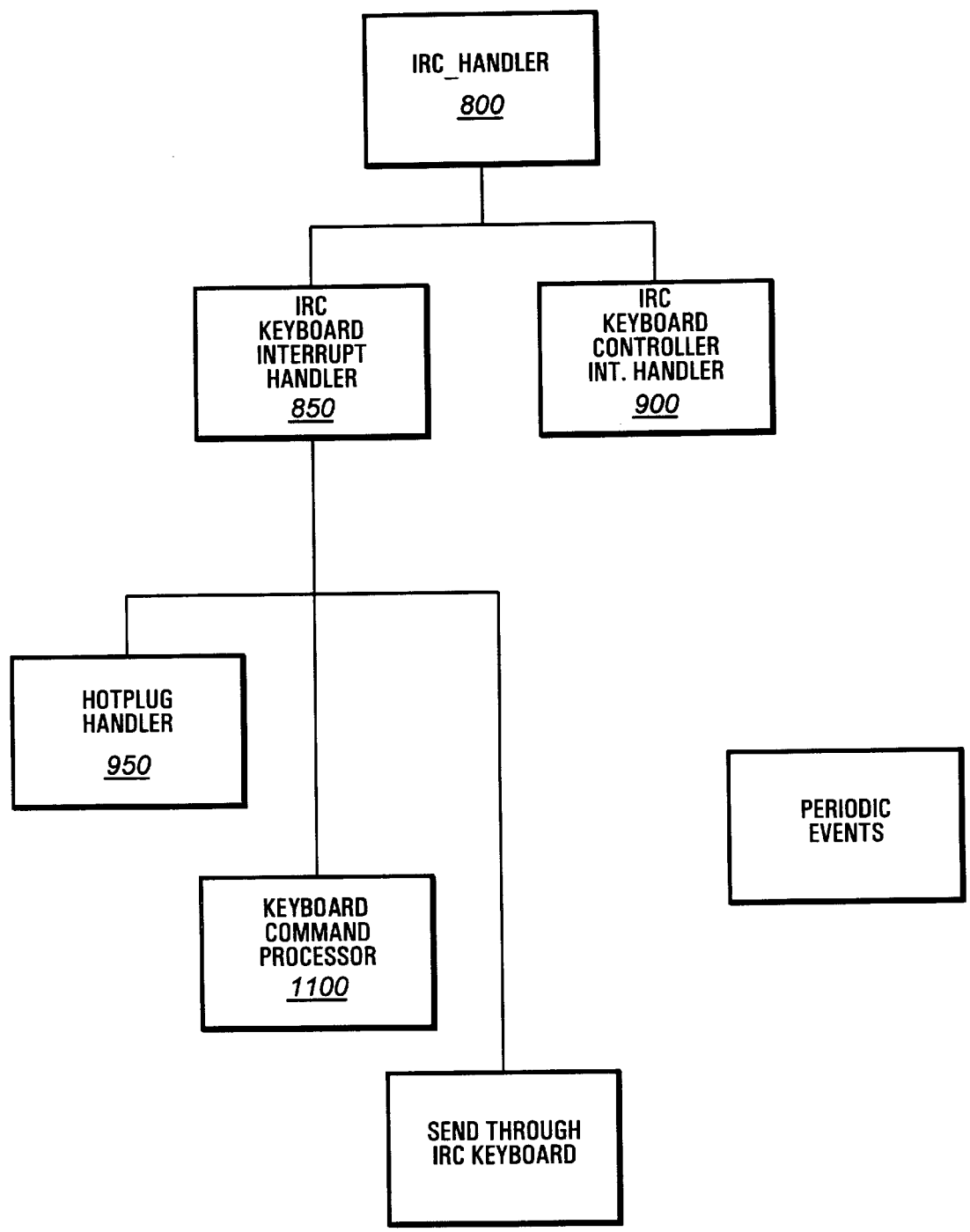
FIG. 27 is a block diagram illustrating various logical portions of system management mode software which communicates with the virtual keyboard, virtual keyboard controller, and keyboard multiplexer of the integrated remote console according to the disclosed embodiment.

Turning to FIG. 27, shown is a block diagram of how the principal pertinent portions of the SMM 212 software interrelate. At the top level is an IRC_HANDLER routine 800 (see FIG. 28). This routine is called by the SMM 212 software after an SMI is caused by the IRC 170.

Although the IRC_HANDLER routine 800 processes other IRC 170 related events, two event sources are of principal interest. These are keyboard related events corresponding to the KSTAT register 290 of FIG. 8 and keyboard controller related events corresponding to the KCSTAT register 296 of FIG. 9. The keyboard events are handled by an IRC keyboard interrupt handler routine KEYBOARD_INT 850 (see FIG. 29). The IRC controller related events are processed by an IRC keyboard controller interrupt handler routine KEYBOARD_CONTROL_INT 900 (see FIG. 30).

Keyboard related events are further processed by subroutines of the IRC KEYBOARD_INT routine 850. These include a hot plug handler routine HOTPLUG_HANDLER 950, which processes plug and unplug events (see FIGS. 31A–C) and a keyboard command processor routine PROCESS_KEYBOARDCOMMAND 1100, which parses commands received from the 8042 keyboard controller 156 by the virtual keyboard 204 and prepares appropriate responses (see FIGS. 32A–D), and an integrated remote console routing routine, which although not discussed in detail, is called in step 812 of the IRC_HANDLER routine 800 of FIG. 28.

Further, because system management mode 212 cannot be maintained for prolonged periods, when delays of more than a few microseconds are needed, these delays must be scheduled through timer interrupts. These SMI timer interrupts are handled by periodic events routines, discussed in conjunction with an SMI_TIMER routine 1200 (see FIGS. 33A–D).

Figure 28:
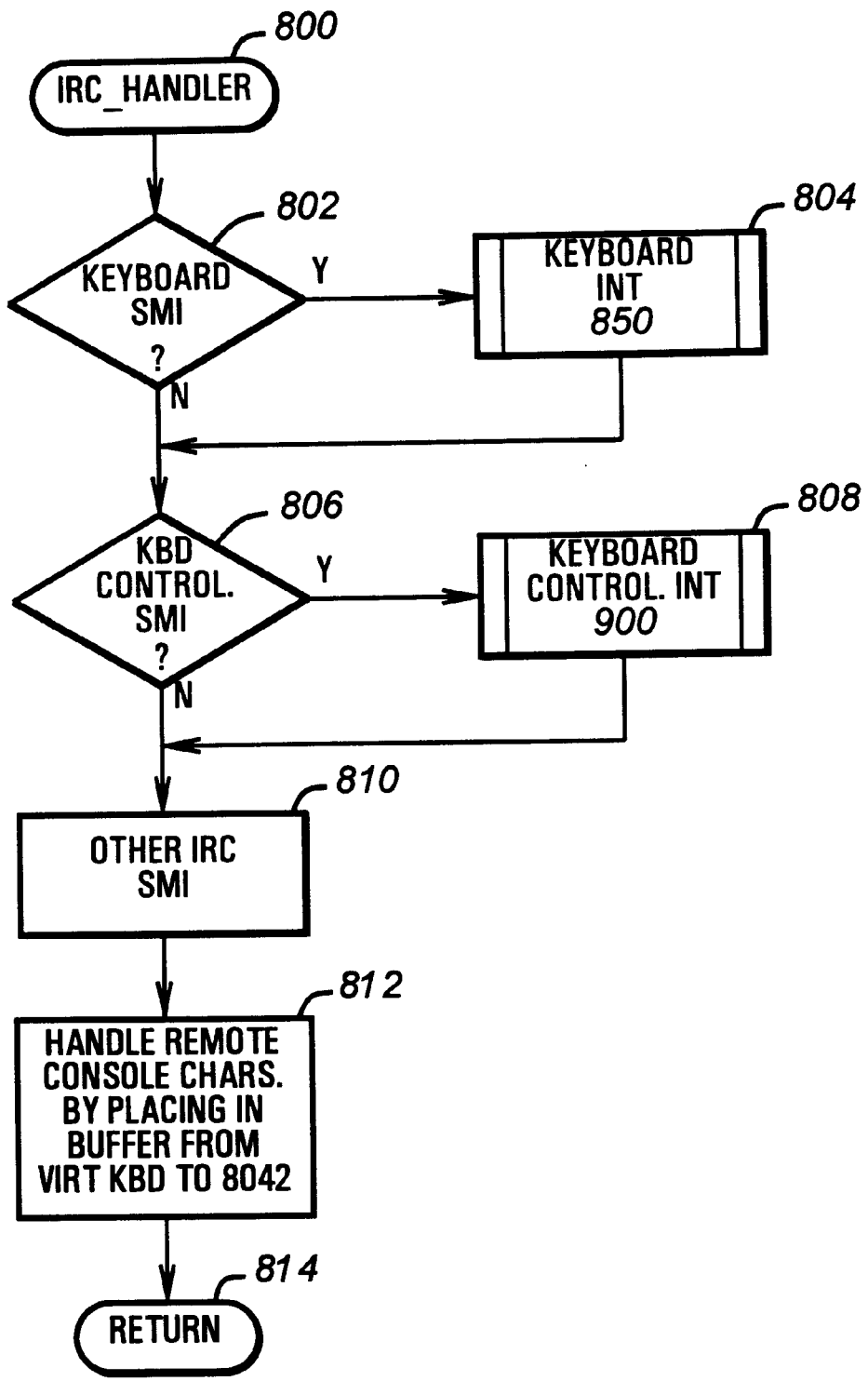
FIG. 28 is a flowchart of an integrated remote console system management interrupt handler according to the disclosed embodiment.

Turning to FIG. 28, a flowchart of the most pertinent portions of the IRC_HANDLER routine 800 are shown. The IRC_HANDLER routine 800 is entered when an SMI interrupt occurs to the CPU 50. There are numerous other sources for SMI events in the computer system S, but as part of checking for the source of these events, the general SMI routine calls the IRC_HANDLER routine 800. For purposes of the hot pluggable and unpluggable keyboard according to the invention, two particular SMI sources are the most pertinent keyboard events and keyboard controller events. Proceeding to step 802, it is determined whether the SMI entry was caused by a keyboard event. Referring to FIG. 8, there are five sources for such keyboard events. These are a keyboard plug or unplug status change (reflected by KSTAT[9:8]); a transmit timeout from the virtual keyboard 204 to the 8042 keyboard controller 156 (reflected by KSTAT[6]); a virtual keyboard 204 receive timeout (reflected by KSTAT[5]); the virtual keyboard 204 receive buffer becoming full, indicating a received scan code (reflected by KSTAT[0]); or a transmission of the current keyboard scan code being complete (reflected by KSTAT[3]). On any of these particular events, it is necessary for the system management mode 212 firmware to respond. This is further discussed below in conjunction with FIG. 29. In any case, if the current SMI is a keyboard related SMI from the IRC 170, control proceeds to step 804, where a keyboard interrupt routine 850 (FIG. 29) is executed.

Control otherwise proceeds from step 802, and in any case proceeds from step 804 to step 806, where it is determined whether the source of the SMI was either, or also, an interrupt relating to the virtual keyboard controller 206. The events causing a virtual keyboard controller 206 interrupt are illustrated by the KCSTAT register 296 of FIG. 9. On a transmission timeout or error (KCSTAT[6]), a receive timeout (KCSTAT[5]), a transmit complete (KCSTAT[3]), or receive buffer full (KCSTAT[0]), an SMI is initiated through the SMIKCNTR signal of FIG. 7. This indicates that the system management mode firmware 212 should appropriately handle a transmission to or from one of the external keyboards 157 or 159. Therefore, control proceeds in this case from step 806 to step 808, where a keyboard controller interrupt routine 900 (FIG. 30) is called.

From step 808, and from step 806 if a keyboard controller SMI is not initiated, control proceeds to step 810, where other IRC 170 related system management interrupts are processed. These include, for example, virtual COM device 200 events and video snoop/encode block 202 events, all used for the integrated remote console through the modem 149.

Control then proceeds to step 812, where if in remote console mode through the modem 149, characters from that remote console are converted to scan codes and placed in a holding buffer so that they can ultimately be sent from the virtual keyboard 204 to the 8042 keyboard controller 156. These characters, after conversion to appropriate scan codes, are sent from the virtual keyboard 204 to the 8042 keyboard controller 156 through routines executed by the keyboard interrupt handler, keyboard interrupt routine 850. That is, when the transmit buffer is clear, keyboard interrupt routine 850 will ultimately send scan codes through the KDAT register 292 (FIG. 8) for transmission to the 8042 keyboard controller 156. Thus it will appear as though the remote console connected to the modem is actually a local keyboard connected to the system 8042 keyboard controller 156, making the remote console mode extremely transparent for system software executing on the CPU 50. Again, this is all handled through the system management mode 212 firmware. Proceeding to step 814, control returns to the general SMI handler.

Keyboard Related Interrupts

Figure 29:
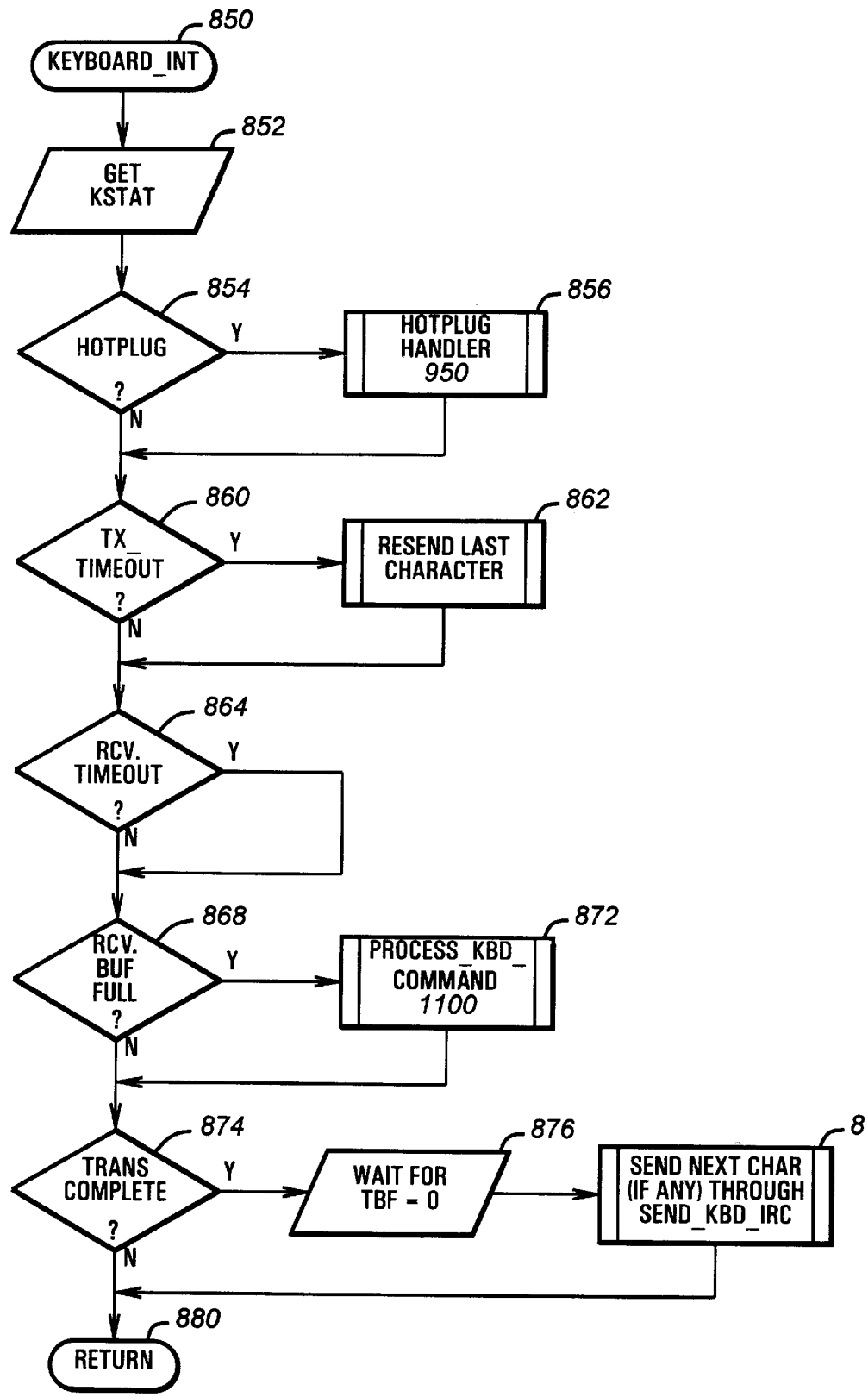
FIG. 29 is a flowchart of a keyboard interrupt processing routine called by the routine of FIG. 28.

Turning to FIG. 29, a flowchart illustrating pertinent portions of the keyboard interrupt routine 850 is shown. Proceeding first to step 852, the keyboard status register KSTAT 290 (FIG. 8) is read over the PCI bus 117. Proceeding to step 854, it is determined whether the system management interrupt was caused by a change in the plugged or unplugged status of the primary or secondary keyboards 157 and 159. This is indicated by the KBD_CHANGE[1:0] signals, which are read through the KSTAT[9:8] register bits 290. If the plugged status has changed, control proceeds to step 856, where a hot plug handler routine 950 (FIGS. 31A–31B) is called. In general, this routine 950 connects the virtual keyboard controller 206 to a newly installed keyboard 157 or 159 so that the newly installed keyboard 157 or 159 can then be initialized to the present status of either the currently installed keyboard or the virtual keyboard 204. When the keyboard 157 or 159 in use is unplugged, the hot plug handler either switches to the other available keyboard 157 or 159, or if no keyboard 157 or 159 is installed, switches the virtual keyboard 204 into master mode such that it provides responses to the 8042 keyboard controller 156. This is further discussed below in conjunction with the hot plug handler routine 950.

From step 854, if the SMI was not caused by a hot plug event, and from step 856 in any case, control proceeds to step 860, where it is determined whether the keyboard related SMI was caused by a transmission timeout (KSTAT [6]). This is true when either the virtual keyboard 204 transmitted the previous byte while a scan code was being received from the 8042 keyboard controller 156, or the 8042 keyboard controller 156 failed to timely respond to a transmission of a scan code by the virtual keyboard 204. In these events, control proceeds to step 862, where the last byte sent to the virtual keyboard 204 for transmission to the 8042 keyboard controller 156 is resent. This is achieved by placing the character in a transmit queue so that when the virtual keyboard 204 transmit buffer is no longer full, that byte will be sent to the virtual keyboard 204 for a retransmission to the 8042 keyboard controller 156.

Control then proceeds from step 860 if there was no transmission timeout, and from step 862 in any case, to step 864, where it is determined whether the keyboard related SMI was caused by a receive timeout. This is determined to be true when the KBRCV_TIMEOUT signal is true, as reflected by KSTAT[5]. On a receive timeout, no particular action is taken.

From step 864 in both cases, control proceeds to step 868, where it is determined whether the keyboard related SMI pertains to the receive buffer becoming fill. This is true if the KBRBF signal is true (KSTAT[0]). When the receive buffer is full, this indicates a scan code has been received in the virtual keyboard 204 from the 8042 keyboard controller 156, or that the virtual keyboard 204 has snooped an exchange between the 8042 keyboard controller 156 and the connected keyboard 157 or 159 if the virtual keyboard 204 is in snoop mode. If true, control first proceeds to step 872, where the keyboard character is processed in a PROCESS_KBD_COMMAND routine 1100 (FIGS. 32A–D). The PROCESS_KBD_COMMAND routine 1100 in essence parses the scan code received by the virtual keyboard 204 from the 8042 keyboard controller 156 and, if in master mode, forms an appropriate response, both by sending scan codes for transmission to the 8042 keyboard controller 156 and by setting variables internal to the system management mode 212 firmware to maintain a "shadow" keyboard status. Although the virtual keyboard 204 is not a physical keyboard, it must maintain the status of its "lights" its "repeat rate," and other persistent keyboard parameters so that when physical keyboard 157 or 159 is hot plugged, the virtual keyboard controller 206 can then initialize that newly installed keyboard to reflect the state of the virtual keyboard 204.

From step 872, and from step 868 when the receive buffer is not full, control proceeds to step 874, where it is determined whether a transmission by the virtual keyboard 204 is complete. This is indicated by the KBTRANSMITCOMPLETE signal (KSTAT[3]). If a transmission is complete, a read of the KSTAT register 290 will have cleared that particular bit, therefore eliminating multiple interrupts. Proceeding to step 876, the KSTAT[1] register 290 bit, reflecting the state of the KBTBF signal, is read until the transmit buffer full signal is no longer true. That indicates that another scan code can be sent over the PCI bus 117 and through the KDAT register 292 to the virtual keyboard 204 for transmission to the 8042 keyboard controller 156. Therefore, control proceeds to step 878 where the next character (if any) is sent to the 8042 keyboard controller 156. This is achieved through a SEND_KBD_IRC routine, which sends a pending scan code, if present, to the virtual keyboard 204 for transmission to the 8042 keyboard controller 156. The buffer holding these scan codes is loaded, for example, by the PROCESS_KBD_COMMAND routine 1100, which places acknowledge scan codes into this buffer. From step 878, and from step 874 if a transmit complete event is not the source of the SMI, control proceeds to step 880 where the routine 850 returns to the IRC_HANDLER routine 800 (FIG. 28) which called it at step 804.

Keyboard Controller Related Interrupts

Figure 30:
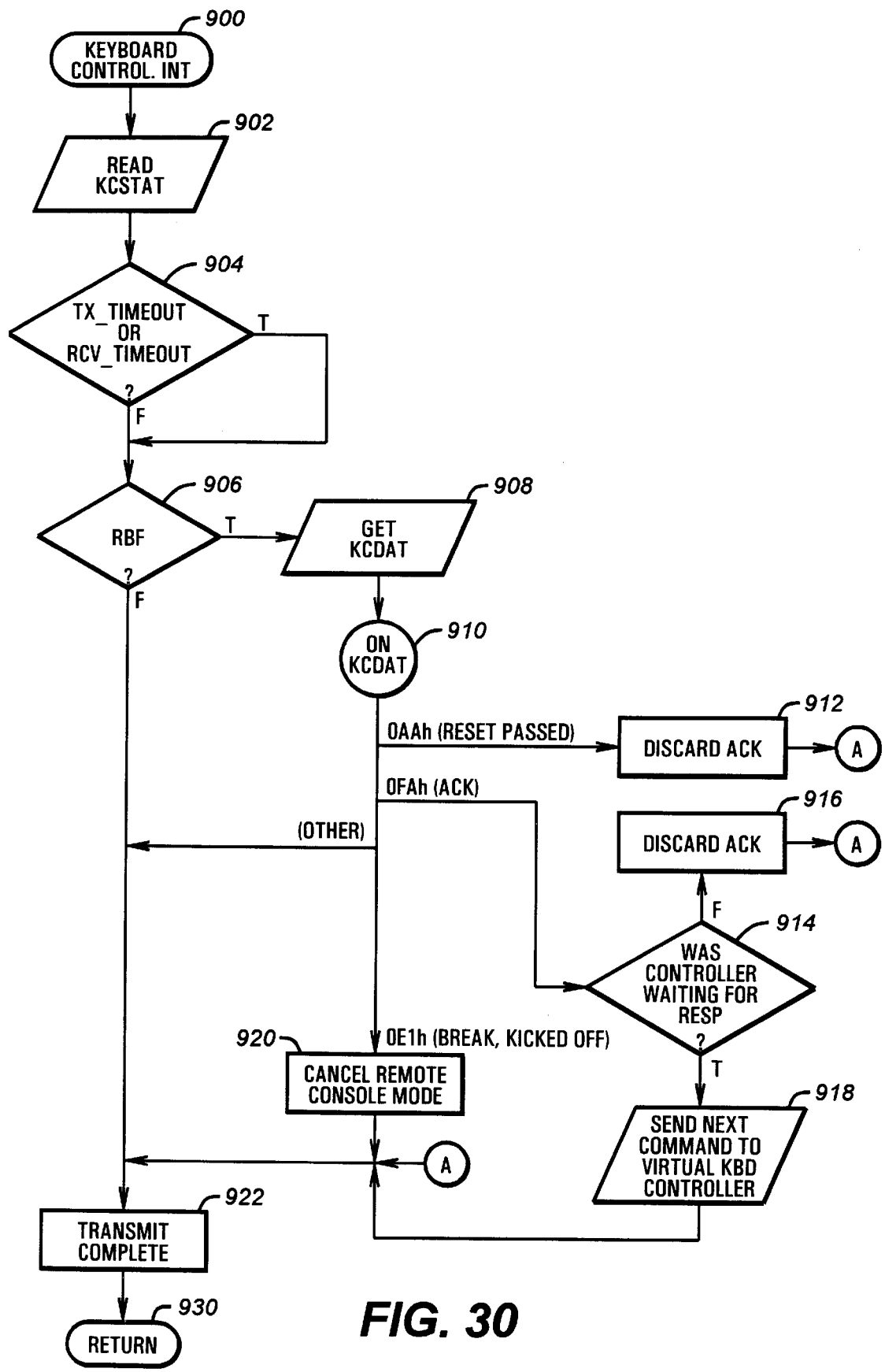
FIG. 30 is a keyboard controller interrupt routine called by the routine of FIG. 28.

Turning to FIG. 30, shown is the keyboard controller interrupt routine 900, called by the IRC_HANDLER routine 800 at step 808. This routine 900 processes SMI interrupts caused by the virtual keyboard controller 206. These will occur, for example, when data is received from a connected external keyboard, or when the transmit buffer to an external keyboard becomes empty, as well as on various error conditions. Proceeding to step 902, the cause of the virtual keyboard controller 206 SMI is determined by reading the KCSTAT register 296, which contains a bit representative of the source.

Proceeding to step 904, it is determined whether the virtual keyboard controller 206 SMI was caused by a transmission error or timeout or a receive timeout. These conditions are reflected in the KCSTAT[6:5] register 296 bits. If one of these is the cause, no particular action is taken. From step 904, control proceeds to step 906, where it is determined whether the virtual keyboard controller 206 read buffer is full as reflected by the RBF signal (KCSTAT[0]). If so, then a scan code has been received by the virtual keyboard controller 206 from the external keyboard 157 or 159.

From step 906, on a receive buffer full event control proceeds to step 908, where the KCDAT register 298 is read, reading in the scan code received by the virtual keyboard controller 206. Then at step 910, a case statement on the read contents of the KCDAT register 298 causes an appropriate branch. If the scan code was 0AAh, or a reset passed, control proceeds to step 912. A reset passed code occurs as an affirmative result to a reset scan code (sent at step 1020 of FIG. 31C). This response is discarded, as is discussed in conjunction with FIGS. 33A–D. Therefore, nothing is done.

If the scan code received was an OFAh, or an acknowledge character, control proceeds instead from step 910 to step 914. If a previous command had not been sent that would invoke an acknowledge, control proceeds to step 916, where the acknowledge is discarded. From step 914 if the virtual keyboard controller 206 was expecting a response because the keyboard controller interrupt routine 900 had previously sent scan codes requiring an acknowledge to the attached keyboard 157 or 159, then control proceeds to step 918, where a next command, if any, is sent to the virtual keyboard controller 206. A scan code, if available, is read from the keyboard controller transmit buffer in the system management mode 212 firmware and is written to the virtual keyboard controller 206 through the KDAT register 298. That scan code will then be transmitted to the attached keyboard 157 or 159.

If the scan code received from the keyboard was an OE1h scan code, which corresponds to a break scan code, then this is a special "hot key" that cancels remote console mode. If a user is externally connected through the modem 149 and is operating in remote console mode, the attached keyboard 157 or 159 is connected to the virtual keyboard controller 206 instead of the physical 8042 keyboard controller 156. By hitting this special key, however, the user causes the system management mode 212 firmware to cut the modem 149 link, cancel the remote console mode, and then reconnect the keyboard 157 or 159 with the actual 8042 keyboard controller 156, again permitting local operation.

From steps 912, 916, 918, and 920, and step 910 on other characters, control proceeds to step 922, where it is verified that transmission of a scan code is complete, as reflected by the KCSTAT[3] register 296 bit which provides the TRANSMITCOMPLETE signal. Control proceeds to step 930, where the routine returns to the IRC_HANDLER routine 800.

The previous discussion of FIGS. 28–30 thus provides a general overview of the operation of the system management mode 212 firmware. When the keyboard 157 or 159 is plugged and unplugged from the IRC 170, it is appropriately initialized by the virtual keyboard controller 206 and then once initialized, connected to the 8042 keyboard controller 156. The actual initialization sequences are discussed below in conjunction with FIGS. 31A–31C.

Before a keyboard is plugged into the IRC 170, the virtual keyboard 204 communicates with the 8042 keyboard controller 156, providing appropriate responses (thus preventing a lock-up on boot) and also tracking the state of the keyboard as initialized by the 8042 keyboard controller 156. Thus, when a physical keyboard 157 or 159 is connected to the IRC 170, the virtual keyboard controller 206 programs the newly installed keyboard 157 or 159 by writing scan codes from the system management mode 212 firmware. Further, the system management mode 212 firmware actually tracks the state of the virtual keyboard 204 and determines the appropriate responses to provide through the virtual keyboard 204. The virtual keyboard 204 within the IRC 170 forms a conduit for those appropriate scan codes.

The use of system management mode 212 allows flexibility in that a hardware ASIC can be used for the IRC 170, but the software of the system management mode 212 firmware can be changed. But a separate microcontroller or a separate ASIC that embodied all of the logic of both the system management mode 212 firmware and the virtual keyboard 204, virtual keyboard controller 206, and presence detection logic could be implemented without detracting from the hot-plug ability according to the invention.

Hot Plug Routines

Figure 31A:
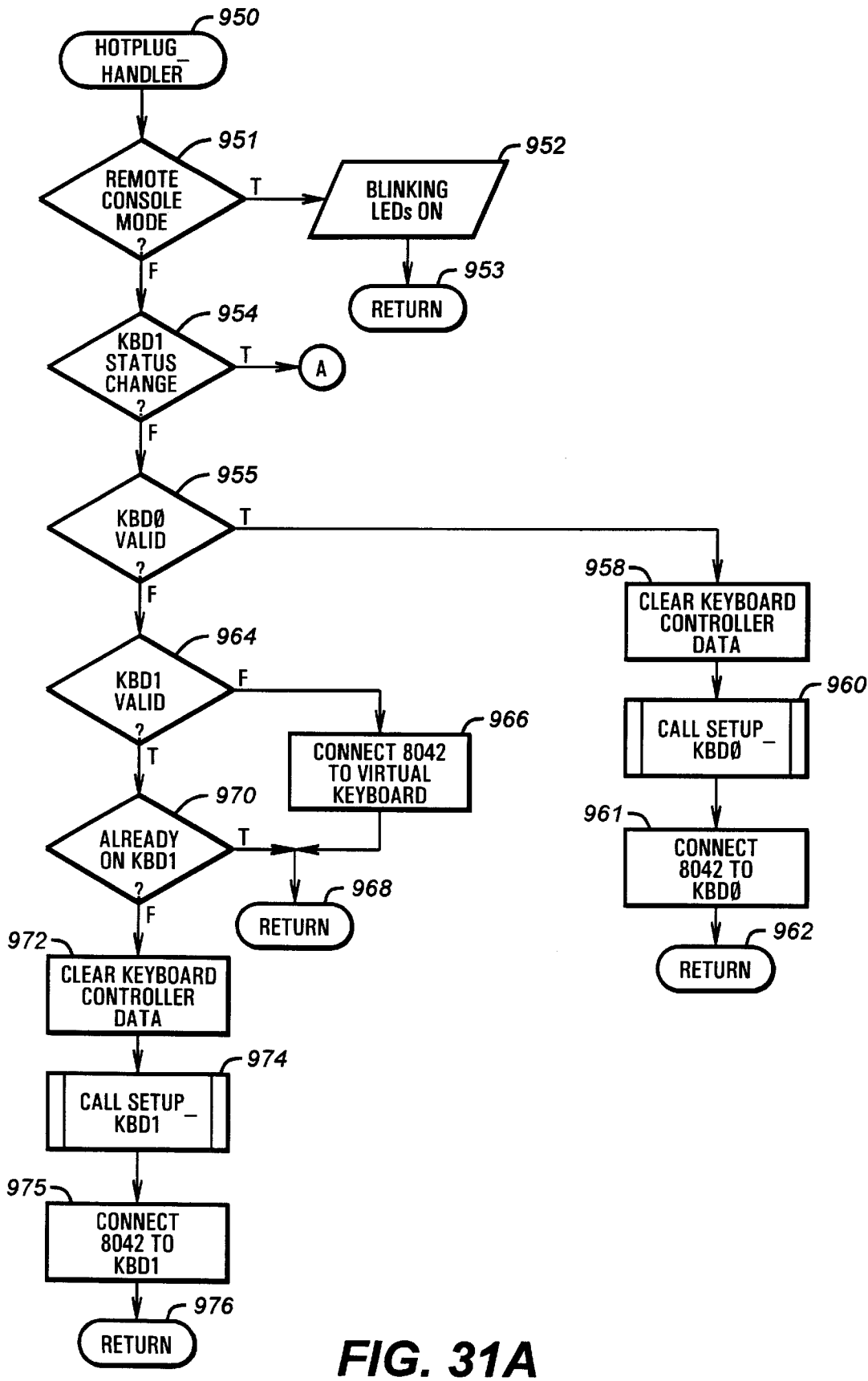
FIGS. 31A–C are flowcharts of a hot-plug routine called by the routine of FIG. 28.
Figure 31B:
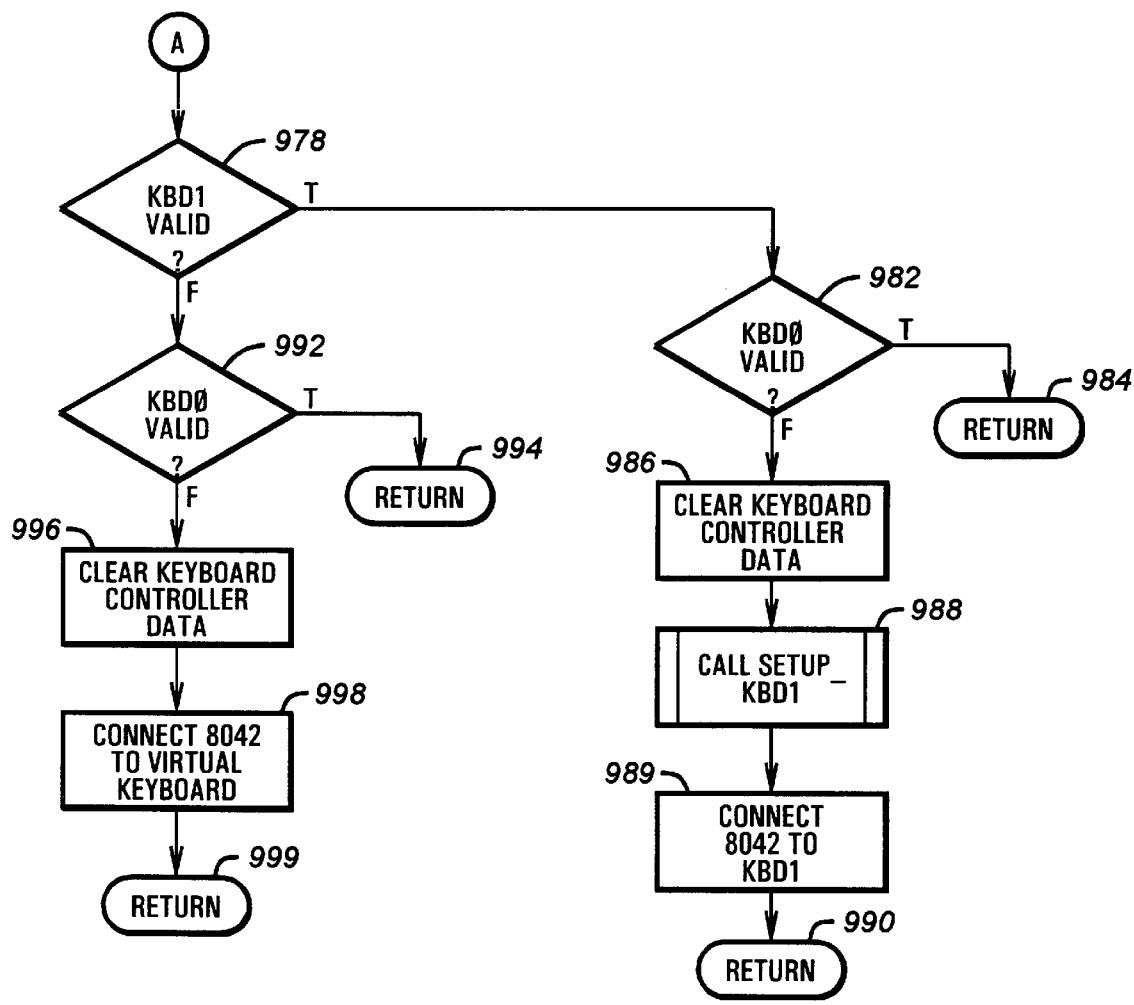
Figure 31C:
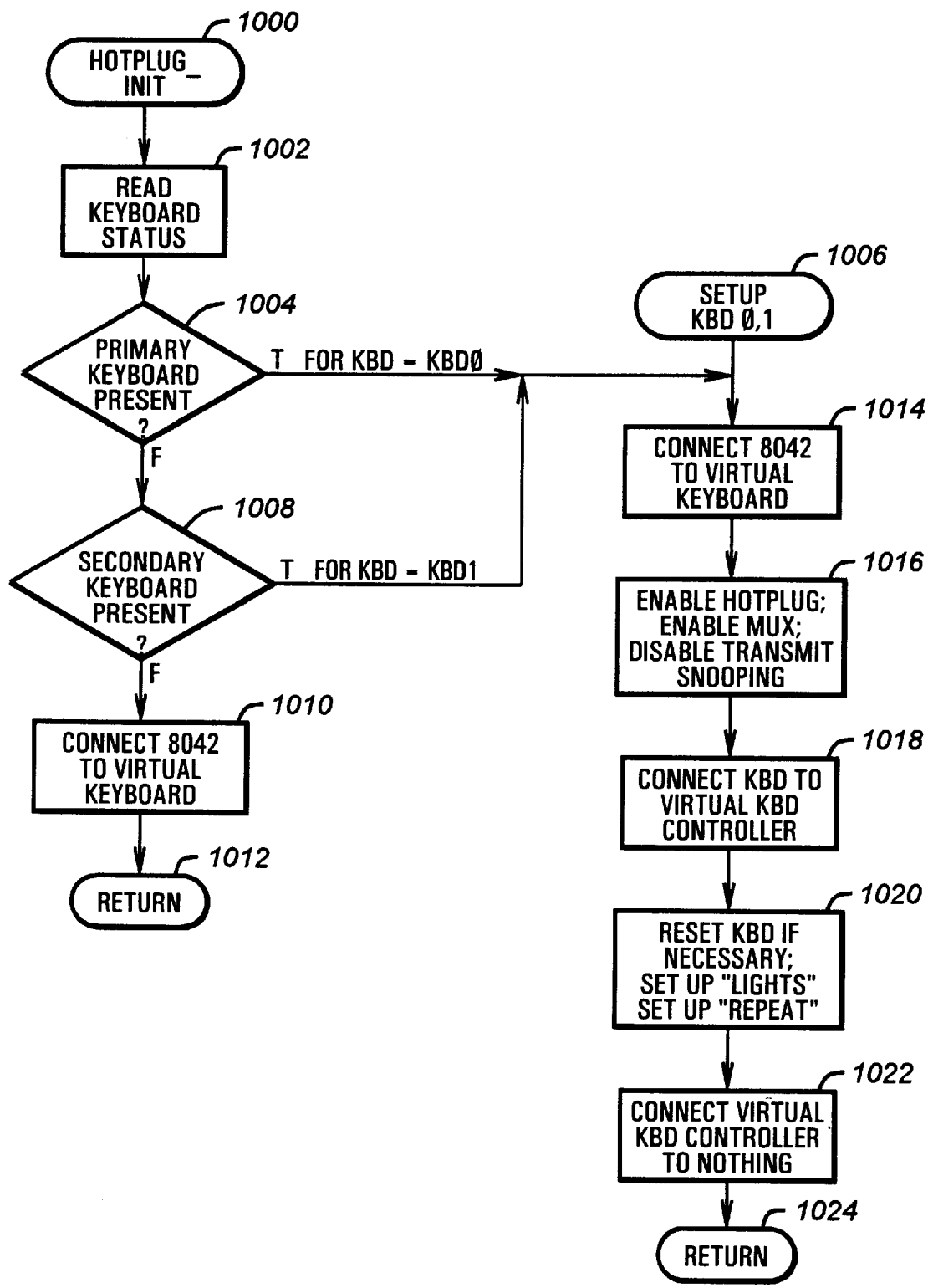

Turning to FIGS. 31A–C, shown is HOTPLUG_HANDLER routine 950. This routine is called at step 856 by the keyboard interrupt routine 850 (see FIG. 29), and must respond to the event of the keyboard 157 or 159 being plugged or unplugged from the IRC 170. Beginning at step 951, the routine 950 determines if the server is presently in remote console mode. If so, the keyboard 157 or 159, if now connected, should not be coupled to the 8042 keyboard controller 156, but should instead have its LEDs blinked (see FIG. 33A) through the virtual keyboard controller 206. Therefore, if in remote console mode, at step 951, control proceeds to step 952, where the blinking LEDs on an attached keyboard are enabled (see FIG. 33A), and then the routine 950 returns at step 953. If not in remote console mode at step 951, control instead proceeds to step 954.

At step 954, the routine 950 determines whether the status of the secondary keyboard 159 (here shown as KBD1) has changed. Referring to FIG. 8, this is done by examining the KSTAT[9] register 290 bit, which reflects the state of the KBD_CHANGE[1] signal. When true, this signal indicates whether the plug or unplug status of the secondary keyboard 159 has changed. If the status has not changed, control proceeds to step 955, because the cause of the SMI must have been a change in the status of the primary keyboard 157 (here KBD0).

To determine why the primary keyboard 157 caused the SMI, the connection status of the primary keyboard 157 is checked at step 955 by reading the KSTAT[12] register 290 bit, which reflects the KBD_PRESENT[0] signal. When true, this bit indicates the primary keyboard 157 is plugged and stable. In that case, control proceeds to step 958, the routine 950 clears any scan codes present in the queue for the virtual keyboard controller 206 for transmission to the primary keyboard 157. Further, a timer is set so that scan codes received through the virtual keyboard controller 206 from the newly connected primary keyboard 157 will be discarded during the keyboard 157 or 159 reset, self test, and resulting sequence. Proceeding to step 960, a SETUP_KBD0 routine 1006 is called, discussed below in conjunction with FIG. 31C. Then, at step 961, the 8042 keyboard controller 156 is connected to the primary keyboard 157 and control returns to the calling routine at step 962.

If at step 955 it was determined that the primary keyboard 157 is not validly connected, control instead proceeds to step 964, where it is determined whether the secondary keyboard 159 is validly connected. If that keyboard 159 is also not validly connected, again as reflected by the KSTAT register 290, then no keyboard 157 or 159 is plugged into the IRC 170, so the virtual keyboard 204 must assume communications with and tracking of the 8042 keyboard controller 156. Therefore, control proceeds to step 966, where the 8042 keyboard controller 156 is connected to the virtual keyboard 204. This is done by setting the KBD_SEL[1] signal to true, through a write to the KCFG register 294 to enable the virtual keyboard 204. Control then proceeds to step 968 where the routine 950 returns to the calling keyboard interrupt routine 850.

From step 964, if the secondary keyboard 159 is validly connected, control instead proceeds to step 970. If the physically selected keyboard is already the secondary keyboard 159 (KCFG[6]), then nothing more needs to be done, so control proceeds to 968 where a return is executed. If, at step 970 the current active keyboard was instead the primary keyboard 157, the keyboards 157 or 159 were physically connected to the IRC 170, but now the primary keyboard 157 has been removed. Therefore, the secondary keyboard 159 must be prepared to be directly connected to the 8042 keyboard controller 156. Control therefore proceeds to step 972, where the virtual keyboard controller 206 data is cleared, as was done at step 958, and then to step 974 where a SETUP_KBD1 routine 1006 is called, discussed below in conjunction with FIG. 31C. Then, the secondary keyboard 159 is connected to the 8042 keyboard controller 156 at step 975. The secondary keyboard 159 is therefore physically connected to the 8042 keyboard controller 156, and is now the active keyboard, so control proceeds in step 976, where a return is executed to the calling keyboard interrupt routine 850.

From step 952, if the secondary keyboard 159 status has changed, then control instead proceeds to step 978 in FIG. 31B. The logic shown in FIG. 31B is similar to that shown in FIG. 31A, except in this case the status of the secondary keyboard 159 has changed by either being plugged or unplugged, rather than the primary keyboard 157. At step 978, if the secondary keyboard 159 is validly plugged in (KSTAT[13]), then the event has been the plugging in of that keyboard 159. Of note, when either the primary keyboard 157 or the secondary keyboard 159 is plugged in, the IRC 170 provides the appropriate amount of stabilization time. So when the KBD_PRESENT signals (KSTAT [13:12]) become high, this indicates that the keyboards 157 and 159 are not only plugged in, but stabilized.

Proceeding from step 978 to step 982, it is determined whether primary keyboard 157 is validly plugged in. If so, control proceeds to step 984 where the routine returns to the calling routine because the primary keyboard 157 is still connected. The secondary keyboard 159 is only connected to the 8042 keyboard controller 156 when the primary keyboard 157 is not present.

From step 982, if the primary keyboard 157 is not present, control instead proceeds to step 986, where the virtual keyboard controller 206 is cleared as discussed in conjunction with steps 958 and 952, and control proceeds to step 988 where the SETUP_KBD1 routine 1006 is called, discussed below in conjunction with FIG. 31C. The 8042 keyboard controller 156 is then connected to the secondary keyboard 159 at step 989, and then control returns to the calling routine at step 990.

From step 978, if the secondary keyboard 159 is not present, control proceeds to step 992. This therefore occurs if the SMI initiating event was the unplugging of the secondary keyboard 159. At step 992, it is determined whether the primary keyboard 157 is present. If so, it should remain coupled to the 8042 keyboard controller 156, so control proceeds to step 994 where a return is executed calling routine.

If at step 992 the primary keyboard 157 is not present, this indicates that neither keyboard 157 or 159 is connected, and therefore the 8042 keyboard controller 156 should be coupled to the virtual keyboard 204. Therefore, control proceeds from step 992 to step 996, where the virtual keyboard 204 data is cleared as was done at step 958, and then to step 998. The 8042 keyboard controller 156 is there connected to the virtual keyboard 204. Again, this is done by enabling the KCFG[7] register 294 bit, which enables the virtual keyboard 204. Control then proceeds to step 999, where a return is executed to the calling routine.

Turning to FIG. 31C, shown is a flowchart of a hot plug initialization routine HOTPLUG_INIT 1000 that is called by the general system management mode initialization routines. An entry point for the SETUP_KBDx routine 1006 is also shown to setup the primary or secondary keyboard, which called from steps 960, 974, and 988 of FIGS. 31A–31B. The hot plug initialization routine 1000 checks for the presence of either the primary keyboard 157 or secondary keyboard 159, in that order, and if present, connects that keyboard 157 or 159 to the virtual keyboard controller 206, resets it, and then couples it to the 8042 keyboard controller 156. If no keyboard 157 or 159 is present, the 8042 keyboard controller 156 is instead connected to virtual keyboard 204 allowing the system to boot.

Beginning at step 1002, the hot plug initialization routine 1000 reads the keyboard status from the KSTAT register 290 by an I/O read from the IRC 170. Proceeding to step 1004, if the primary keyboard 157 is present (KSTAT[12] being true), then the primary keyboard 157 should be connected to the 8042 keyboard controller 156, so the setup primary or secondary keyboard routine 1006 is jumped to couple the primary keyboard 157 to the system. If the primary keyboard 157 is not present at step 1004, control instead proceeds to step 1008.

At step 1008, the presence of the secondary keyboard 159 is checked (KSTAT[13] being true). If the secondary keyboard 159 is present, the setup keyboard routine 1006 is entered to set up the secondary keyboard 159 as the connected keyboard.

If neither the primary keyboard 157 is present in step 1004 nor the secondary keyboard 159 is present in step 1008, control ultimately proceeds to step 1010, where the hot plug initialization routine 1000 connects the 8042 keyboard controller 156 to the virtual keyboard 204 through a write to the KCFG register 294 (KCFG[7] set to true). Control then proceeds to step 1012, where the routine 1000 returns to the calling system management mode 212 routine that is performing general system management mode 212 initialization.

Turning to the setup primary or secondary keyboard routine 1006, this routine first connects the 8042 keyboard controller 156 to the virtual keyboard 204 while connecting the selected keyboard 157 or 159 to the virtual keyboard controller 206. The routine 1006 then causes that keyboard 157 or 159 to be initialized before it is ultimately connected to the 8042 keyboard controller 156. Before turning in detail to the SETUP_KBD routine 1006, an understanding of a standard PC compatible keyboard response to a power on reset command is helpful. When a keyboard receives a reset command (OFFh) from a keyboard controller, the keyboard carries out an internal self test. The keyboard first responds to the reset command with an ACK in response. The controller must respond by raising the data and clock line to the keyboard to a high level for at least 500 microseconds. Afterwards, the keyboard carries out a built-in basic assurance test. When the basic assurance test is completed, the keyboard responds with a 0AAh (test passed) or a 0FCh (keyboard error) to the controller.

Therefore, when the keyboard is initialized by the system management mode 212 firmware, the software must "eat," or discard, the responsive ACK, then wait 500 microseconds, and then discard the result code. Because the system management mode 212 firmware cannot simply wait 500 microseconds for such a response, the SETUP_KBD routine 1006 must instead set flags for an SMI_TIMER routine 1200 (see FIGS. 33A–D) indicating that response to the initial reset command, and then the initialization response should be "eaten" after the reset command is sent to the newly attached keyboard 157 or 159. This is all set up by the SETUP_KBD routine 1006.

Those timer routines also provide for the sending of an initialization sequence to the newly attached keyboard once the reset sequence has been performed. This initialization sequence allows the repeat rate and mode of the newly attached keyboard 157 or 159 to be set to match that of the virtual keyboard. This is specifically discussed in conjunction with FIGS. 33B–D.

Beginning at step 1014, the 8042 keyboard controller 156 is connected to the virtual keyboard 204 by a write to the KCFG register 294 (KCFG[7] set to true). Proceeding to step 1016, the IRC 170 is configured. Hot plug is enabled, the internal keyboard multiplexer 214 is enabled, and transmit snooping is disabled by a write to the KCFG register 294 (KCFG[3: 1] set to appropriate values). Proceeding to step 1018, the selected keyboard 157 or 159 is connected to the virtual keyboard controller 206 via a write to the KCCFG register 299 (KCCFG[7] set to true, enabling the virtual keyboard controller 206, and KCCFG[6] set for appropriate keyboard). Proceeding to step 1020, if the selected keyboard 157 or 159 has not yet been reset, a reset command scan code is posted to be written to the selected keyboard 157 or 159 through the virtual keyboard controller 206, and appropriate flags are also set such that the SMI_TIMER routine 1200 will discard scan codes from the virtual keyboard controller 206 until the newly attached keyboard 157 or 159 has completed its reset sequence, and will then perform an initialization of that keyboard, setting up the keyboard lights and repeat rates. Proceeding to step 1022, the virtual keyboard controller 206 is connected to nothing. Proceeding to step 1024, the SETUP_KBD routine 1006 (or the hot plug initialization routine 1000) returns to the routine where it was called.

Keyboard Command Processing

Turning to FIGS. 32A–D, shown is the process keyboard command routine 1100. This routine is called from step 878 of FIG. 29, when an interrupt from the virtual keyboard 204 indicates its receive buffer is full. Thus, the process keyboard command routine 1100 is entered when the 8042 keyboard controller 156 has sent scan codes to the virtual keyboard 204. These, if valid, will be one or two scan code command sequences to which the virtual keyboard 204 must respond. It is these command sequences, which, if unanswered during system startup, will cause the POST code to indicate a startup failure. By providing responses to these keyboard commands from the 8042 keyboard controller 156, the virtual keyboard 204 permits the system S to boot without an attached keyboard 157 or 159, but without altering the system POST code and without altering the 8042 keyboard controller 156.

Beginning at step 1102, process keyboard command routine 1100 inputs data from the virtual keyboard 204 via a read of the KDAT register 292. Proceeding to step 1104, it is determined if the virtual keyboard 204 is enabled, or connected to the 8042 keyboard controller 156 in an active, responsive mode. If so, then the virtual keyboard 204 must respond to the 8042 keyboard controller 156. Otherwise, an actual keyboard 157 or 159 is connected to the 8042 keyboard controller 156, so the received scan codes should not be responded to, but only snooped to change any corresponding status variable to reflect the state of the actually connected keyboard, or possibly to exit from providing access through a remote console through the modem 149. This is discussed below in conjunction with FIG. 32C, where control passes to step 1134 if the virtual keyboard 204 is not set to actively respond to command codes.

Otherwise, proceeding to step 1106 it is there determined whether this is the second byte of a 2-byte command sequence from the 8042 keyboard controller 156. If so, control proceeds to step 1134 in FIG. 32D, discussed below. The flag indicating this is the second byte of a 2-byte code is set in step 1118, discussed below.

If this is not the second of two bytes in a scan code from the 8042 keyboard controller 156, control proceeds to step 1108, where it is determined whether the scan code from the 8042 keyboard controller 156 is greater than 0EDh. If so, this is a valid command sent from the 8042 keyboard controller 156. If not, this is an invalid command, so control proceeds to step 1110, where a resend scan code is sent to the 8042 keyboard controller 156 through the virtual keyboard 204.

At this point, a discussion of the mechanism for sending scan codes through the virtual keyboard 204 to the 8042 keyboard controller 156 is appropriate. A buffer, or queue, within the system management mode 212 software is loaded with the scan codes to be sent. Then, referring back to step 878 of FIG. 29, the keyboard command codes are pulled from that buffer and sent to the virtual keyboard 204 by a write to the KDAT register 292 once a previous transmission of a scan code is complete, as determined at step 874. Thus, whenever a transmission by the virtual keyboard 204 is complete, the system management mode 212 firmware is interrupted, allowing additional scan codes from the keyboard buffer to be sent through the virtual keyboard 204 to the 8042 keyboard controller 156. From step 1110, control proceeds to step 1112 where the process keyboard command routine 1100 returns to the calling routine.

Of note, the SEND_KBD_IRC routine called at step 878, although not discussed in detail is also called when the system is in remote console mode. When data received over the modem 149 is to be rerouted to the system S via the 8042 keyboard controller 156, it is first processed and converted by routines within the system management mode 212 firmware, and then sent in the form of scan codes through the SEND_KBD_IRC routine called at step 878. In this way, this routine can either transmit scan codes from the connected keyboard 157 or 159, or instead from those scan codes which are converted from data rerouted from the modem 149. This seamless and transparent remote interface is provided to the system S, as the system S assumes that the keyboard data is coming from a keyboard rather than from the modem 149.

If the data is determined to be a valid command from the 8042 keyboard controller 156 at step 1108, control proceeds to step 1114, which is essentially a case statement. On the data input from the 8042 keyboard controller 156 via the virtual keyboard 204 KDAT register 292, control branches according to the type of keyboard command. All keyboard commands have not been implemented in the disclosed embodiment, because all are not necessary for seamless operation of a "keyboardless" system. For example, with standard keyboards it is possible to set the repeat rate for individual keys through 0FBh–0FDh scan code sequences. This is not implemented in the disclosed embodiment, but could be if it was desired to more fully mimic an actual keyboard. The principal concern is that when the 8042 keyboard controller 156 sends its commands, an appropriate response is at least returned by the virtual keyboard 204.

If the command is an echo, an NOP, a get keyboard ID, an ACK, or a resend command, control proceeds to step 1116, where an appropriate response is placed in the buffer for transmission through the virtual keyboard 204 to the 8042 keyboard controller 156. The appropriate command will be understood by those of ordinary skill in the art.

If at step 1114 the command is to set individual keys, a set status, a set repeat rate, or a set mode command, these are 2-byte sequence, so proceeding to step 1118, a 2-byte response flag is set. Further, an entry point for a second routine to be called to process the second code of the 2-byte command is saved, and an ACK is placed in the buffer for transmission to the 8042 keyboard controller 156 to the virtual keyboard 204.

From step 1114, if the command is a reset command, control proceeds to step 1120, where the buffer to the virtual keyboard 204 is cleared, and status is set. Proceeding to step 1122, an appropriate response, here an ACK, is then sent through the virtual keyboard 204 to the 8042 keyboard controller 156.

If at step 1114 the command is an enable command, control proceeds to step 1124, where status is set to indicate the keyboard is not disabled. This should be appreciated, turning to FIG. 32B, in conjunction with the command being a disable command, where control proceeds from step 1114 to step 1126, where the status is set to indicate the keyboard is disabled. This flag is used in the SEND_KBD_IRC routine, not shown, to determine whether any scan codes should be sent to the 8042 keyboard controller 156. If the keyboard is disabled, no such scan code should be sent, because the keyboard is disabled.

If the command is a default command or a set all command, control proceeds from step 1114 to step 1128, where the buffer to the virtual keyboard 204 is cleared, and an ACK is sent. Further, from steps 1126 and 1124, control also proceeds to step 1128. Control then returns at step 1130. Control also returns at step 1132 from steps 1116, 1118, and 1122.

Figure 32A:
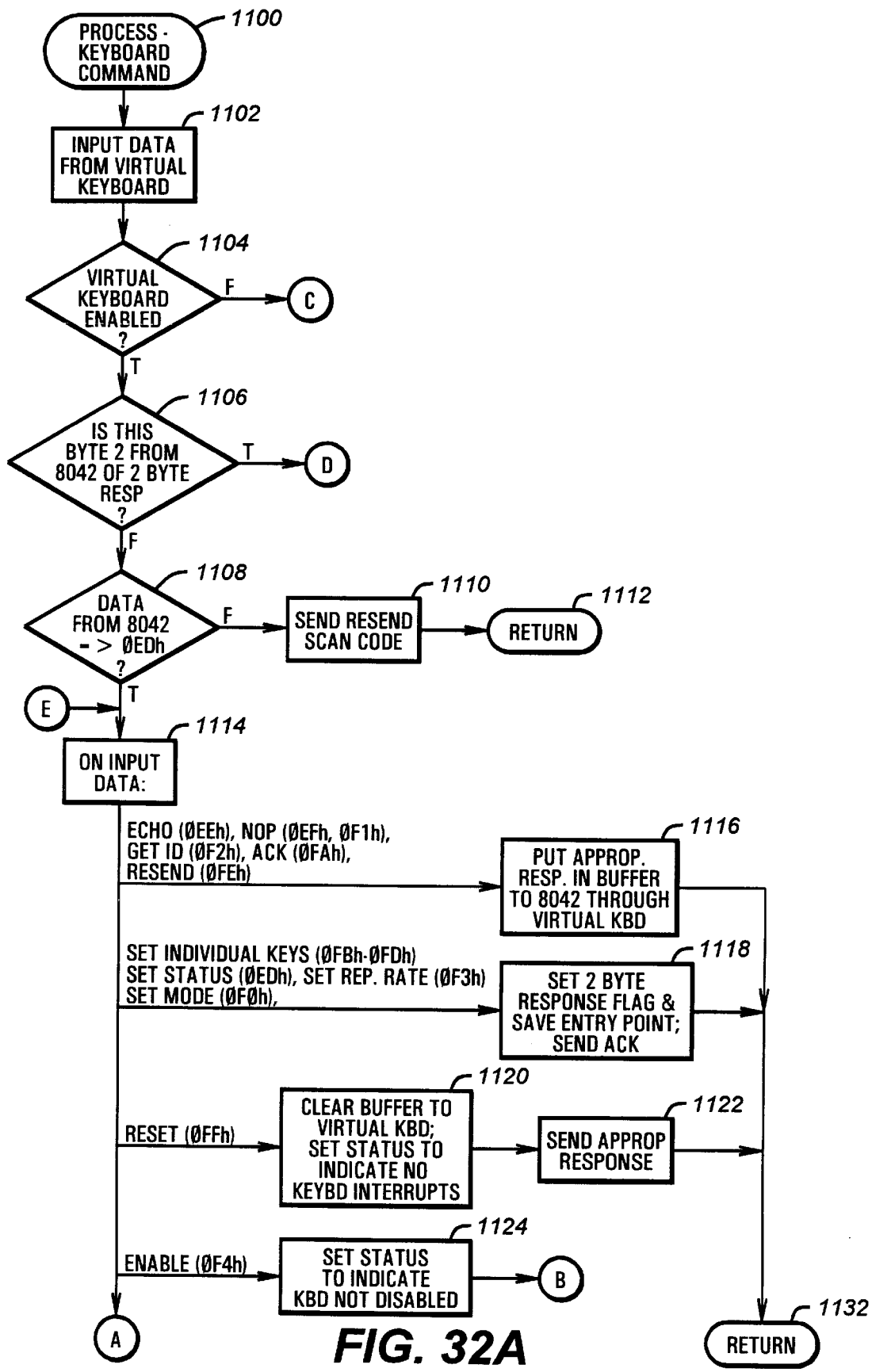
FIGS. 32A–D are flowcharts of receive virtual keyboard scan code processing routine called by the routine of FIG. 28.
Figure 32B:
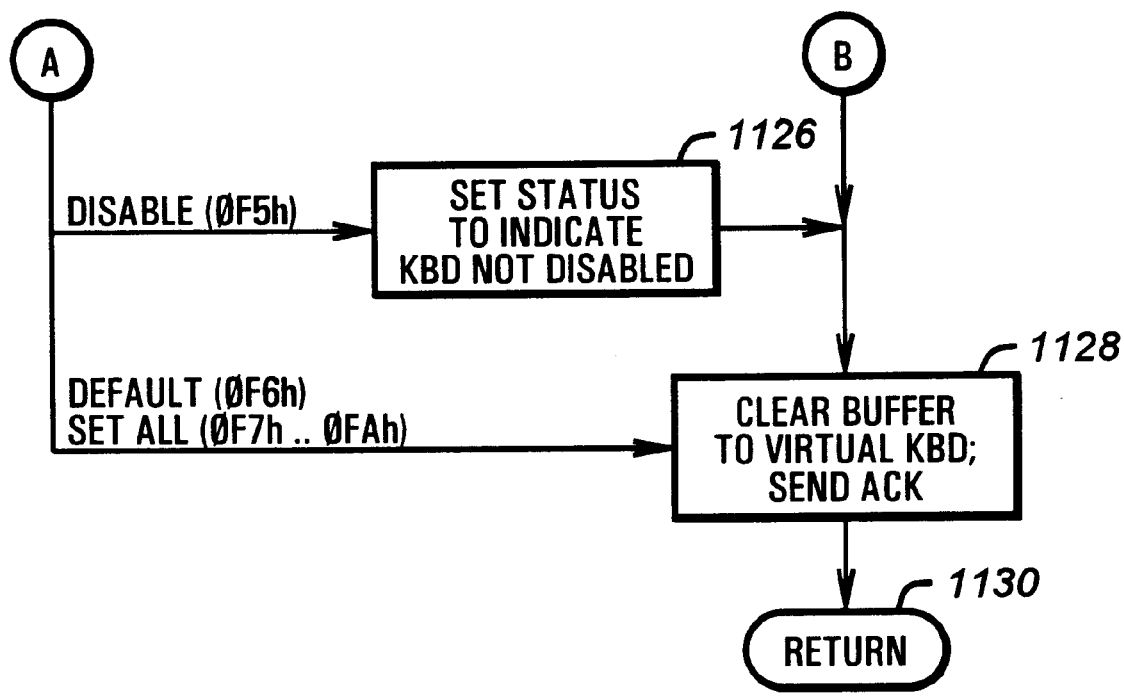
Figure 32C:
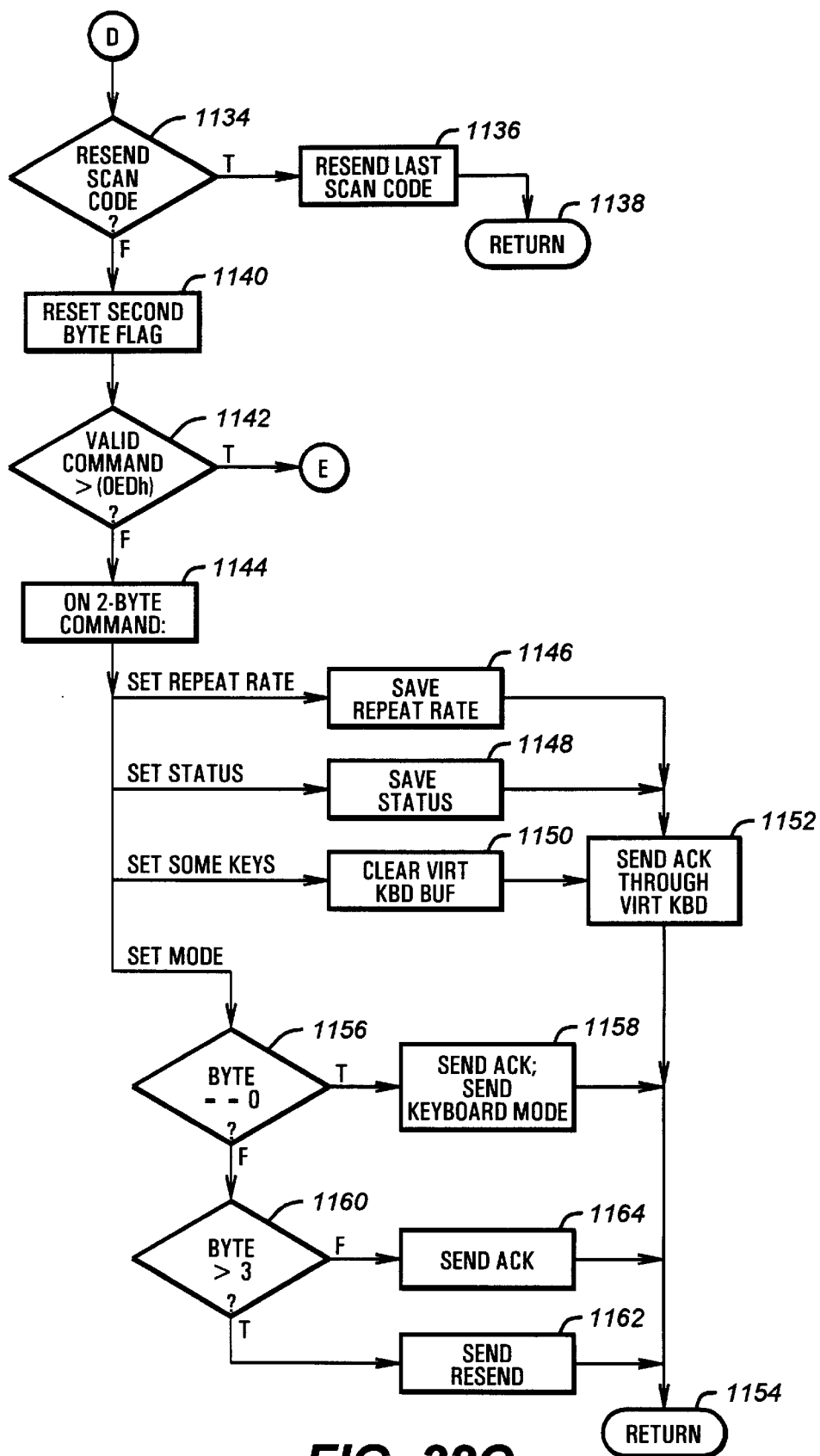

Turning to FIG. 32C, control is passed to step 1134 from step 1106 if the flag is set indicating this is the second byte from the 8042 keyboard controller 156 of a 2-byte sequence. Beginning at step 1134, it is determined if a scan code should be resent because the second character of the sequence was a resend scan code. If so, control proceeds to step 1136, where the last scan code sent through the virtual keyboard 204 to the 8042 keyboard controller 156 is again placed in the buffer for resending. Control then proceeds to step 1138 where the routine returns.

From step 1134, if not a resend scan code, control proceeds to step 1140, where the second byte flag is reset, so that on the next entry into the process keyboard command routine 1100, the branch to FIG. 32C will not be taken. Control then proceeds to step 1142 where it is determined whether this is a valid command, which is a scan code greater than 0EDh. If so, then this second scan code is not the actual second of a 2-byte sequence, but should instead be treated as a valid command, so control transfers to step 1114 of FIG. 32A to process this command.

If not a valid command at step 1142, then the scan code is the second of a 2-byte sequence, so on a case statement initiated by step 1144, control proceeds to step 1146 if this is the second of a set repeat rate sequence. Referring back to step 1118 of FIG. 32A, the entry point for this second routine was there set, and is used as part of the case statement to branch to the correct second scan code routine. At step 1146, this second scan code is saved as a repeat rate so that a newly installed keyboard 157 or 159 can appropriately be configured with the correct repeat rate. Similarly, if the sequence is a set status sequence, control proceeds to step 1148, where the status is saved for the same reason.

If the sequence is a set some keys sequence, control proceeds to step 1150, where the buffer to the virtual keyboard 204 is cleared. From steps 1146, 1148, and 1150, control proceeds to step 1152, where an ACK is sent through the virtual keyboard 204 (again by placing the appropriate scan code in a buffer for transmission when the virtual keyboard 204 TRANSMITCOMPLETE signal is true), and then control returns at step 1154.

If this 2-byte sequence is a set mode sequence, control proceeds from step 1144 to step 1156. If the second byte is equal to zero, control proceeds to step 1158, where an ACK is sent, and the appropriate keyboard mode, preferably mode 2, is sent, again through the buffer to the virtual keyboard 204. Control then returns at step 1154. From step 1156, if the byte was not equal to zero, control proceeds to step 1160, where it is compared to 3. If greater than 3, then this is an invalid second byte, so control proceeds to step 1162 where a resend command is sent through the virtual keyboard 204 to the 8042 keyboard controller 156. From step 1160, if the second byte is not greater than 3, control proceeds to step 1164, where an ACK is sent, and from steps 1158, 1162, and 1164, control returns at step 1154.

Figure 32D:
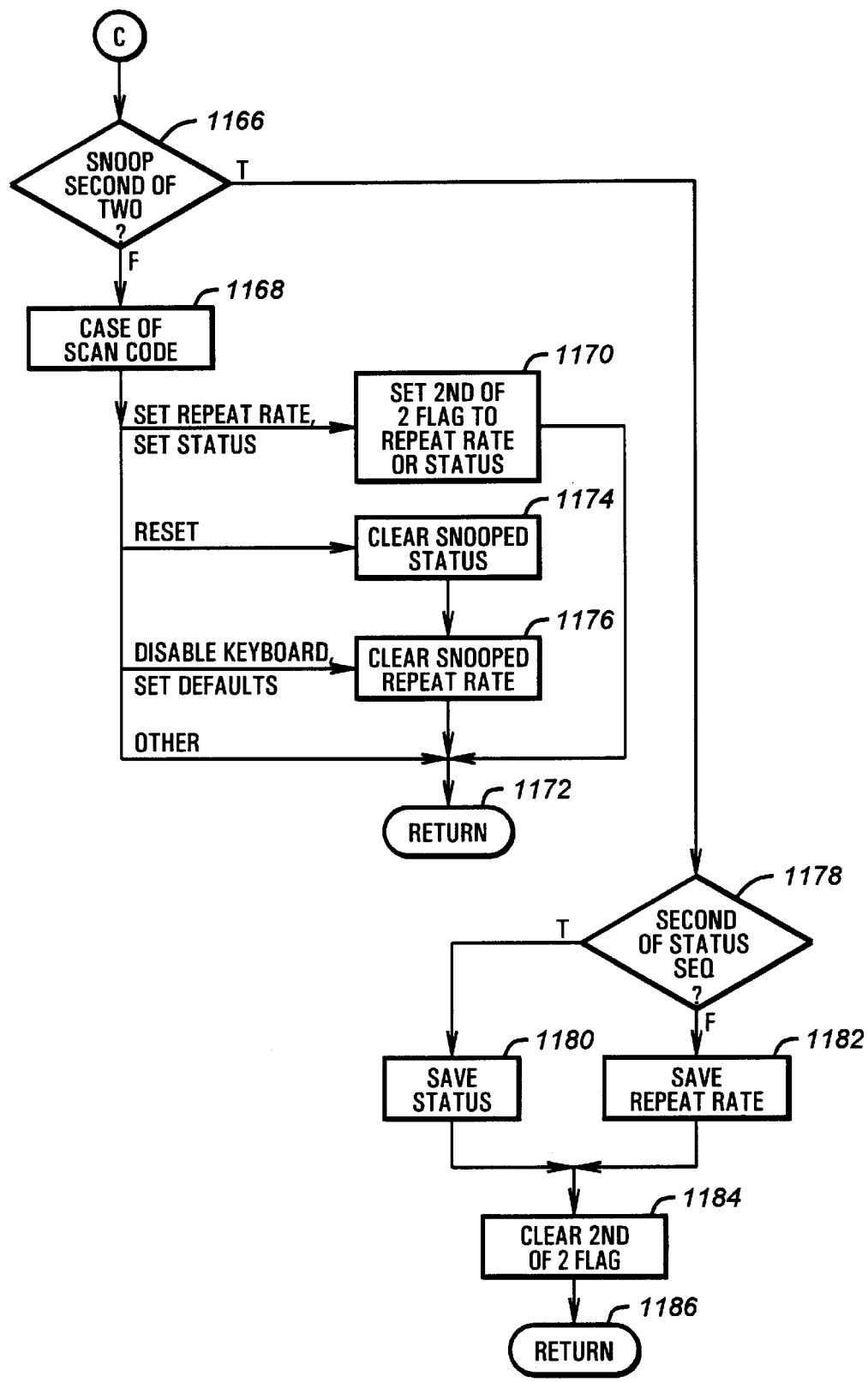

Turning to FIG. 32D, shown is a routine for handling the snooping of scan codes. From step 1104, if the virtual keyboard 204 should not actively respond (i.e., is not in MASTER mode as discussed above in conjunction with the virtual keyboard 204), control proceeds to step 1166, where it is determined whether this is the second of two scan codes to snoop (similar to step 1106 of FIG. 32A). If not, control proceeds to step 1168, where certain scan codes are snooped because they changed status. Of note, no scan code needs to be actively processed if it does not change a persistent keyboard status. So, from step 1168, a case statement based on the snooped scan code, control proceeds to step 1170 if the scan code was a set repeat rate or a set status scan code. At step 1170, a second of a 2-byte flag (checked at step 1166) is set to indicate this is a repeat rate or status command. Control then returns at step 1172.

On a reset, control proceeds to step 1174, where the snooped status value is cleared, being reset to its default value. Control then proceeds to step 1176, where the snooped repeat rate value is also set to its default value. In this way, the system management mode 212 software matches its internal variables to that of the attached keyboard 157 or 159. Control then proceeds from step 1176 to return at step 1172.

On a disabled keyboard or set default command, control proceeds directly from step 1168 to step 1176, where only the snooped repeat rate is cleared, being reset to its initial value. On any other scan code, control simply proceeds to step 1172, where the routine returns.

At step 1166, if this is the second of two scan codes flag is set, then this scan code being snooped is the second of a 2-byte command sequence. In that case, control proceeds to step 1178, where it is determined whether this is the second of a status command sequence. If so, control proceeds to step 1180 where the snooped scan code is saved as the status value. From step 1178, if not the second of a status sequence, this means it is the second of a repeat rate sequence, so control proceeds to step 1182, where the scan code is saved as the repeat rate. Proceeding from step 1180 and step 1182, control passes to step 1184, where the second of two scan codes flag is reset to avoid an improper branch at step 1166, and then control returns at step 1186.

Therefore, the process keyboard command routine 1100 actively processes both one and two-byte keyboard command sequences, posting appropriate scan codes to be sent through the virtual keyboard 204 to the 8042 keyboard controller 156, and snoops commands passing between the 8042 keyboard controller 156 and a connected keyboard 157 or 159, when the virtual keyboard 204 should not actively be responding to such commands. In this way, on startup, whether a keyboard is present or not, appropriate responses will be sent to the 8042 keyboard controller 156, allowing a normal boot with no alteration of the POST code executed by the CPU 50.

SMI Timer Routines

Turning to FIGS. 33A–33D, shown is the SMI timer routine 1200, which is periodically called to process various timers relating to remote console and to the IRC 170. This routine 1200 is of principal interest for two reasons. First, it handles the process of "eating" scan codes from a newly connected keyboard 157 or 159 to the virtual keyboard controller 206. Second, it handles the blinking of lights on an attached keyboard 157 or 159 when in the remote console mode. When in the remote console mode, the attached keyboard 157 or 159 is coupled to the virtual keyboard controller 206, while the 8042 keyboard controller 156 is coupled to the virtual keyboard 204. This allows the IRC 170 to capture data from the modem 149, convert it to scan codes, and send it through the virtual keyboard 204 to the 8042 keyboard controller 156. In this state, the lights on the physical keyboard 157 or 159 are blinked through the virtual keyboard controller 206.

From step 1200, control proceeds to step 1202, where it is determined if the timer is set to allow the virtual keyboard controller 206 to "eat" reset response scan codes. This timer was set in step 1022 of FIG. 31C, where a newly attached physical keyboard 157 and 159 was set up for initialization. From step 1202, if this timer is set, control proceeds to step 1204, where an EATKEYS routine 1214 is called, discussed below in conjunction with FIG. 33B. From step 1202 otherwise, and from step 1204 in any case, control proceeds to step 1206, where it is determined whether a blinking lights timer is set. If so, control proceeds to step 1208, where a BLINKLIGHTS routine is called. This routine is not illustrated, but periodically sends a series of scan codes through the virtual keyboard controller 206 to the attached keyboard 157 or 159. These scan codes alternatively turn on and off the lights, thus causing blinking. Blinking is set during operation of remote console.

From step 1206 otherwise, and from step 1208 in any case, control proceeds to step 1210, where other timers are processed, such as timers relating to the modem 149 and timers relating to the snooping of video data. Control then proceeds to step 1212, where a return is executed, generally meaning the system management mode 212 is exited from to allow further operation of normal system software.

Figure 33A:
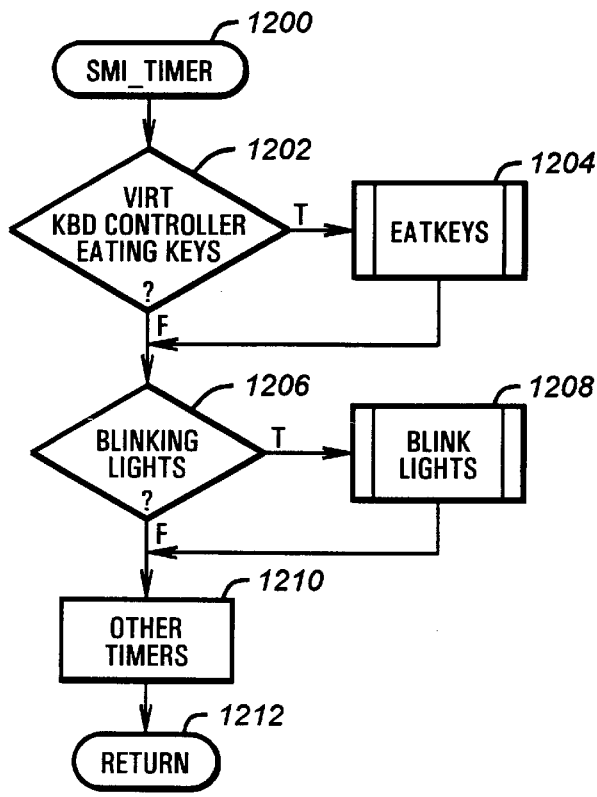
FIGS. 33A–D are flowcharts of an SMI timer routine periodically called by the system management mode software according to the disclosed embodiment.
Figure 33B:
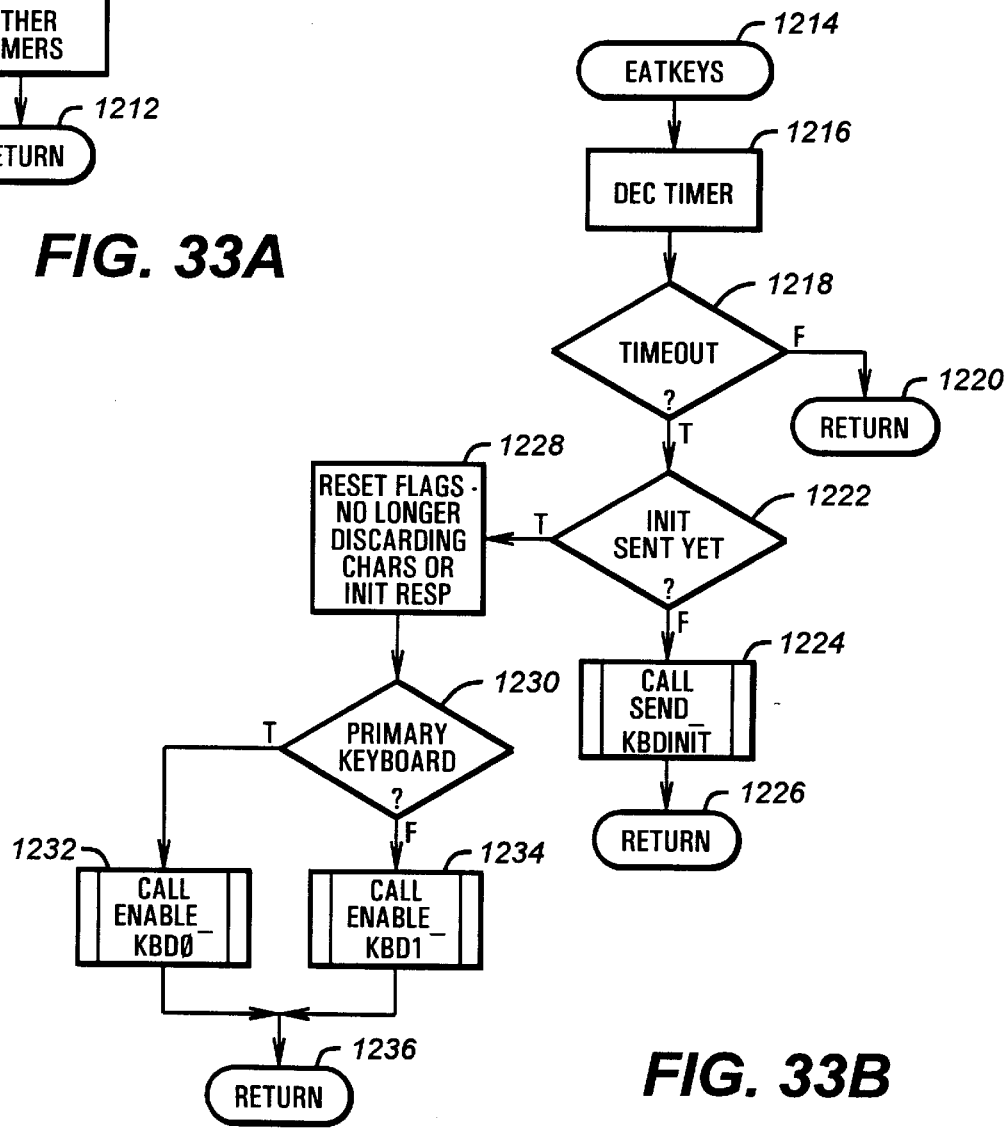

Turning to FIG. 33B, shown is the EATKEYS routine 1214. Beginning at step 1216, the eat keys timer is decremented, and then at step 1218 it is determined whether that timer has reached zero, or timed out. If not, control returns to step 1220. The eat keys timer will again be decremented when the SMI timer routine 1200 is next called.

From step 1218, if a timeout, control proceeds to step 1222 where it is determined whether an initialization sequence (used to set mode and repeat rate) has been sent to the newly attached keyboard 157 or 159. If not, this means that this is the first time step 1222 has been entered since step 1022 first initialized the eat keys timer. Therefore, this first timeout period by the timer was for the purpose of discarding codes received from the newly attached keyboard 157 or 159 until it had completed its reset sequence. Therefore, an initialization sequence now should be sent to the newly attached keyboard 157 or 159, so control proceeds from step 1222 to step 1224, where a send keyboard initialization, SEND_KBD_INIT routine 1350 (FIG. 33D) is called. Then, control returns to the SMI_TIMER routine 1200 at step 1226.

Figure 33C:
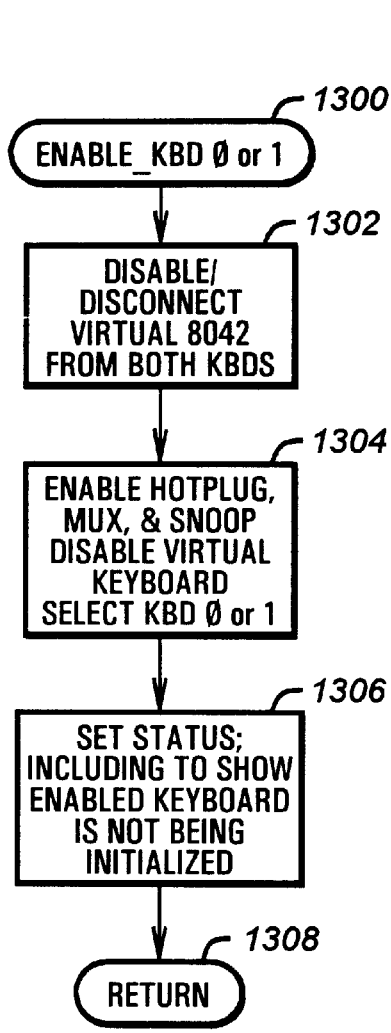
Figure 33D:
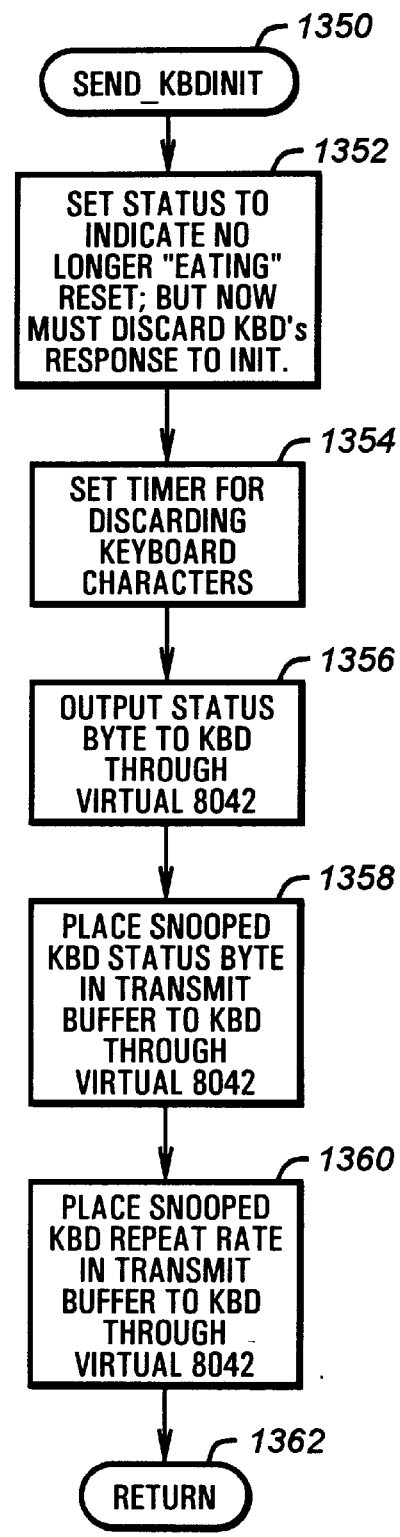

The SEND_KBD_INIT routine 1350 again resets the eat keys timer for discarding characters, but this time setting a flag that an initialization sequence has been set. Therefore, after that second period of eating keys after the initialization has been sent to the newly attached keyboard 157 or 159, the EATKEYS routine 1214 will reach step 1222 and determine that the initialization has been previously set at step 1224. Therefore, control proceeds to step 1228, where the flags are reset to indicate that the routine is no longer discarding characters or that an initialization has no longer been set. Then, control proceeds to step 1230, where it is determined whether the primary keyboard 157 is attached. If so, control proceeds to step 1232, where an enable primary keyboard routine ENABLE_KBD0 1300 is called (FIG. 33C). Otherwise from step 1230, control proceeds to step 1234, where an enable secondary keyboard routine ENABLE_KBD1 1300 is called. From step 1232 and 1234, control proceeds to step 1236, where control returns to the SMI timer routine 1200.

Proceeding to FIG. 33C, shown are the two routines ENABLE_KBD0 and ENABLE_KBD1 1300. These are shown as a single routine, with the only difference being which keyboard is being selected. These routines couple the 8042 keyboard controller 156 to the now initialized keyboard 157 or 159.

Proceeding to step 1302, the virtual keyboard controller 206 is disconnected from both keyboards 157 and 159 through a write to the KCCFG register 299. Proceeding to step 1304, hot plug, the internal multiplexer, and snooping are enabled, the virtual keyboard 204 is disabled from actively responding, and the appropriate keyboard is selected through a write to the KCFG register 294. Then proceeding to step 1306, status is set, including to show that the now enabled keyboard is no longer being initialized. Control then returns to step 1308.

Turning to the SEND_KBDINIT routine 1350, control begins at step 1352, where the status is set to indicate no longer eating keys in response to the reset received from the newly attached keyboard 157 or 159. Now, however, the system management mode 212 firmware must discard scan codes from the newly attached keyboard 157 or 159 in response to an initialization. This flag is checked at step 1222 of FIG. 33B. Proceeding to step 1354, the eat keys timer for discarding keyboard scan codes is reloaded so that the EATKEYS routine 1214 will be entered from the SMI TIMER routine 1200.

Proceeding to step 1356, the appropriate status is output to the newly attached keyboard 157 or 159 through the virtual keyboard controller 206. This sets up the keyboard to receive the keyboard status and keyboard repeat rate. Proceeding to step 1358, the appropriate snooped keyboard status is placed in the transmit buffer to the keyboard through the virtual keyboard controller 206, and the same is done at step 1360 with the appropriate repeat rate. Therefore, after step 1360, the newly attached keyboard 157 or 159 is set to the snooped status detected by the virtual keyboard 204. Thus, one can unplug and replug the keyboard 157 or 159, and even if the system has changed the status of that keyboard 157 or 159, it is reset to the appropriate, changed value when plugged back in. Proceeding to step 1362, control returns to the calling EATKEYS routine 1214 of FIG. 33B.

Conclusion

In view of the foregoing discussion, it should be appreciated that hot plug and unplug capability are provided allowing a system to boot when a keyboard is not attached without modification of the standard keyboard controller or of the standard POST or OS code. Instead, this is all handled transparently by an integrated remote console device, here shown operating in coordination with the system management mode. Further, by detecting keyboard presence through the current flowing through the keyboard supply voltage, spurious characters are eliminated during the plugging and unplugging of a physical keyboard. Again, this is all done without modification of the keyboard controller or the system BIOS or OS.

Further, by providing both a virtual keyboard and a virtual keyboard controller, appropriate responses can not only be transmitted to the physical keyboard controller during both booting and keyboardless operation, but the state of that virtual keyboard is maintained and tracked so that when a physical keyboard is installed, a virtual keyboard controller programs that physical keyboard to match the expected state as set by the physical keyboard controller. This all provides for seamless plug and unplug capability.

Many other alternatives will be apparent to those skilled in the art. For example, rather than using system management mode, standard interrupts could be provided to the microprocessor, and device drivers could be implemented to respond to those interrupts. This would not be totally transparent to the operating system, but would provide for hot plug and unplug ability of the keyboard. This would be acceptable, for example, where the system was not being implemented in a remote console mode or a secure operation apart from the operating system is necessary.

Alternatively, an external multiplexer is provided, such as on a plug-in board, which switches between an external keyboard and a virtual keyboard. Using this configuration, some modification is necessary to the system device drivers, for example, to switch between the virtual keyboard and external keyboard, but the system can still boot as long as the virtual keyboard is the default mode of this plug-in device.

Finally, although the use of keyboards has been shown in the disclosed embodiment, the techniques disclosed could be readily adapted to other serial devices, especially those that communicate with a computer using standard keyboard clock and data signals. One example of such a serial I/O device is a mouse.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A computer system that provides transparent plugging and unplugging of a physical keyboard with standard keyboard clock and data signals and responsive to standard keyboard commands, the computer system comprising:
    a processor for executing instructions;
    a peripheral storage device for providing data;
    a keyboard controller coupled to said processor, said keyboard controller providing keyboard controller clock and data signals compatible with the standard keyboard clock and data signals and providing standard keyboard commands over the keyboard controller clock and data signals; and
    a keyboard switching circuit coupled to the keyboard controller clock and data signals and adapted for coupling to the standard keyboard clock and data signals, said keyboard switching circuit further comprising:
        a virtual keyboard having virtual keyboard clock and data signals, said virtual keyboard being responsive to standard keyboard commands; and
        a keyboard switch coupled to the virtual keyboard clock and data signals, to the standard keyboard clock and data signals, and to the keyboard controller clock and data signals,
    wherein said keyboard switch is responsive to whether the physical keyboard is plugged or unplugged, connecting the keyboard controller clock and data signals to the virtual keyboard clock and data signals when unplugged, and connecting the keyboard controller clock and data signals to the standard keyboard clock and data signals in response to the physical keyboard being plugged.

2. The computer system of claim 1 further comprising:
    a software routine for execution by said processor for detecting whether the physical keyboard is being plugged,
    wherein said keyboard switch is responsive to whether the physical keyboard is being plugged through cooperation with said software routine.

3. The computer system of claim 1, said keyboard switching circuit further comprising:
    a virtual keyboard controller having virtual keyboard controller clock and data signals, said virtual keyboard controller providing standard keyboard commands, including standard keyboard initialization commands; and
    a virtual keyboard controller switch coupled to the virtual keyboard controller clock and data signals and to the standard keyboard clock and data signals,
    wherein said virtual keyboard controller is responsive to whether the physical keyboard is plugged or unplugged, providing the keyboard initialization commands in response to the physical keyboard being plugged, and
    wherein said virtual keyboard controller switch is responsive to whether the physical keyboard is plugged or unplugged, connecting the virtual keyboard controller clock and data signals to the standard keyboard clock and data signals when plugged, and disconnecting the virtual keyboard clock and data signals from the standard keyboard clock and data signals after the virtual keyboard controller has provided the initialization commands.

4. The computer system of claim 3 further comprising:
    a software routine for execution by said processor for detecting whether the physical keyboard is being plugged,
    wherein said virtual keyboard controller switch is responsive to whether the physical keyboard is being plugged through cooperation with said software routine.

5. The computer system of claim 3, said virtual keyboard further comprising:
    a keyboard status tracker with keyboard repeat rate and mode storage set to the keyboard repeat rate and mode as set by keyboard commands from said keyboard controller,
    wherein said virtual keyboard controller and said virtual keyboard are coupled, said virtual keyboard controller having access to the mode and repeat rate storage of said virtual keyboard, and
    wherein the keyboard initialization commands of said virtual keyboard controller include the mode and repeat rate stored in the virtual keyboard mode and repeat rate storage, whereby a plugged keyboard is initialized to the mode and repeat rate as stored by the virtual keyboard.

6. The computer system of claim 3, wherein said processor is coupled to said keyboard switching circuit, the system further comprising:
    a virtual keyboard controller routine that communicates through input/output instructions with said virtual keyboard controller, and provides commands to the physical keyboard through said virtual keyboard controller.

7. The computer system of claim 6, said processor further comprising:
    a system management mode of secure operation, and wherein said virtual keyboard routine executes in said system management mode responsive to system management interrupts from said virtual keyboard controller.

8. The computer system of claim 1, said keyboard switching circuit further comprising:
    a physical keyboard presence detection circuit coupled to a keyboard voltage supply for the physical keyboard, responsive to current changes on that supply, and providing an indication of physical keyboard presence,
    wherein said keyboard switch is responsive to the indication of physical keyboard presence, delaying a predetermined period after the presence indication is true before determining that the physical keyboard is present.

9. The computer system of claim 8, wherein said physical keyboard presence detection circuit further comprises:
    a regulated voltage source for providing the keyboard voltage supply through a first forward biased diode;

a differential amplifier with two inputs and with an output for providing the indication of physical keyboard presence, wherein said first input is coupled to the cathode of the first forward biased diode; and a second forward biased diode with an anode connected to the regulated voltage source provided keyboard voltage supply and a cathode coupled to the second output, wherein a voltage drop across the first diode exceeds the voltage drop across the second diode when current is drawn through the keyboard voltage supply.

10. The computer system of claim 8 further comprising:

a software routine for execution by said processor and responsive to the indication of physical keyboard presence, wherein said keyboard switch is responsive to the indication of physical keyboard presence through action by the software routine.

11. The computer system of claim 1, wherein said processor is coupled to said keyboard switching circuit, the system further comprising:

a virtual keyboard routine executing on said processor that communicates through input/output instructions with said virtual keyboard and provides scan codes responsive standard keyboard commands from the keyboard controller through said virtual keyboard.

12. The computer system of claim 11, said processor further comprising:

a system management mode of secure operation, wherein said virtual keyboard routine executes in said system management mode responsive to system management interrupts from said virtual keyboard, and wherein the keyboard switch is responsive to a control routine in system management mode.

13. The system of claim 1, wherein said keyboard switching circuit is implemented in a single application specific integrated circuit.

14. The system of claim 1, wherein said keyboard switching circuit is implemented through a combination of an application specific integrated circuit and system management mode software executed by said processor.

15. The computer system of claim 1 further providing the transparent plugging and unplugging of a second physical keyboard with standard keyboard clock and data signals and responsive to standard keyboard commands, said keyboard switching circuit further comprising:

a second keyboard switch coupled to the keyboard controller clock and data signals, and the second standard keyboard clock and data signals, wherein said second keyboard switch is responsive to whether the physical and the second physical keyboard are plugged or unplugged, connecting the keyboard controller clock and data signals to the second standard keyboard clock and data signals when the second physical keyboard is plugged and the physical keyboard is unplugged, and wherein said keyboard switch is further responsive to whether the second physical keyboard is plugged or unplugged, connecting the keyboard clock and data signals to virtual keyboard controller clock and data signals of a virtual keyboard controller when both said physical keyboard is unplugged and said second physical keyboard is unplugged.

16. The computer system of claim 15, wherein said second keyboard switch and said keyboard switch are coupled to connect the keyboard controller clock and data signals to either the standard keyboard clock and data signals or the second standard keyboard clock and data signals responsive to which of the physical keyboard or the second physical keyboard is most recently plugged.

17. A method of providing transparent plugging and unplugging of a physical keyboard in a computer system that includes a processor, a keyboard controller, and a virtual keyboard, a virtual keyboard controller, the method comprising the steps of:

coupling the virtual keyboard to the keyboard controller, providing through the virtual keyboard standard responses to keyboard commands from the keyboard controller;

detecting the plugging in of the physical keyboard to the system;

decoupling the virtual keyboard from the keyboard controller responsive to the detecting of the plugging in of the physical keyboard; and coupling the physical keyboard to the keyboard controller.

18. The method of claim 17, further comprising the steps of:

before the step of coupling the physical keyboard to the keyboard controller, performing the steps of:
coupling the virtual keyboard controller to the physical keyboard;
providing initialization commands from the virtual keyboard controller to the physical keyboard; and
decoupling said virtual keyboard controller from the physical keyboard.

19. The method of claim 18, further comprising the steps of:

tracking the state in the virtual keyboard of persistent keyboard parameters in response to keyboard commands sent by the keyboard controller, wherein said step of providing an initialization sequence from the virtual keyboard controller to the physical keyboard further includes the step of:
providing the persistent state as captured by the virtual keyboard as part of the initialization command.

20. The method of claim 18, further comprising the steps after the step of coupling the physical keyboard to the keyboard controller of:

detecting the unplugging of the physical keyboard from the system;

coupling the virtual keyboard to the keyboard controller in response to said detecting of the unplugging of the physical keyboard from the system; and providing through the virtual keyboard standard responses to keyboard commands from the keyboard controller.

21. A keyboard switching circuit for use in a computer system with a processor and a keyboard controller with keyboard controller clock and data signals and for coupling to a physical keyboard with standard keyboard clock and data signals, said keyboard switching circuit comprising:

a virtual keyboard having virtual keyboard clock and data signals, said virtual keyboard being responsive to standard keyboard commands; and a keyboard switch coupled to the virtual keyboard clock and data signals, to the standard keyboard clock and data signals, and to the keyboard controller clock and data signals, wherein said keyboard switch is responsive to whether the physical keyboard is plugged or unplugged, connecting the keyboard controller clock and data signals to the virtual keyboard clock and data signals when unplugged, and connecting the keyboard controller clock and data signals to the standard keyboard clock and data signals when plugged.

22. The keyboard switching circuit of claim 21 further comprising:
   a virtual keyboard controller having virtual keyboard controller clock and data signals, said virtual keyboard controller providing standard keyboard commands, including standard keyboard initialization commands; and
   a virtual keyboard controller switch coupled to the virtual keyboard controller clock and data signals and to the standard keyboard clock and data signals,
   wherein said virtual keyboard controller is responsive to whether the physical keyboard is plugged or unplugged, providing the keyboard initialization commands in response to the physical keyboard being plugged, and
   wherein said virtual keyboard controller switch is responsive to whether the physical keyboard is plugged or unplugged, connecting the virtual keyboard controller clock and data signals to the standard keyboard clock and data signals when plugged, and disconnecting the virtual keyboard clock and data signals from the standard keyboard clock and data signals after the virtual keyboard controller has provided the initialization commands.

23. The keyboard switching circuit of claim 22, said virtual keyboard further comprising:
   a keyboard status tracker with keyboard repeat rate and mode storage set to the keyboard repeat rate and mode as set by keyboard commands from said keyboard controller,
   wherein said virtual keyboard controller and said virtual keyboard are coupled, said virtual keyboard controller having access to the mode and repeat rate storage of said virtual keyboard, and
   wherein the keyboard initialization commands of said virtual keyboard controller include the mode and repeat rate stored in the virtual keyboard mode and repeat rate storage, whereby a plugged keyboard is initialized to the mode and repeat rate as stored by the virtual keyboard.

24. The keyboard switching circuit of claim 22, wherein said keyboard switching circuit is adapted for communication with the processor, the keyboard switching circuit further comprising:
   an interface in the virtual keyboard controller adapted to receive scan codes from the processor for sending to the physical keyboard through said virtual keyboard controller.

25. The keyboard switching circuit of claim 24, wherein said keyboard switching circuit is adapted for communication with the processor, the keyboard switching circuit further comprising:
   an interface in the virtual keyboard controller adapted to receive scan codes from the processor for sending standard keyboard commands through said virtual keyboard controller.

26. The keyboard switching circuit of claim 21 further comprising:
   a physical keyboard presence detection circuit coupled to a keyboard voltage supply for the physical keyboard, responsive to current changes on that supply, and providing an indication of physical keyboard presence,
   wherein said keyboard switch is responsive to the indication of physical keyboard presence, delaying a pre-determined period after the presence indication is true before determining that the physical keyboard is present.

27. The keyboard switching circuit of claim 26, wherein said physical keyboard presence detection circuit further comprises:
   a regulated voltage source for providing the keyboard voltage supply through a first forward biased diode;
   a differential amplifier with two inputs and with an output for providing the indication of physical keyboard presence, wherein said first input is coupled to the cathode of the first forward biased diode; and
   a second forward biased diode with an anode connected to the regulated voltage source provided keyboard voltage supply and a cathode coupled to the second output,
   wherein a voltage drop across the first diode exceeds the voltage drop across the second diode when current is drawn through the keyboard voltage supply.

28. The keyboard switching circuit of claim 21 further providing the transparent plugging and unplugging of a second physical keyboard with standard keyboard clock and data signals and responsive to standard keyboard commands, said keyboard switching circuit further comprising:
   a second keyboard switch coupled to the keyboard controller clock and data signals, and the second standard keyboard clock and data signals,
   wherein said second keyboard switch is responsive to whether the physical and the second physical keyboard are plugged or unplugged, connecting the keyboard controller clock and data signals to the second standard keyboard clock and data signal when the second physical keyboard is plugged and the physical keyboard is unplugged, and
   wherein said keyboard switch is further responsive to whether the second physical keyboard is plugged or unplugged, connecting the keyboard clock and data signals to virtual keyboard controller clock and data signals of a virtual keyboard controller when both said physical keyboard is unplugged and said second physical keyboard is unplugged.

29. The keyboard switching circuit of claim 28, wherein said second keyboard switch and said keyboard switch are coupled to connect the keyboard controller clock and data signals to either the standard keyboard clock and data signals or the second standard keyboard clock and data signals responsive to which of the physical keyboard or the second physical keyboard is most recently plugged.

30. The keyboard switching circuit of claim 21, wherein said keyboard switching circuit is implemented in a single application specific integrated circuit.

31. A computer system that provides transparent plugging and unplugging of a physical serial device with standard clock and data signals and responsive to standard commands, the computer system comprising:
   a processor for executing instructions;
   a peripheral storage device for providing data;
   a controller coupled to said processor, said controller providing controller clock and data signals compatible with the standard clock and data signals and providing standard commands over the controller clock and data signals; and
   a switching circuit coupled to the controller clock and data signals and adapted for coupling to the standard clock and data signals, said switching circuit further comprising:

a virtual serial device having virtual serial device clock and data signals, said virtual serial device being responsive to standard commands; and a switch coupled to the virtual serial device clock and data signals, to the standard clock and data signals, and to the controller clock and data signals, wherein said switch is responsive to whether the physical serial device is plugged or unplugged, connecting the controller clock and data signals to the virtual serial device clock and data signals when unplugged, and connecting the controller clock and data signals to the standard clock and data signals in response to the physical serial device being plugged.

32. The computer system of claim 31, wherein said physical serial device is a mouse.

33. The computer system of claim 31, said switching circuit further comprising:

a virtual serial device controller having virtual serial device controller clock and data signals, said virtual serial device controller providing standard commands, including standard initialization commands; and a virtual serial device controller switch coupled to the virtual serial device controller clock and data signals and to the standard clock and data signals, wherein said virtual serial device controller is responsive to whether the physical serial device is plugged or unplugged, providing the initialization commands in response to the physical serial device being plugged, and wherein said controller switch is responsive to whether the physical serial device is plugged or unplugged, connecting the virtual serial device controller clock and data signals to the standard clock and data signals when plugged, and disconnecting the virtual serial device clock and data signals from the standard clock and data signals after the virtual serial device controller has provided the initialization commands.

34. The computer system of claim 33, wherein said physical serial device is a mouse.

35. A computer system that provides for booting without a keyboard being connected to standard keyboard clock and data signals, the computer system comprising:

a processor for executing instructions;

a peripheral storage device for providing data;

a keyboard controller coupled to said processor, said keyboard controller providing keyboard controller clock and data signals compatible with the standard keyboard clock and data signals and providing standard keyboard commands over the keyboard controller clock and data signals;

a multiplexer coupled to the keyboard controller clock and data signals, said multiplexer for coupling the keyboard controller clock and data signals to the standard keyboard clock and data signals in response to a select signal being at a first state, and for coupling the keyboard controller clock and data signals to virtual keyboard clock and data signals in response to the select signal being at a second state; and a virtual keyboard coupled to the virtual keyboard clock and data signals, said virtual keyboard being responsive to standard keyboard commands.

36. The computer system of claim 35, wherein the select signal is forced to the second state during boot, and to the first state thereafter.

37. A keyboard controller that provides for booting without a keyboard being connected to standard keyboard clock and data signals in a system with a keyboard controller with keyboard controller clock and data signals, the computer system comprising:

a multiplexer for coupling to the keyboard controller clock and data signals, said multiplexer for coupling the keyboard controller clock and data signals to the standard keyboard clock and data signals in response to a select signal being at a first state, and for coupling the keyboard controller clock and data signals to virtual keyboard clock and data signals in response to the select signal being at a second state; and a virtual keyboard coupled to the virtual keyboard clock and data signals, said virtual keyboard being responsive to standard keyboard commands.

* * * * *